(12) United States Patent
Brants et al.

(10) Patent No.: US 12,729,805 B2
(45) Date of Patent: Sep. 8, 2026

(54) TELECOMMUNICATIONS ENCLOSURE MOUNTING SYSTEM

(71) Applicant: CommScope Technologies LLC, Hickory, NC (US)

(72) Inventors: Jozef Marie Roger Brants, Korbeek-Lo (BE); Johan Geens, Bunsbeek (BE); Jiri Zavrel, Leuven (BE); Karel A C Vanwinkel, Tielt-Winge (BE)

(73) Assignee: CommScope Technologies LLC, Claremont, NC (US)

( * ) Notice: Subject to any disclaimer, the term of this patent is extended or adjusted under 35 U.S.C. 154(b) by 19 days.

(21) Appl. No.: 18/720,519

(22) PCT Filed: Dec. 16, 2022

(86) PCT No.: PCT/US2022/081867
§ 371 (c)(1),
(2) Date: Jun. 14, 2024

(87) PCT Pub. No.: WO2023/115036
PCT Pub. Date: Jun. 22, 2023

(65) Prior Publication Data

US 2025/0060069 A1 Feb. 20, 2025

Related U.S. Application Data

(60) Provisional application No. 63/411,764, filed on Sep. 30, 2022, provisional application No. 63/395,631,
(Continued)

(51) Int. Cl.
*F16M 13/02* (2006.01)
*F16B 2/08* (2006.01)
(Continued)

(52) U.S. Cl.
CPC ............... *F16M 13/02* (2013.01); *F16B 2/08* (2013.01); *G02B 6/4454* (2013.01); *H04B 10/27* (2013.01)

(58) Field of Classification Search
CPC ........... F16M 13/02; F16B 2/08; H04B 10/27; G02B 6/4454
(Continued)

(56) References Cited

U.S. PATENT DOCUMENTS 6,766,992 B1 7/2004 Parker
9,657,891 B1 5/2017 Tatem et al.
(Continued)

FOREIGN PATENT DOCUMENTS

WO 2020/154408 A1 7/2020
WO 2020/236523 A1 11/2020
WO 2021/092177 A1 5/2021

OTHER PUBLICATIONS

Extended European Search Report for Application No. 22908775.4 mailed Oct. 27, 2025.
(Continued)

*Primary Examiner* — Todd M Epps
(74) *Attorney, Agent, or Firm* — Merchant & Gould P.C.

(57) ABSTRACT

The present disclosure relates to an enclosure mounting apparatus (e.g., a mounting bracket which may include a mounting plate) having a molded plastic construction. In certain examples, the enclosure mounting apparatus is configured to be compatible with a number of different styles (e.g., sizes, models, etc.) of telecommunications enclosures.

20 Claims, 47 Drawing Sheets

Related U.S. Application Data filed on Aug. 5, 2022, provisional application No. 63/324,475, filed on Mar. 28, 2022, provisional application No. 63/306,787, filed on Feb. 4, 2022, provisional application No. 63/291,019, filed on Dec. 17, 2021.

(51) Int. Cl.
*G02B 6/44* (2006.01)
*H04B 10/27* (2013.01)

(58) Field of Classification Search
USPC .......................................... 248/200; 174/135
See application file for complete search history.

(56) References Cited

U.S. PATENT DOCUMENTS

| | | | | |
|---|---|---|---|---|
| 10,276,990 | B2 * | 4/2019 | Thompson | H04Q 1/135 |
| 10,981,521 | B2 | 4/2021 | Creely et al. | |
| 11,402,589 | B2 * | 8/2022 | Claessens | G02B 6/4454 |
| 11,892,696 | B2 * | 2/2024 | Geens | G02B 6/44526 |
| 2014/0158847 | A1 | 6/2014 | James | |
| 2016/0308339 | A1 * | 10/2016 | Kellerman | H02G 3/0443 |
| 2019/0376643 | A1 * | 12/2019 | Witherbee | H02G 3/10 |
| 2020/0192042 | A1 * | 6/2020 | Coan | G02B 6/44524 |

OTHER PUBLICATIONS

International Search Report and Written Opinion for Application No. PCT/US2022/081867 mailed Apr. 27, 2023.

* cited by examiner

TELECOMMUNICATIONS ENCLOSURE MOUNTING SYSTEM

CROSS-REFERENCE TO RELATED APPLICATIONS

This application is a National Stage Application of PCT/US2022/081867, filed on Dec. 16, 2022, which claims the benefit of U.S. Provisional Application Ser. Nos. 63/291,019, filed on Dec. 17, 2021; 63/306,787, filed on Feb. 4, 2022; 63/324,475, filed on Mar. 28, 2022; 63/395,631, filed on Aug. 5, 2022; and 63/411,764, filed on Sep. 30, 2022; the disclosures of which are hereby incorporated herein by reference in their entireties. To the extent appropriate, a claim of priority is made to each of the above disclosed applications.

BACKGROUND

Fiber optic communication systems allow service providers to deliver high bandwidth communication capabilities to customers. Fiber optic communication systems employ a distribution network of fiber optic cables to transmit large volumes of data over long distances. A drop cable is typically the last leg of the distribution network before reaching an end subscriber such as a house, apartment, office, place of business, and the like. Typically, a drop cable is run from an optical terminal before reaching an end subscriber location.

Optical terminals can be mounted on a variety of structures in the field including walls, poles, cables, and the like. In some instances, mounting brackets can be used to mount the optical terminals to a variety of structures in the field.

SUMMARY

One aspect of the present disclosure relates to an enclosure mounting apparatus (e.g., a mounting bracket which may include a mounting plate) having a molded plastic construction that can be efficiently manufactured in relatively high volumes and that has sufficient strength and robustness to effectively mount telecommunications enclosures in outdoor environments (e.g., to walls, poles, cables, or the like). In certain examples, the enclosure mounting apparatus is configured to be compatible with a number of different styles (e.g., sizes, models, etc.) of telecommunications enclosures. In certain examples, the enclosure mounting apparatus includes a mounting plate that detachably mounts to a cable storage bracket at a mechanical interlock arrangement. In certain examples, the mounting plate has side notches for allowing access to an interlock release bar mounted on the cable storage bracket.

Another aspect relates to an enclosure mounting apparatus including a mounting plate having molded plastic construction. The mounting plate includes first, second, third and fourth corners defining a rectangular boundary including a first side positioned opposite a second side and a third side positioned opposite a fourth side. The first and second sides extend along a first plate dimension of the rectangular boundary and the third and fourth sides extend along a second plate dimension of the rectangular boundary. The mounting plate includes notches that extend inwardly from the first and second sides of the rectangular boundary. The notches each define a truncated triangular shape having a major side and minor side. The minor sides are located at a waist of the mounting plate which interconnects enlarged enclosure mounting portions of the mounting plate. The mounting plate has a front side and rear side, and the enclosure mounting apparatus defines a plurality of fastener openings that extend through the mounting plate in a front-to-rear orientation. The fastener openings are configured for receiving fasteners used to secure an enclosure to the front side of the mounting plate.

A further aspect of the present disclosure relates to an enclosure mounting apparatus including a mounting plate having molded plastic construction. The mounting plate has a front side and rear side. The enclosure mounting apparatus defines a plurality of fastener openings that extend through the mounting plate in a front-to-rear orientation. The fastener openings are configured for receiving fasteners used to secure an enclosure to the front side of the mounting plate. The fastener openings include: a) four first fastener openings arranged in a first rectangular configuration defining a first rectangle size; b) four second fastener openings arranged in a second rectangular configuration defining a second rectangle size; c) four third fastener openings arranged in a third rectangular configuration defining a third rectangle size; and d) four fourth fastener openings arranged in a fourth rectangular configuration defining a first rectangle size.

Another aspect of the present disclosure relates to an enclosure mounting bracket that can accommodate mounting box style enclosures and dome style enclosures. In one example, the bracket includes fastener openings for receiving bolts used for securing a box style enclosure to the bracket, and strap openings for receiving straps used for securing dome-style enclosures to the bracket.

Another aspect of the present disclosure relates to an enclosure mounting bracket including a mounting plate portion having molded plastic construction. The mounting plate portion has a front side and rear side. The bracket includes a plurality of fastener openings that extend through the mounting plate portion in a front-to-rear orientation. The fastener openings are configured for receiving fasteners used to secure an enclosure to the front side of the mounting plate portion. The mounting plate portion includes first and second opposite sides that extend along a centerline of the mounting bracket, and third and fourth opposite sides that extend across the centerline of the bracket. The mounting plate portion defines side notches at the first and second sides. The side notches include open notch sides and closed notch sides. The closed notch sides of the side notches are defined by cable bend protection members that project rearwardly from the mounting plate portion and have convex bend control shapes that face outwardly toward the open sides of the side notches. The bracket also includes rear mounting flanges connected to the mounting plate portion by rear offsets that rearwardly space the rear mounting flanges from the mounting plate portion. The rear mounting flanges are positioned adjacent the third and fourth sides and are aligned along the centerline of the bracket. A cable storage coil path is defined behind the mounting plate by a spool structure that includes the cable bend control members and the rear offsets, wherein the cable storage coil path extends around the convex bend control shapes and the rear offsets.

Another aspect of the present disclosure relates to a mounting system for telecommunications enclosures. The mounting system includes an enclosure mounting bracket including first fastener openings arranged in different first configurations matching different first mounting hole patterns defined by different sizes and/or types of first telecommunications enclosures for allowing the first telecommunications enclosures to be secured to the enclosure mounting bracket by enclosure securement fasteners. The enclosure mounting bracket defining an exterior formfactor. The mounting system also includes a kit for allowing the enclosure mounting bracket to be used with a second telecommunications enclosure having a second mounting hole pattern larger than the exterior formfactor of the enclosure mounting bracket. The kit includes extenders that are secured to the enclosure mounting bracket at selected ones of the first fastener openings. The extenders defining second fastener openings that are located outside the exterior formfactor of the enclosure mounting bracket when the extenders are secured to the enclosure mounting bracket. When the extenders are secured to the enclosure mounting bracket, the second fastener openings are arranged in a second configuration that matches the second mounting hole pattern.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

Figure 19:
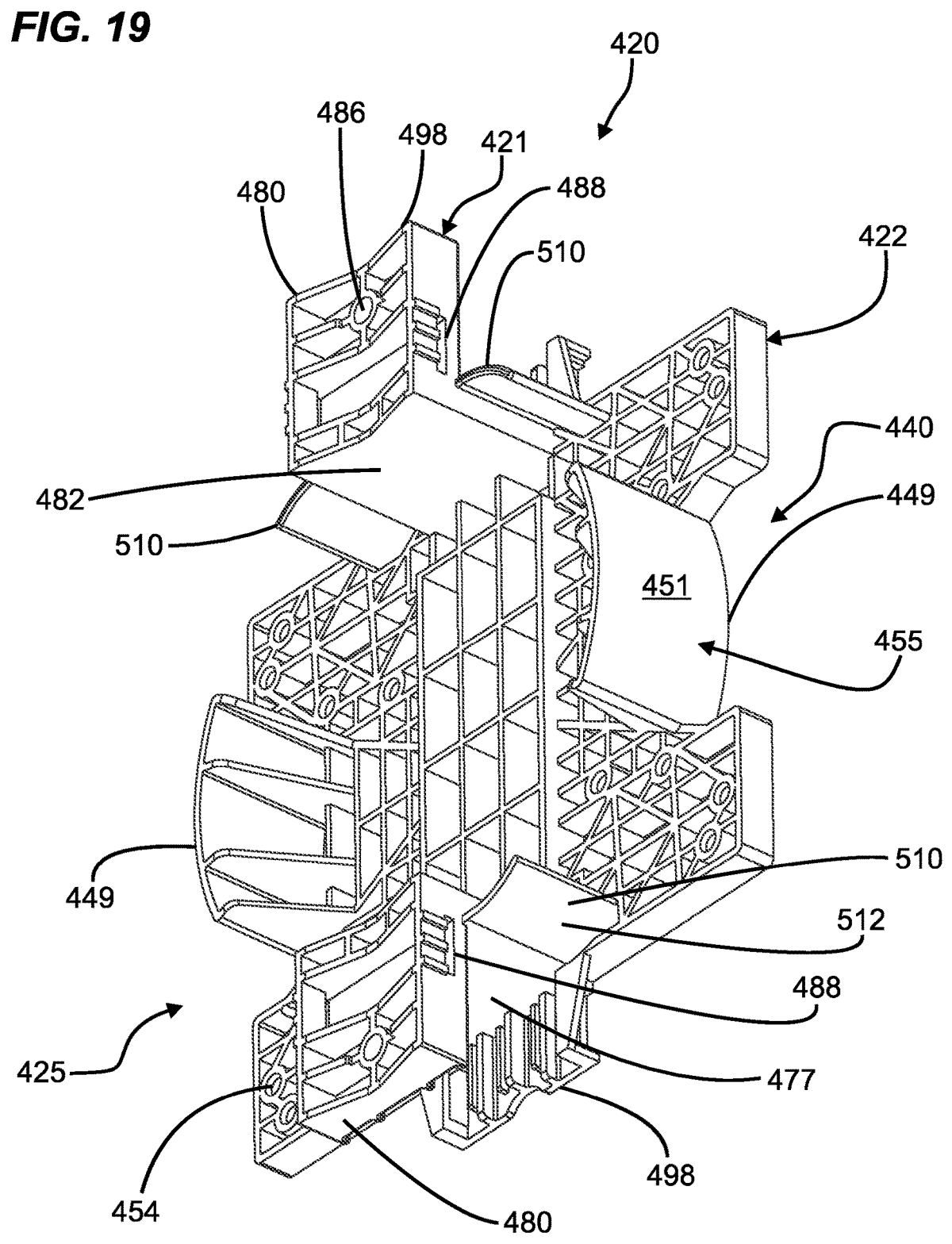

FIG. 19 is a rear, perspective view of the enclosure mounting apparatus of FIG. 18;

FIG. 26 is a perspective view depicting the enclosure mounting apparatus of

FIG. 18 securing a telecommunications enclosure to a pole;

FIG. 34 is a front view of the enclosure mounting apparatus of FIG. 32;

DETAILED DESCRIPTION

Figure 1:
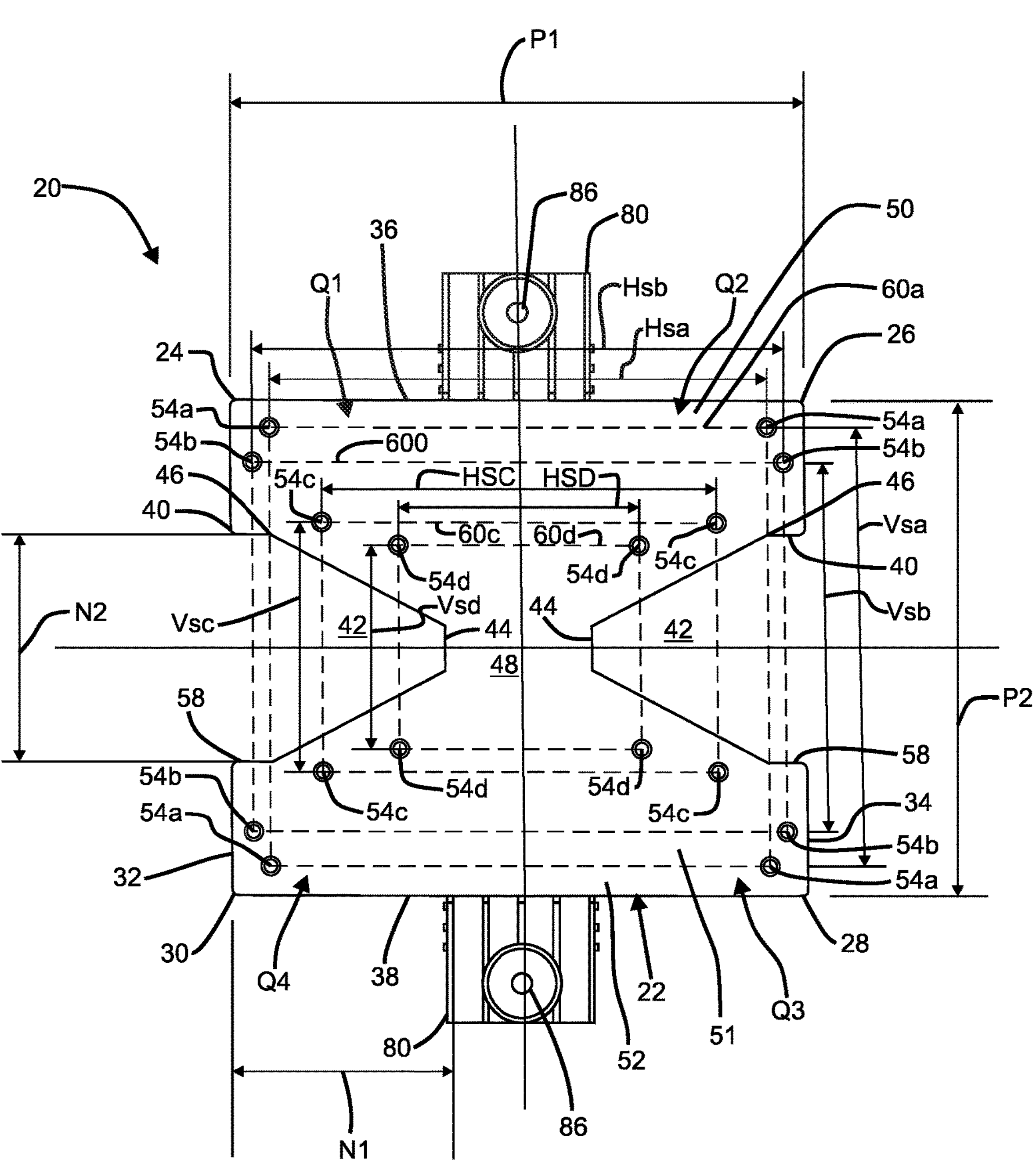
FIG. 1 is a front view of an enclosure mounting apparatus in accordance with the principles of the present disclosure.
Figure 2:
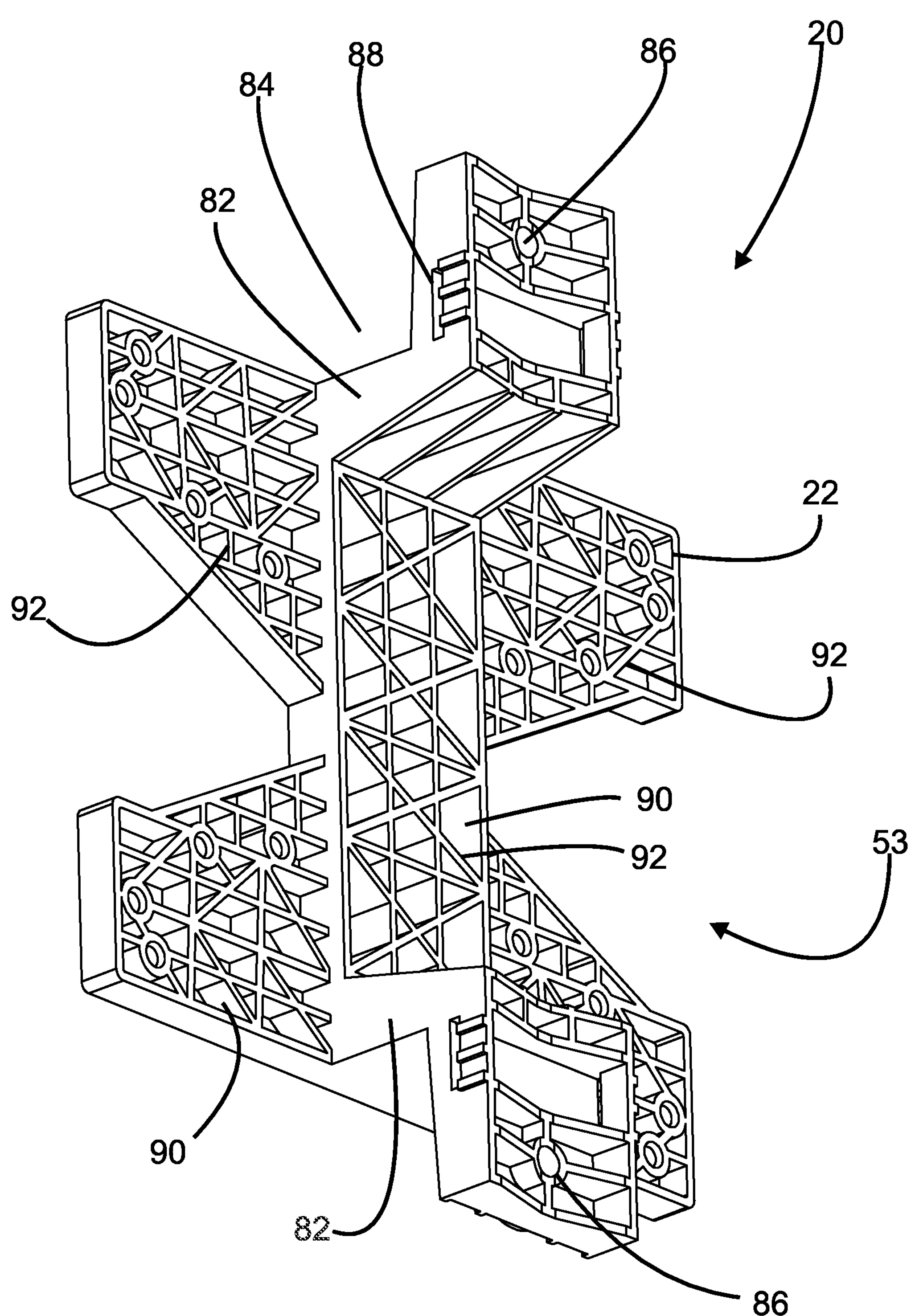
FIG. 2 is a rear perspective view of the enclosure mounting apparatus of FIG. 1.
Figure 3:
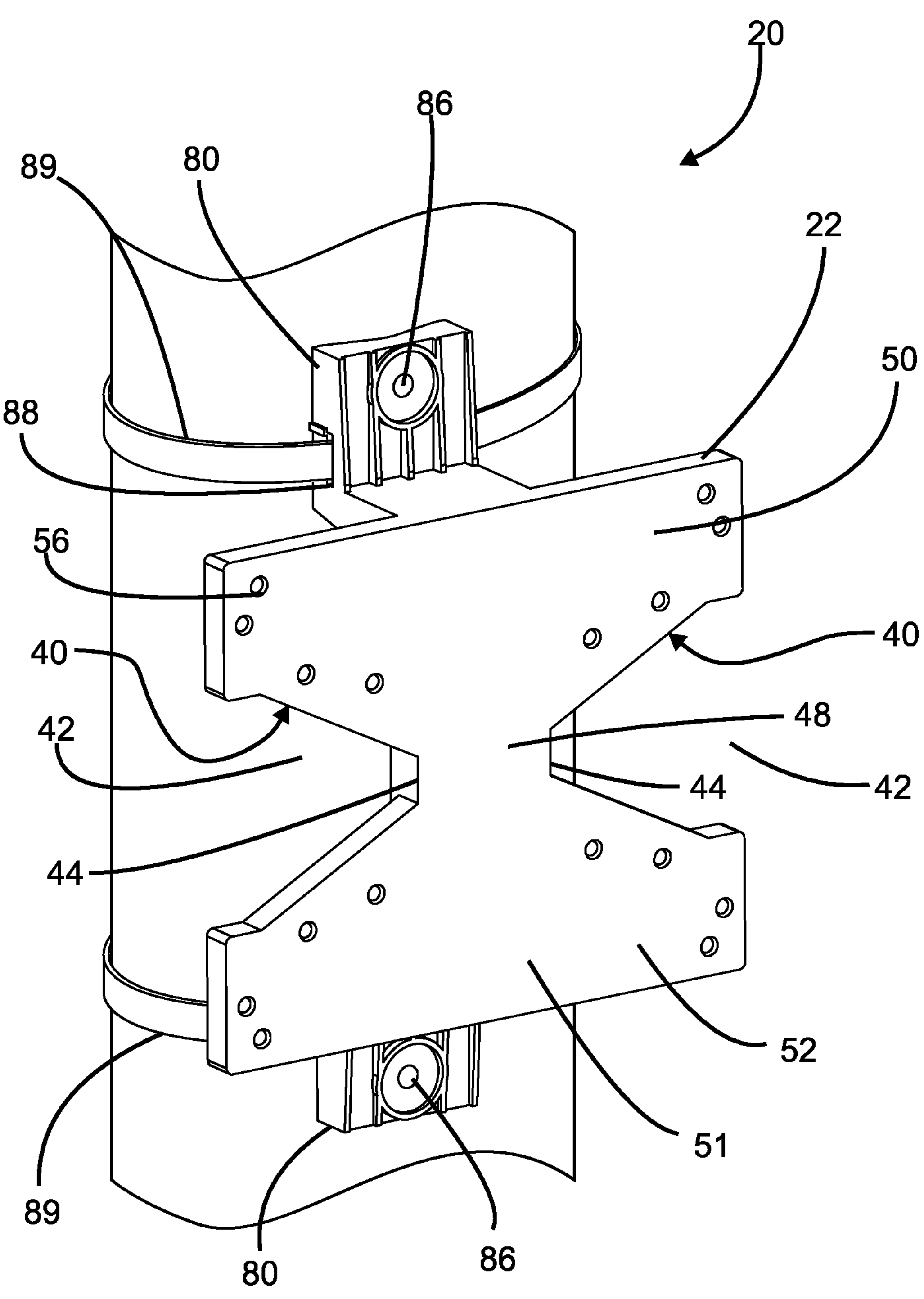
FIG. 3 depicts the enclosure mounting apparatus of FIGS. 1 and 2 mounted to a pole via straps.

FIGS. 1-3 depict an enclosure mounting apparatus 20 in accordance with the principles of the present disclosure. The enclosure mounting apparatus 20 include a mounting plate 22 having molded plastic construction. The mounting plate 22 includes first, second, third and fourth corners 24, 26, 28 and 30 defining a rectangular boundary including a first side 32 positioned opposite a second side 34 and a third side 36 positioned opposite a fourth side 38. The first and second sides 32, 34 extend along a first plate dimension P1 of the rectangular boundary and the third and fourth sides 36, 38 extend along a second plate dimension P2 of the rectangular boundary. The mounting plate 22 includes notches 40 that extend inwardly from the first and second sides 32, 34 of the rectangular boundary. The notches 40 each define a truncated triangular shape 42 having a major side 44 and minor side 46. The minor sides 46 are located at a waist 48 of the mounting plate 22 which interconnects enlarged upper and lower enclosure mounting portions 50, 51 of the mounting plate 22.

The mounting plate 22 has a front side 52 (see FIGS. 1 and 3) and rear side 53 (see FIG. 2). The enclosure mounting apparatus 20 defines a plurality of fastener openings 54 that extend through the mounting plate 22 in a front-to-rear orientation. The fastener openings 54 are configured for receiving fasteners used to secure an enclosure to the front side 52 of the mounting plate 22. In one example, the fastener openings 54 are defined by internally threaded nuts 56 molded within the mounting plate 22 which are adapted to receive fasteners in the form of bolts (e.g., see bolt 56 at FIG. 5).

Referring to FIG. 1, in addition to the truncated triangular shapes 42, the notches 40 include portions defining rectangular shapes 58. The rectangular shapes 58 are located between the major sides 44 of the truncated triangular shapes 42 and the first and second sides 32, 34 of the rectangular boundary of the mounting plate 22. In the depicted example, the notches 40 are sized to be prominent features of the mounting plate 22. As depicted, the notches 40 each include a first notch dimension N1 that coincides with at least 25 percent of the first plate dimension P1 and a second notch dimension N2 that coincides with at least 25 percent of the second plate dimension P2.

The fastener openings 54 are arranged in sets (e.g., hole patterns, hole configurations, etc.) that are different from one another (e.g., have different center-to-center spacing dimensions). The different sets of openings are adapted to match the hole patterns of different telecommunications enclosures such that one bracket is compatible with and is capable of mounting a variety of different telecommunications enclosures. The telecommunications enclosures can include different enclosure sizes, different enclosure styles and different enclosure models.

Figure 4:
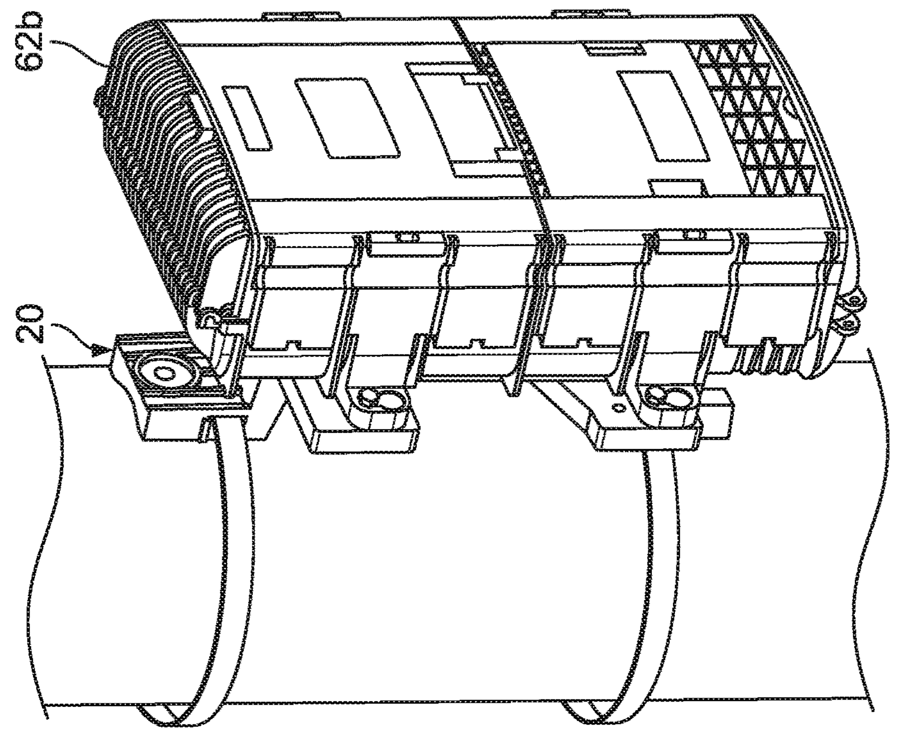
FIG. 4 depicts the enclosure mounting apparatus of FIGS. 1 and 2 being used to mount a first telecommunications enclosure to a pole.
Figure 7:
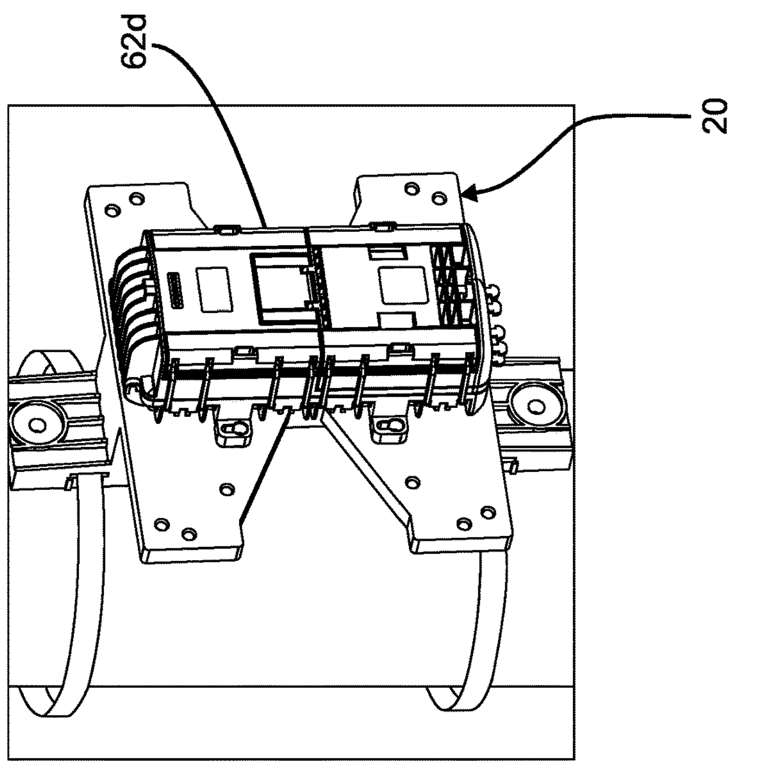
FIG. 7 depicts the enclosure mounting apparatus of FIGS. 1 and 2 being used to mount a third telecommunications enclosure to a pole.
Figure 7:
Figure 6:
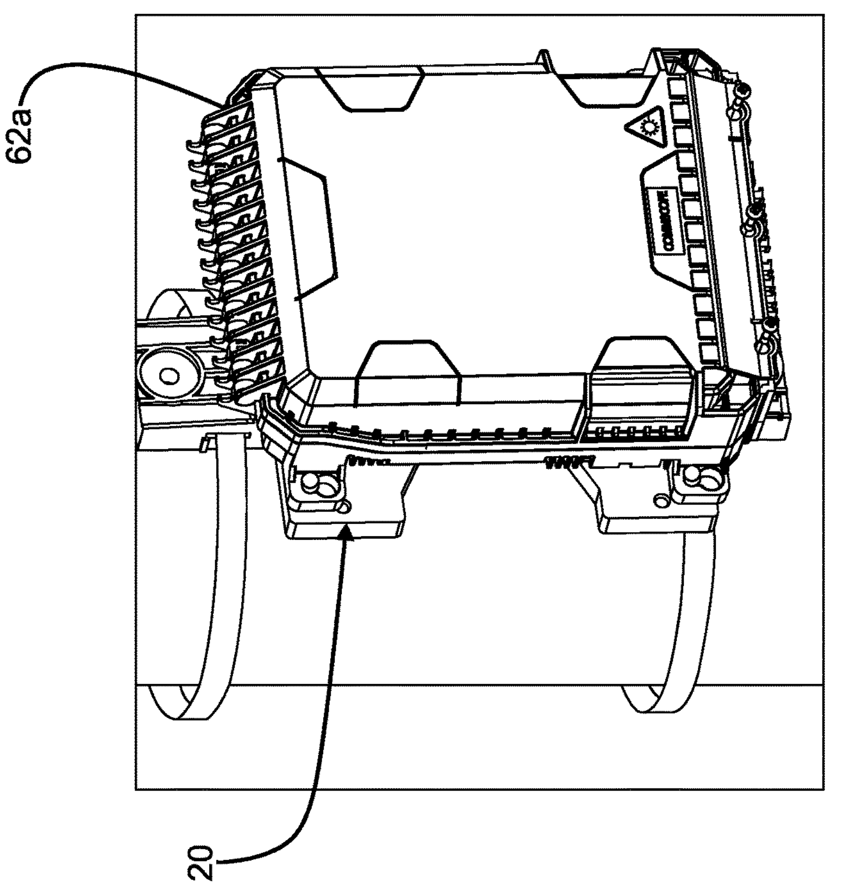
FIG. 6 depicts the enclosure mounting apparatus of FIGS. 1 and 2 being used to mount a second telecommunications enclosure to a pole.
Figure 8:
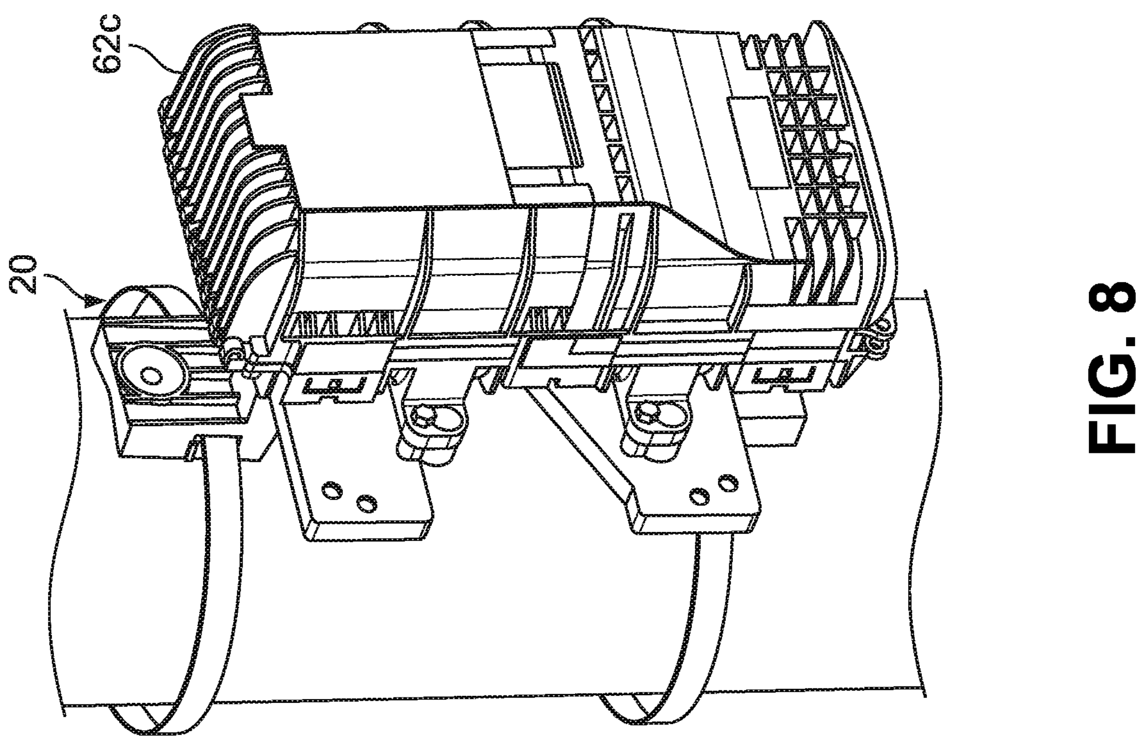
FIG. 8 depicts the enclosure mounting apparatus of FIGS. 1 and 2 being used to mount a fourth telecommunications enclosure to a pole.

Referring to FIG. 1, the fastener openings 54 include: a) four first fastener openings **54*a* arranged in a first rectangular configuration 60*a* defining a first rectangle size; b) four second fastener openings 54*b* arranged in a second rectangular configuration 60*b* defining a second rectangle size; c) four third fastener openings 54*c* arranged in a third rectangular configuration 60*c* defining a third rectangle size; and d) four fourth fastener openings 54*d* arranged in a fourth rectangular configuration 60*d* defining a first rectangle size. The first rectangular configuration 60*a* matches a fastener hole pattern for a first model of telecommunications enclosure 62*a* (see FIG. 6) such that the enclosure 62*a* can be bolted to the front of the mounting plate 22 at the fastener openings 54*a*. The second rectangular configuration 60*b* matches a fastener hole pattern for a second model of telecommunications enclosure 62*b* (see FIG. 4) such that the enclosure 62*b* can be bolted to the front of the mounting plate 22 at the fastener openings 54*b*. The third rectangular configuration 60*c* matches a fastener hole pattern for a third model of telecommunications enclosure 62*c* (see FIG. 8) such that the enclosure 62*c* can be bolted to the front of the mounting plate 22 at the fastener openings 54*c*. The fourth rectangular configuration 60*d* matches a fastener hole pattern for a fourth model of telecommunications enclosure 62*d* (see FIG. 7) such that the enclosure 62*d* can be bolted to the front of the mounting plate 22 at the fastener openings 54*d***.

In one example, the first fastener openings **54*a* having a horizontal center-to-center spacing HSa of 219 mm and a vertical center-to-center spacing VSa of 193.75 mm. In one example, the second fastener openings 54*b* having a horizontal center-to-center spacing HSb of 234 mm and a vertical center-to-center spacing VSb of 164.25 mm. In one example, the third fastener openings 54*c* having a horizontal center-to-center spacing HSc of 173.6 mm and a vertical center-to-center spacing VSc of 110 mm. In one example, the fourth fastener openings 54*d*** having a horizontal center-to-center spacing HSd of 106.5 mm and a vertical center-to-center spacing VSd of 90.4 mm.

Referring again to FIG. 1, the mounting plate 22 includes first, second, third and fourth quadrants Q1-Q4 that respectively include the first, second, third and fourth corners 24, 26, 28 and 30 of the mounting plate 22. The rectangular fastener opening configurations **60*a*-60*d* are configured such that one of each of the first, second, third, and fourth fastener openings 54*a*-54*d* is provided within each of the first, second, third and fourth quadrants Q1-Q4**.

Figure 9:
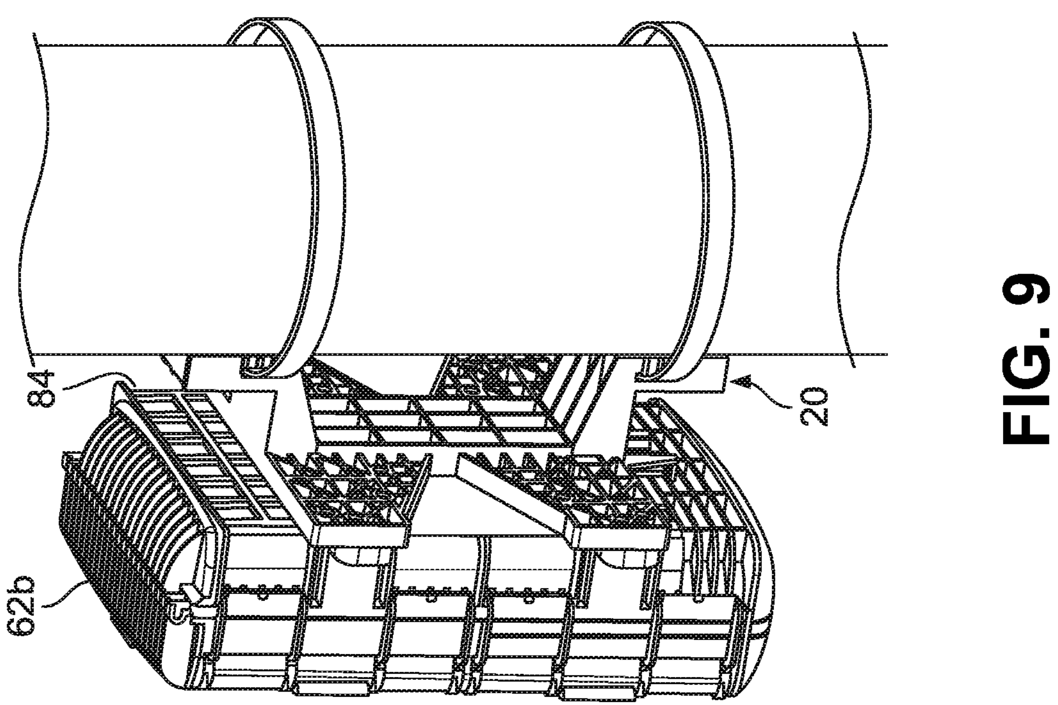
FIG. 9 depicts a cable storage region defined by the enclosure mounting apparatus of FIGS. 1 and 2 for allowing excess cable to be coiled about the enclosure mounting apparatus.

Referring to FIG. 3, the enclosure mounting apparatus 20 further includes mounting flanges 80 connected to the rear side 53 of the mounting plate 22 by rear extensions 82 (e.g., offset portions). A coiling region 84 (see FIGS. 2 and 9) for coiling excess cable is defined around the rear extensions 82 behind the mounting plate 22. The mounting flanges 80 define mounting openings 86 that extend through the mounting flanges 80 in the front-to-rear orientation for receiving fasteners (e.g., screws, bolts, nails, etc.) for securing the enclosure mounting apparatus 20 to a pole or wall. The mounting flanges 80 also define lateral strap slots 88 for receiving straps 89 for strapping the enclosure mounting apparatus 20 to a pole.

To enhance the structural strength and rigidity of the enclosure mounting apparatus, the mounting plate 22 includes an arrangement cells 90 defined by reinforcing ribs 92. The cells 90 having open ends at the rear side 53 of the mounting plate 22 and closed ends at the front side 52 of the mounting plate 22.

Figure 10:
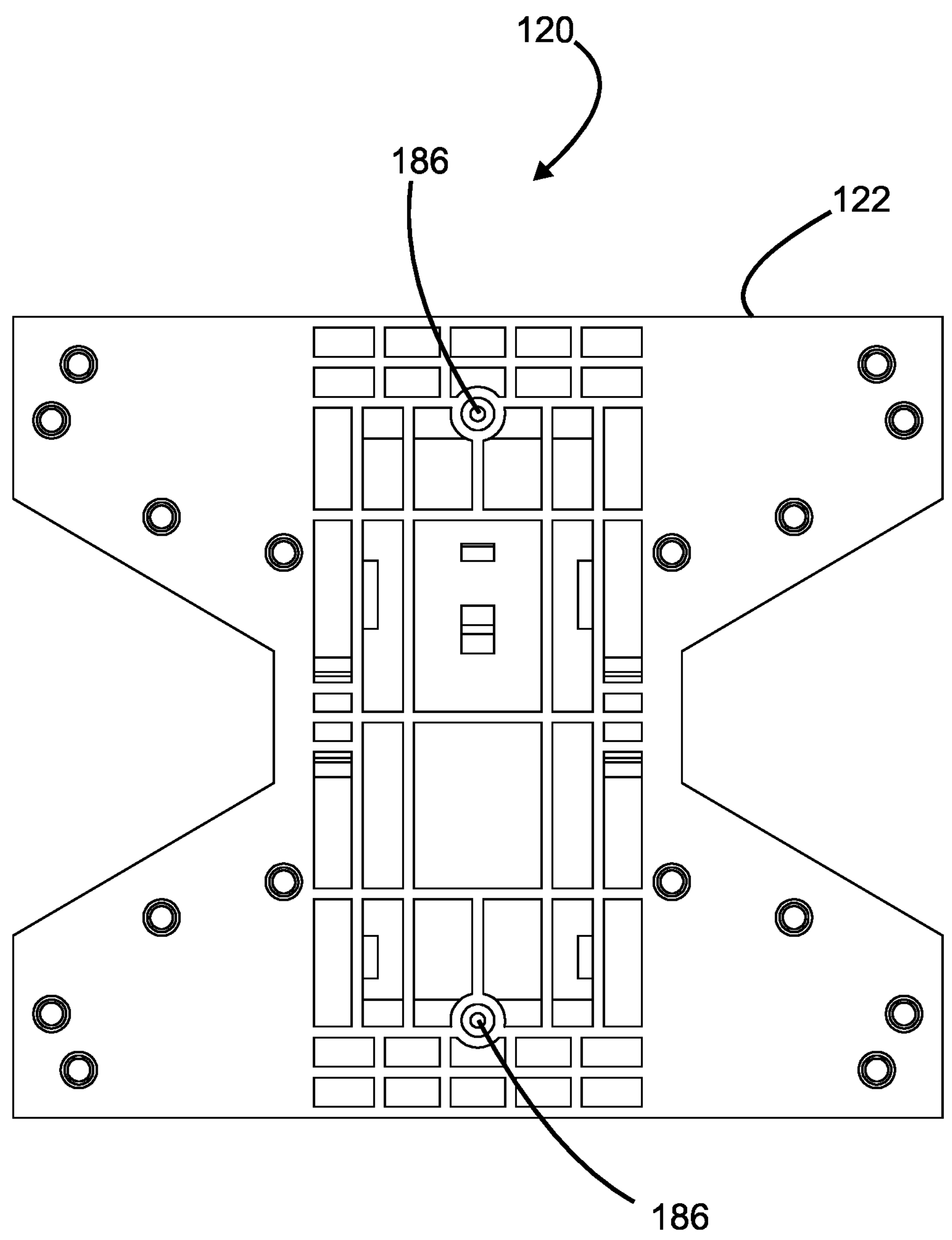
FIG. 10 is a front view of another enclosure mounting apparatus in accordance with the principles of the present disclosure.
Figure 11:
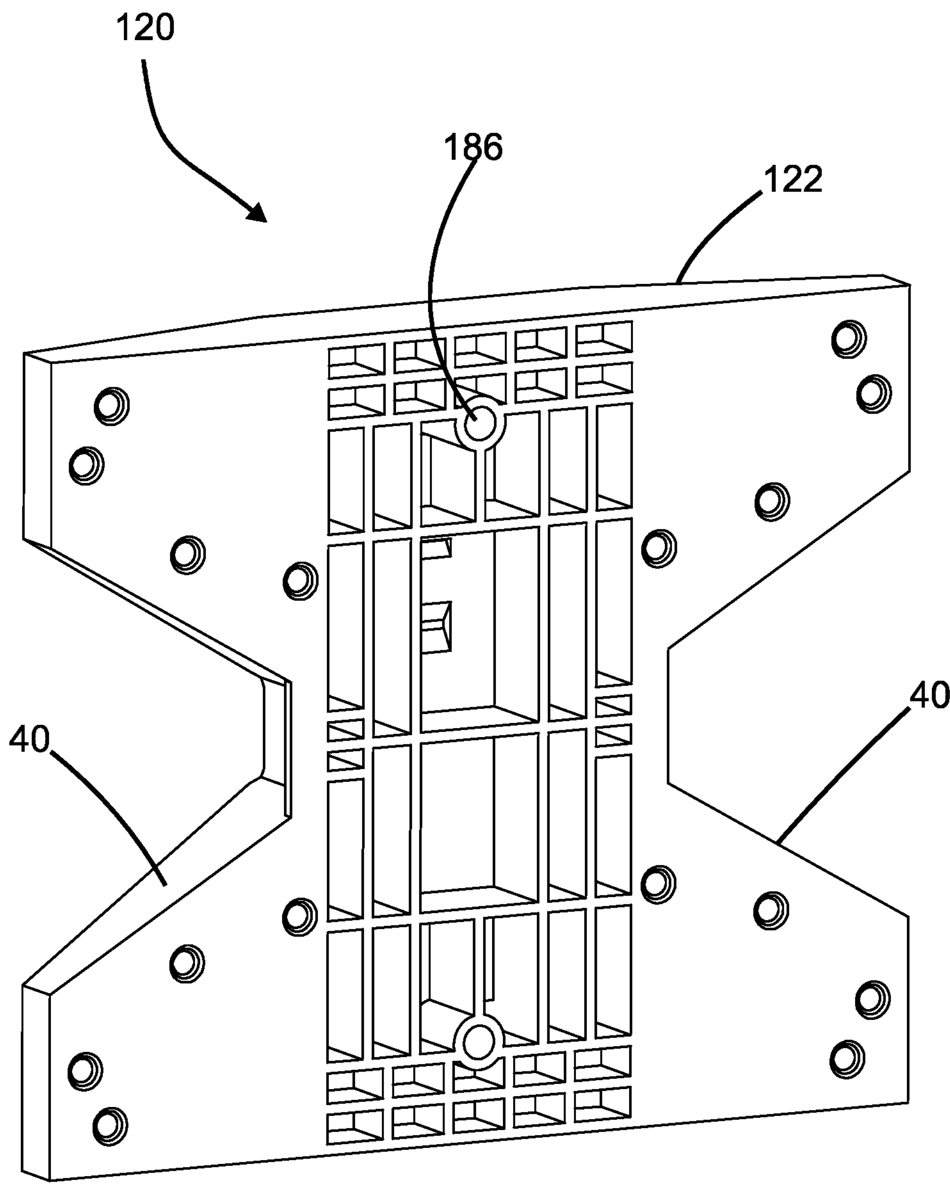
FIG. 11 is a front perspective view of the enclosure mounting apparatus of FIG. 10.
Figure 12:
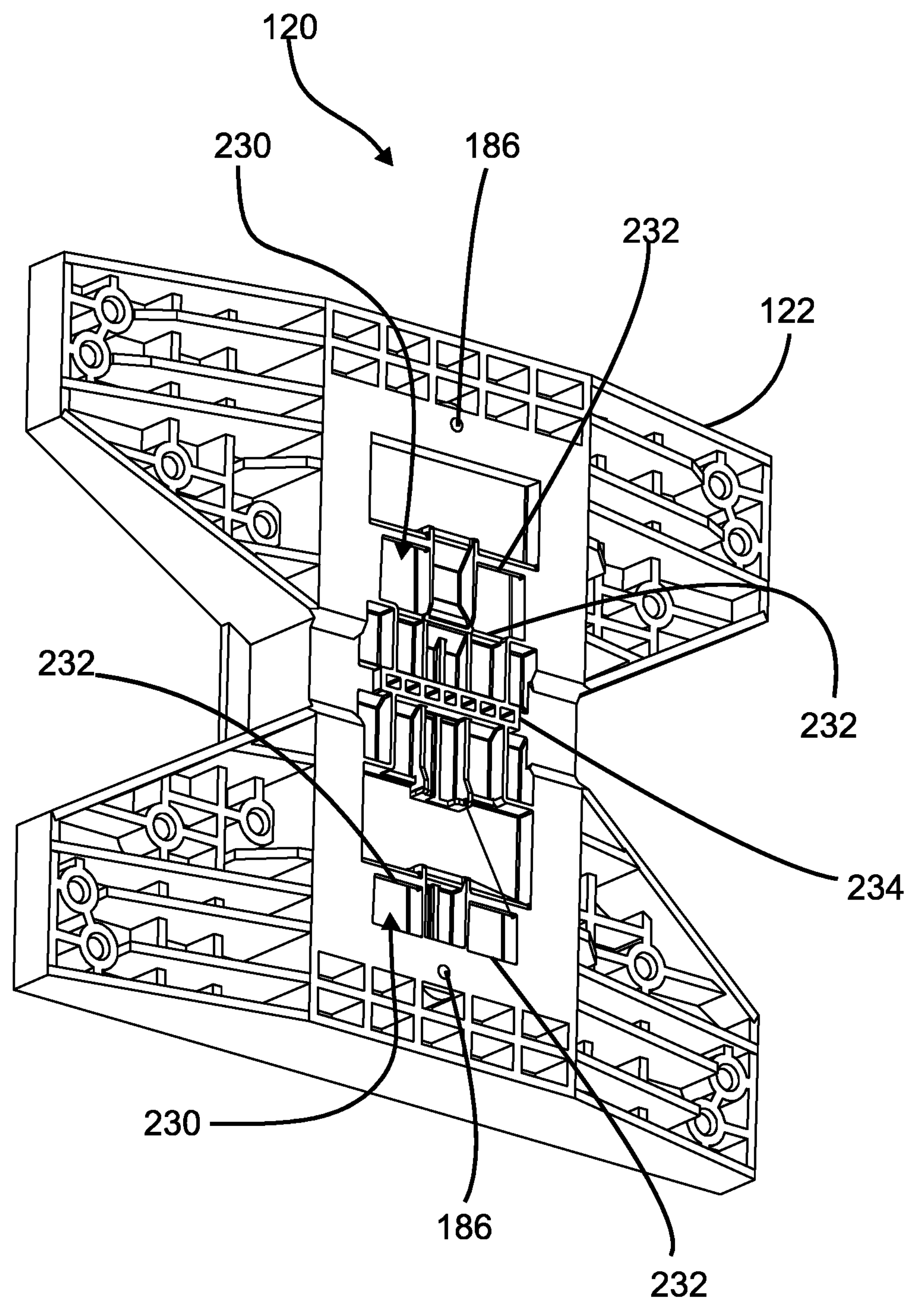
FIG. 12 is a rear perspective view of the enclosure mounting apparatus of FIG. 10.
Figure 13:
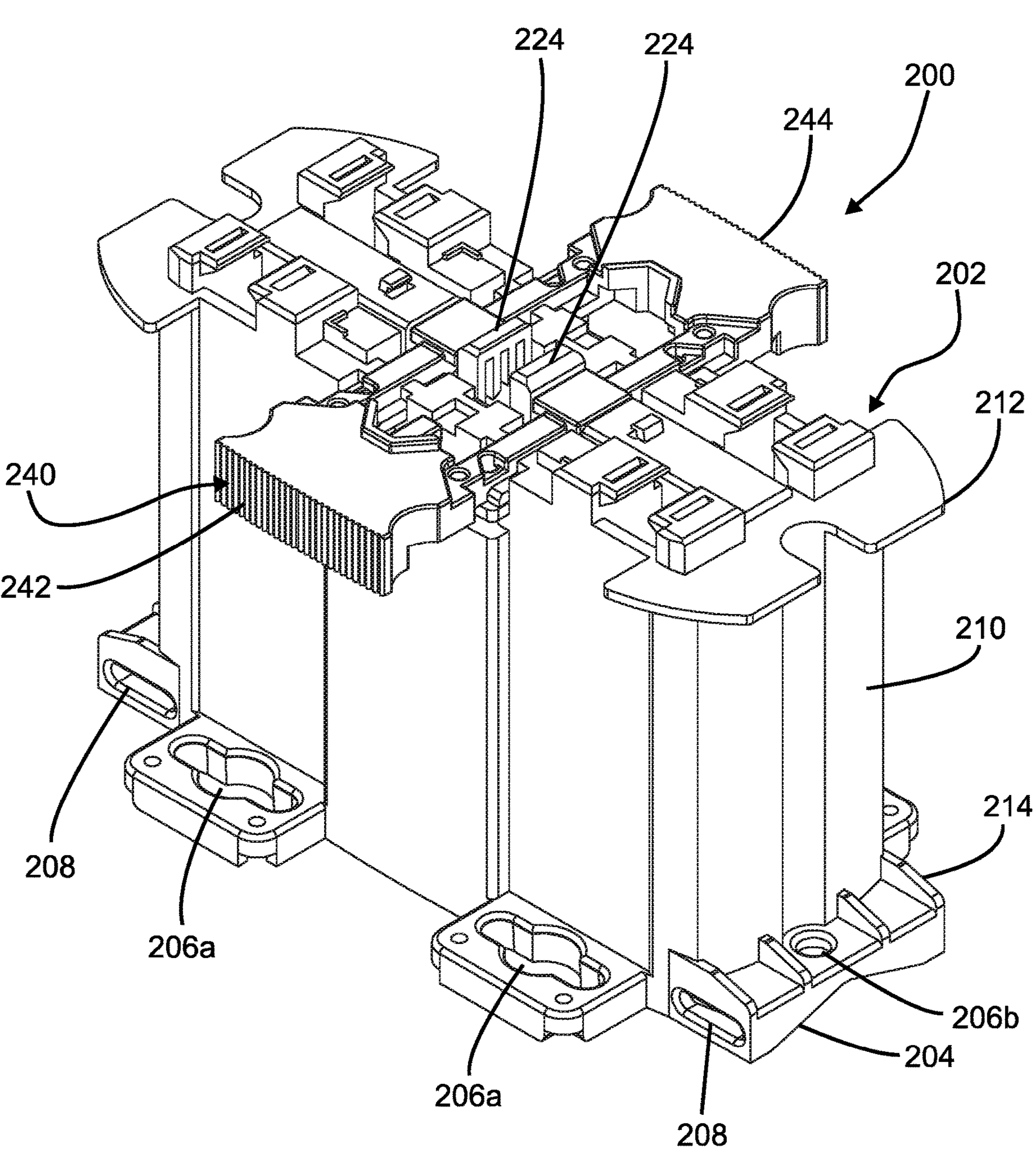
FIG. 13 is a front perspective view of a cable storage bracket that can be used in combination with the enclosure mounting apparatus of FIG. 10.
Figure 14:
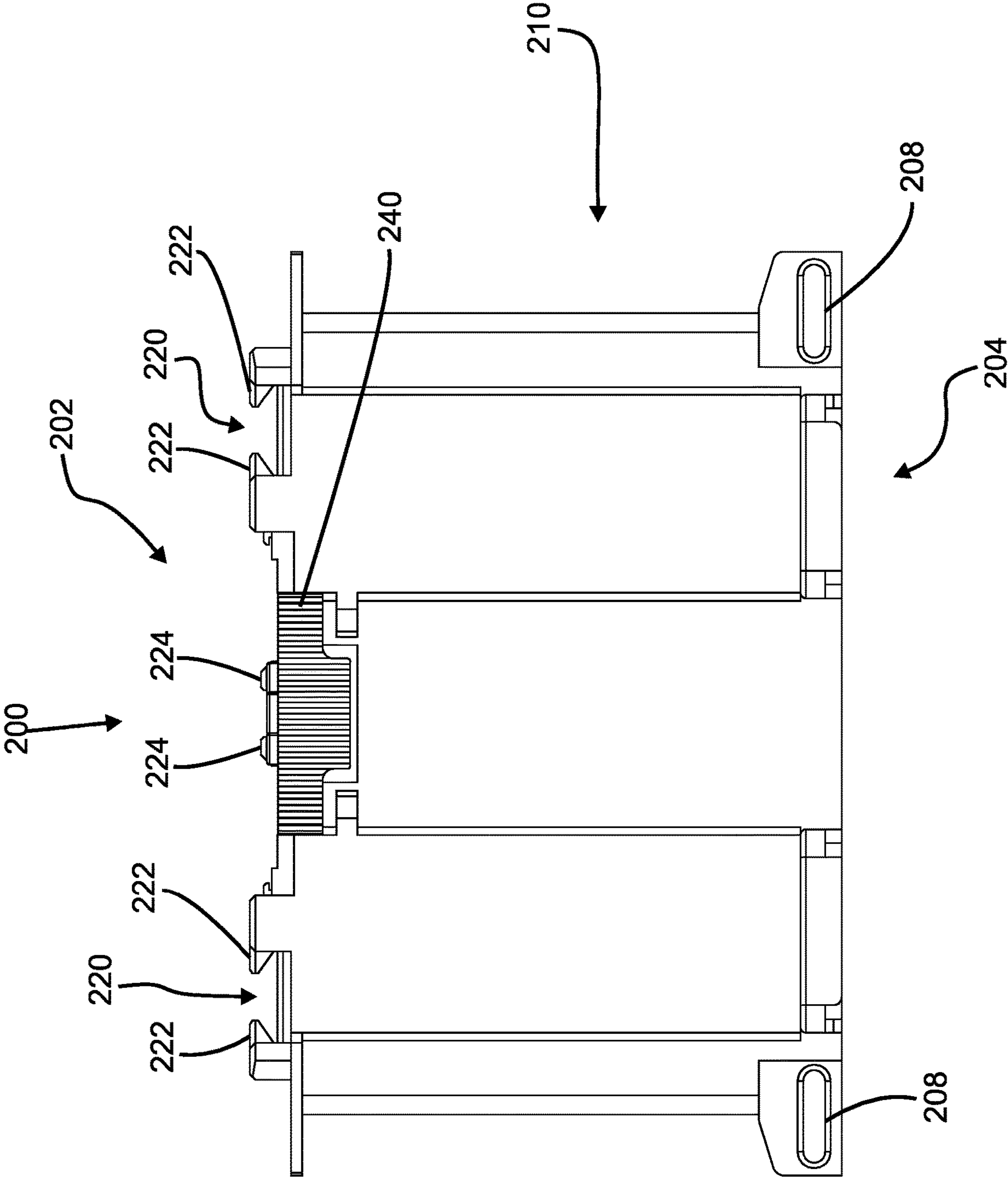
FIG. 14 is a side view of the cable storage bracket of FIG. 13.
Figure 15:
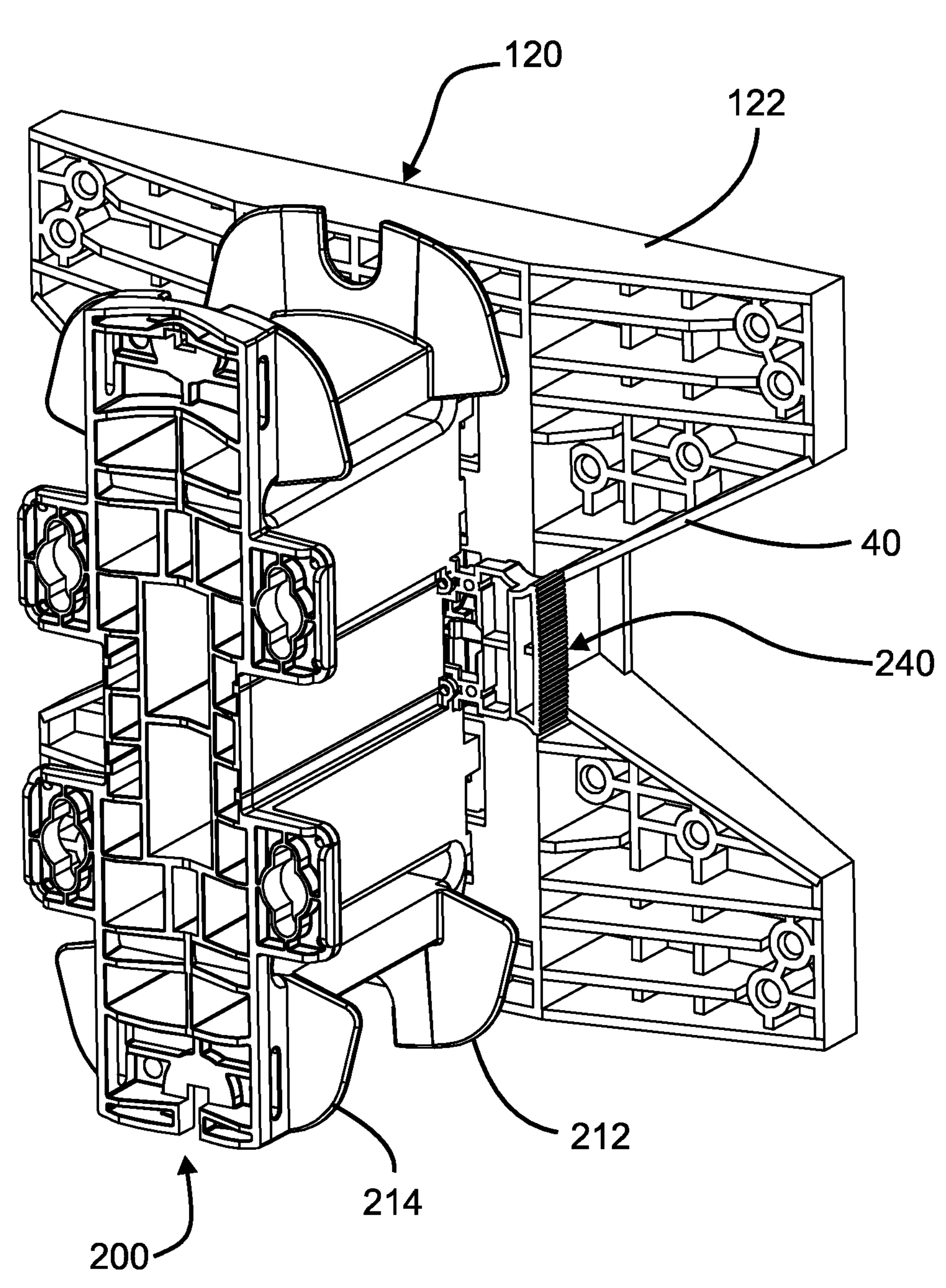
FIG. 15 is a rear perspective view showing the enclosure mounting apparatus of FIG. 10 in the process of being coupled to the front of the cable storage bracket of FIG. 13.
Figure 16:
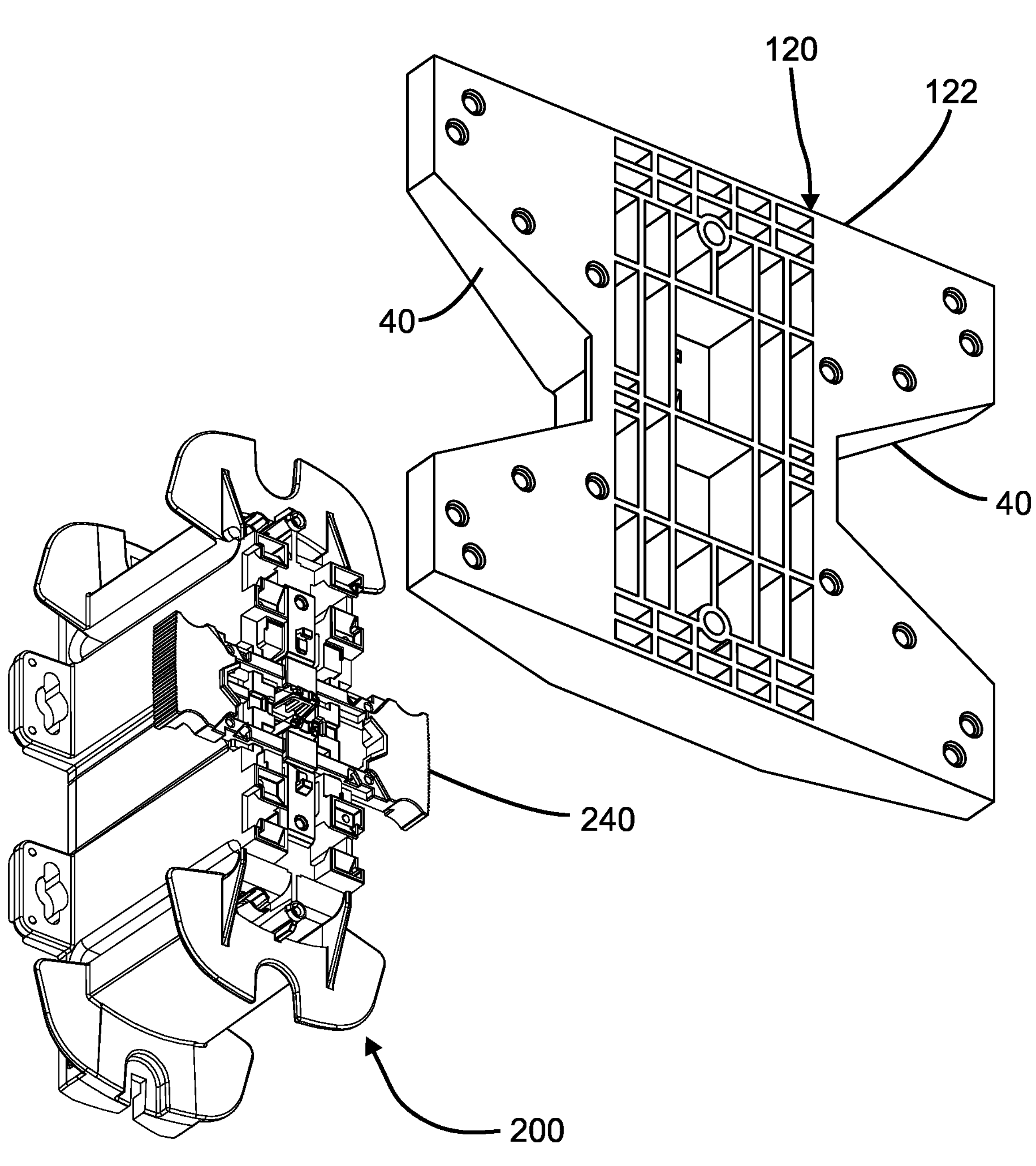
FIG. 16 is a front perspective view showing the enclosure mounting apparatus of FIG. 10 in the process of being coupled to the front of the cable storage bracket of FIG. 13.
Figure 17:
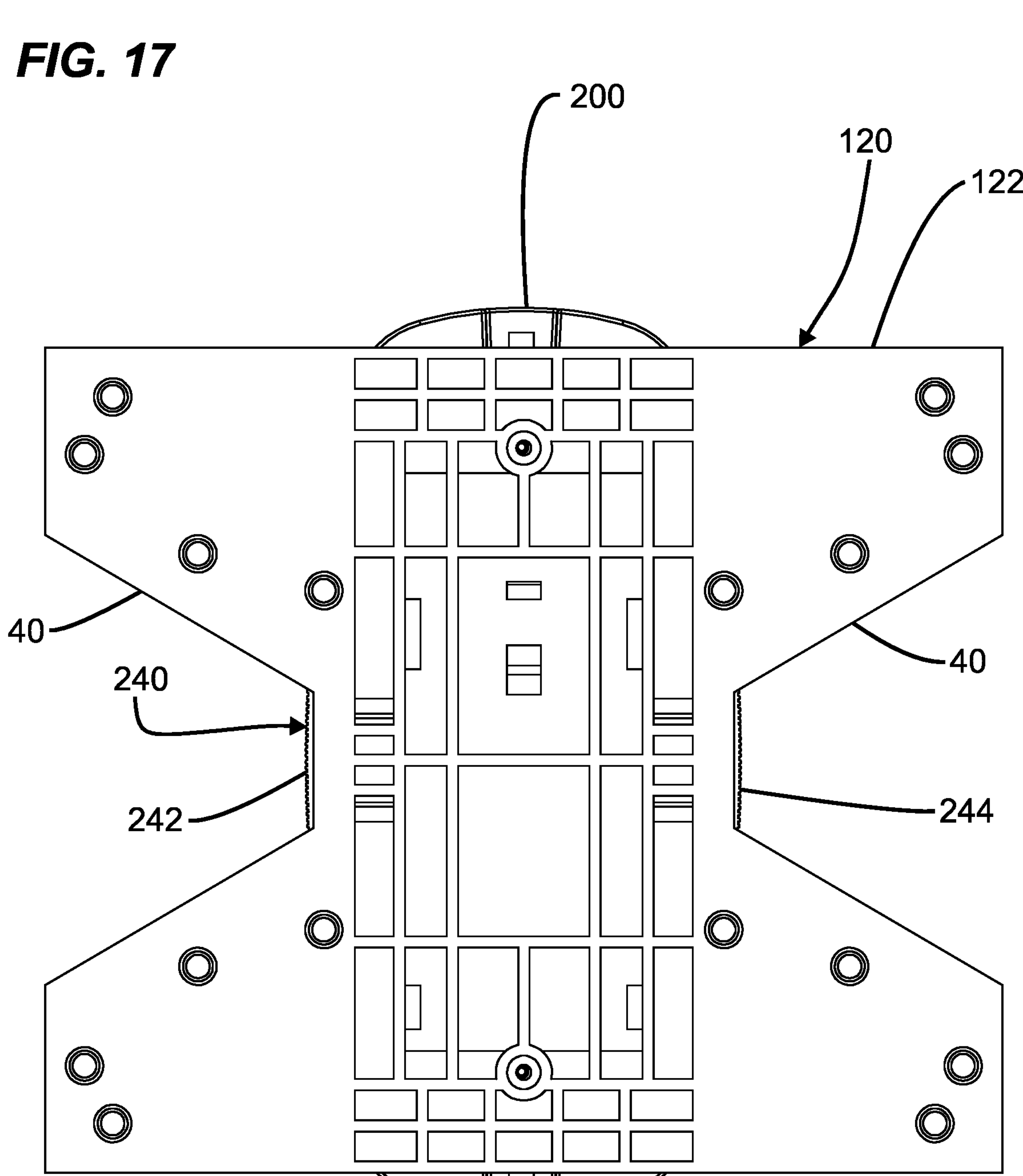
FIG. 17 is a front view showing the enclosure mounting apparatus of FIG. 10 coupled to the front of the cable storage bracket of FIG. 13.
Figure 18:
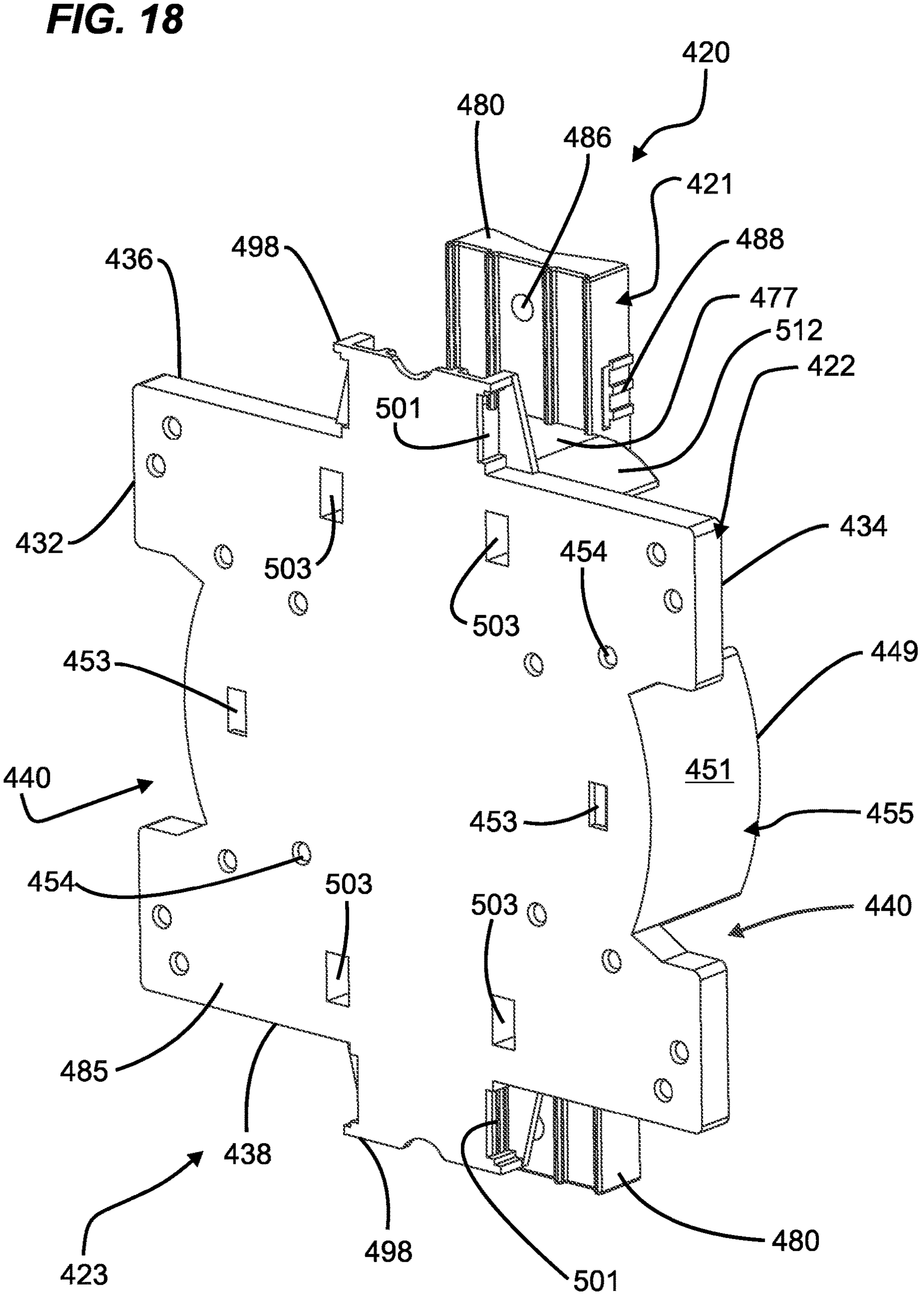
FIG. 18 is a front, perspective view of another enclosure mounting apparatus in accordance with the principles of the present disclosure.
Figure 20:
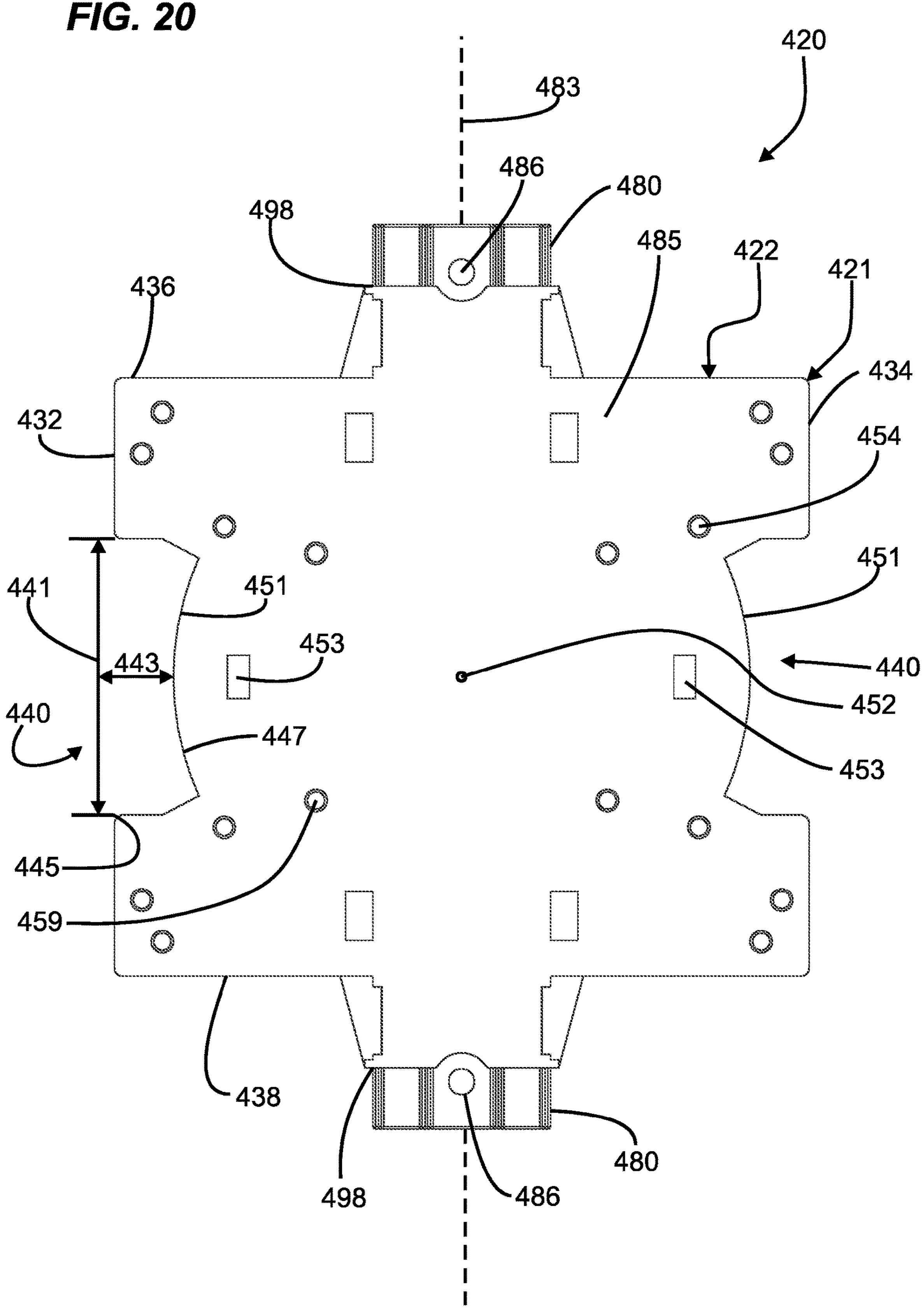
FIG. 20 is a front view of the enclosure mounting apparatus of FIG. 18.
Figure 21:
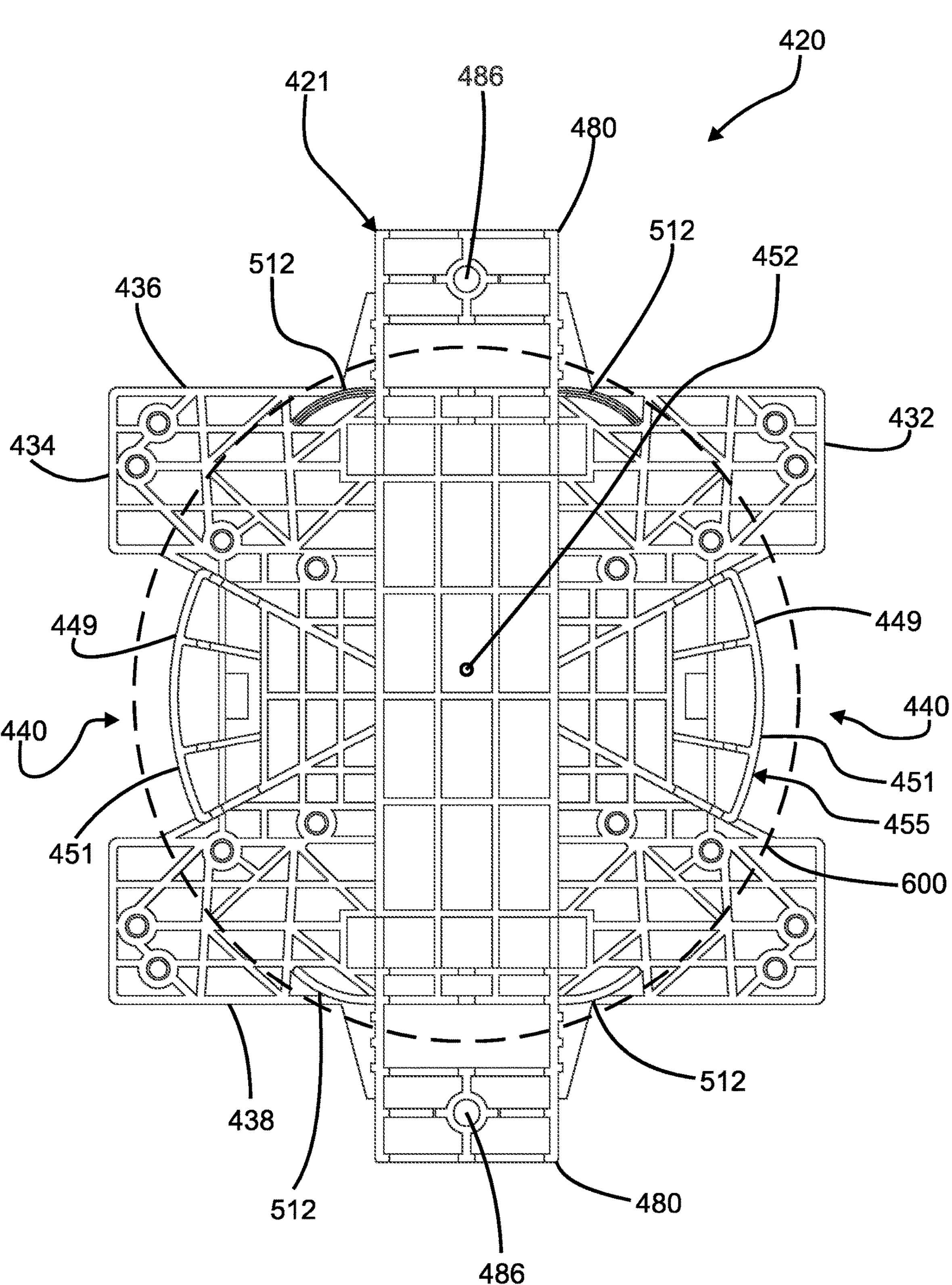
FIG. 21 is a rear view of the enclosure mounting apparatus of FIG. 18.
Figure 22:
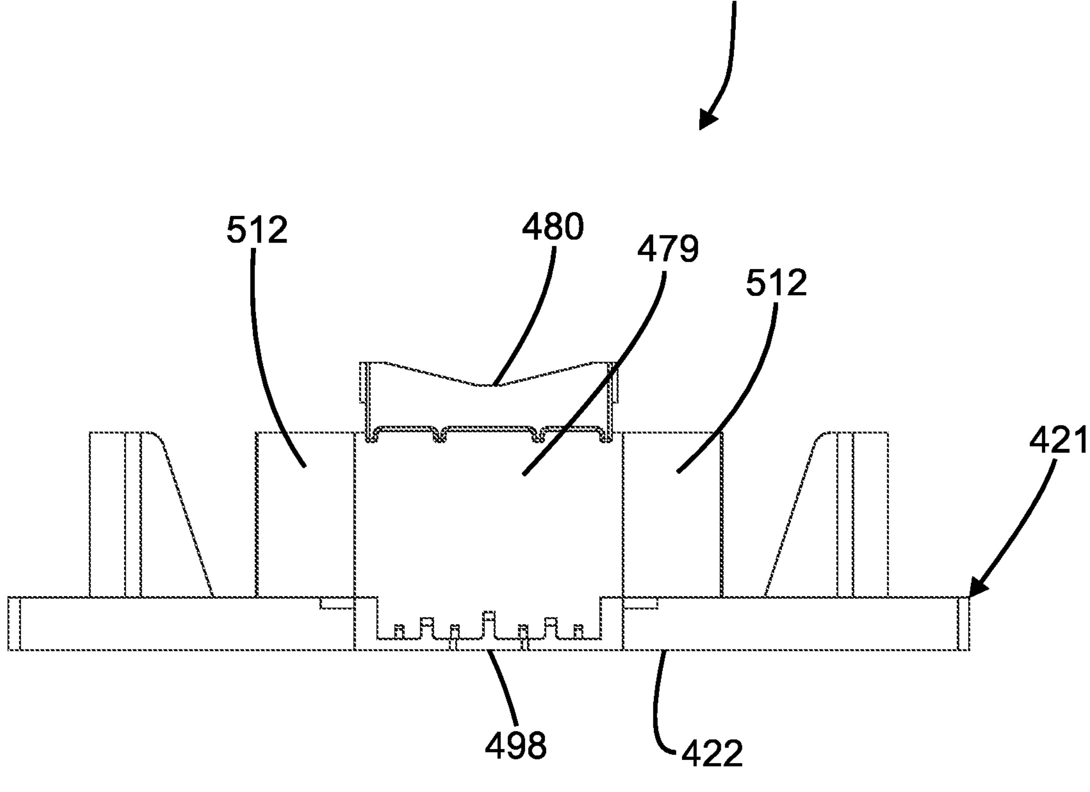
FIG. 22 is a top view of the enclosure mounting apparatus of FIG. 18.
Figure 23:
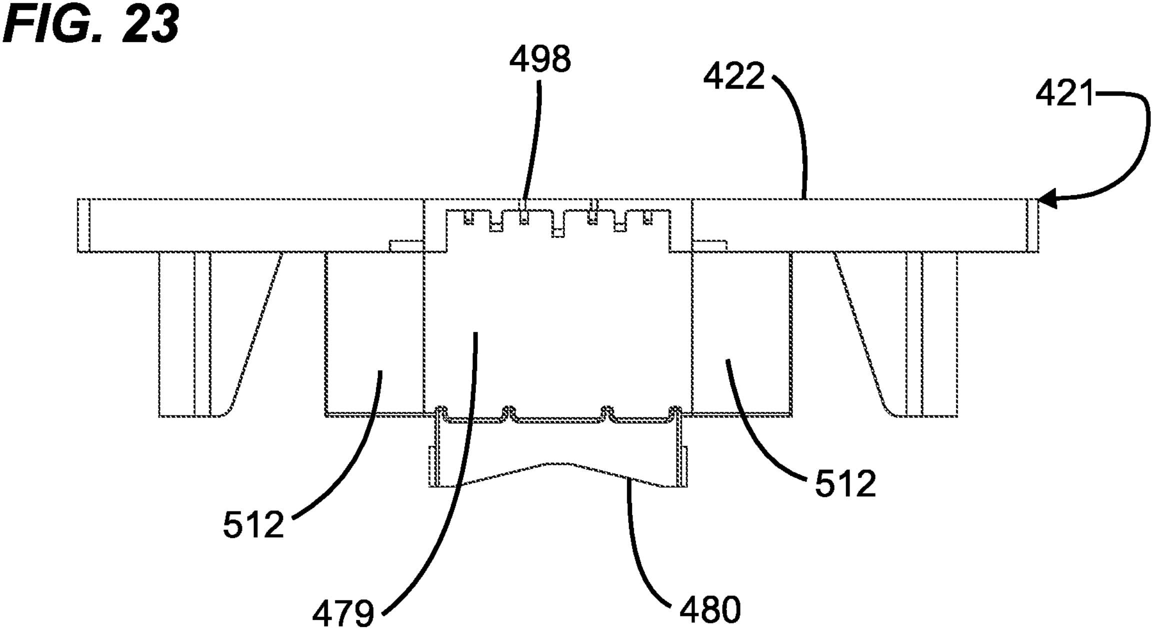
FIG. 23 is a bottom view of the enclosure mounting apparatus of FIG. 18.
Figure 24:
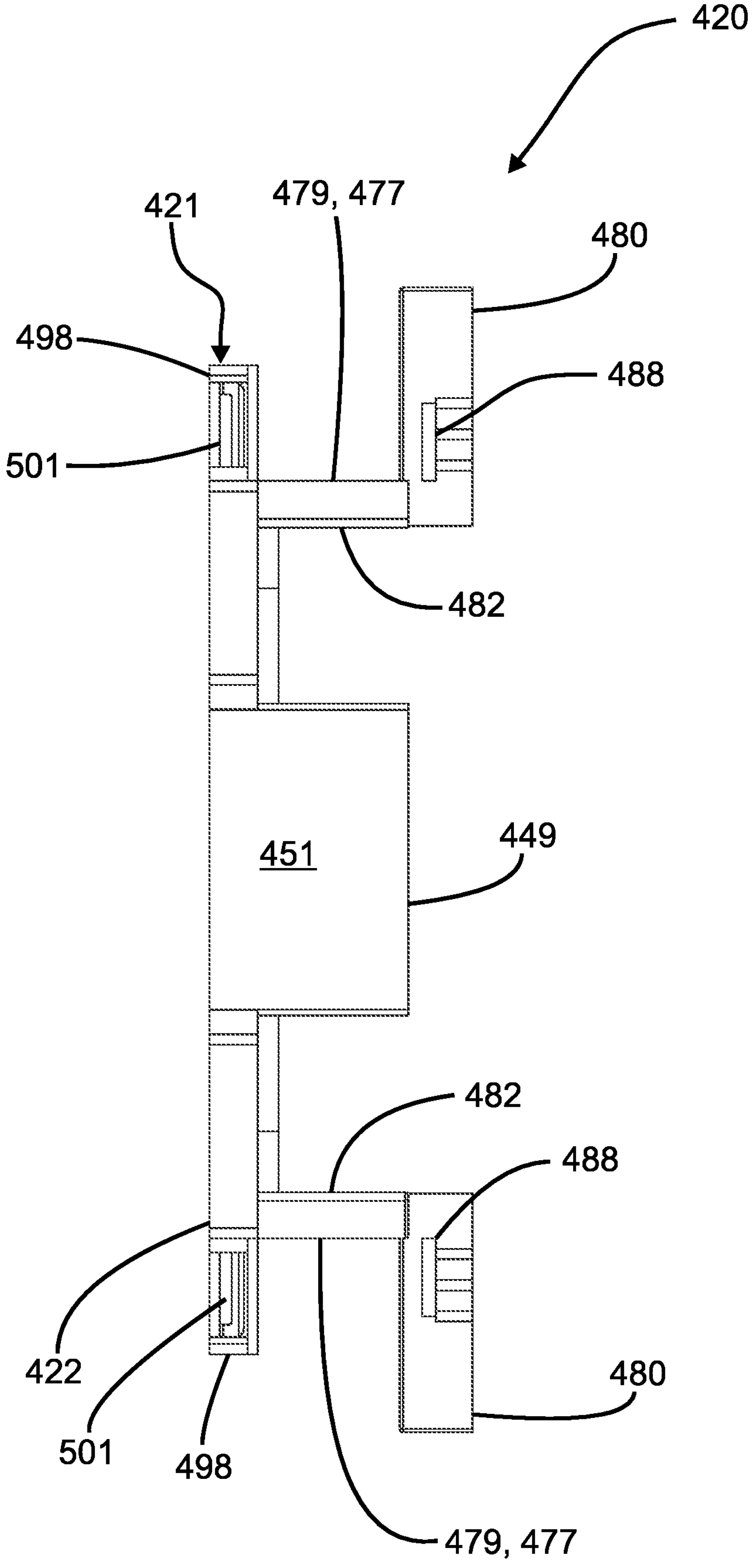
FIG. 24 is a left side view of the enclosure mounting apparatus of FIG. 18.
Figure 25:
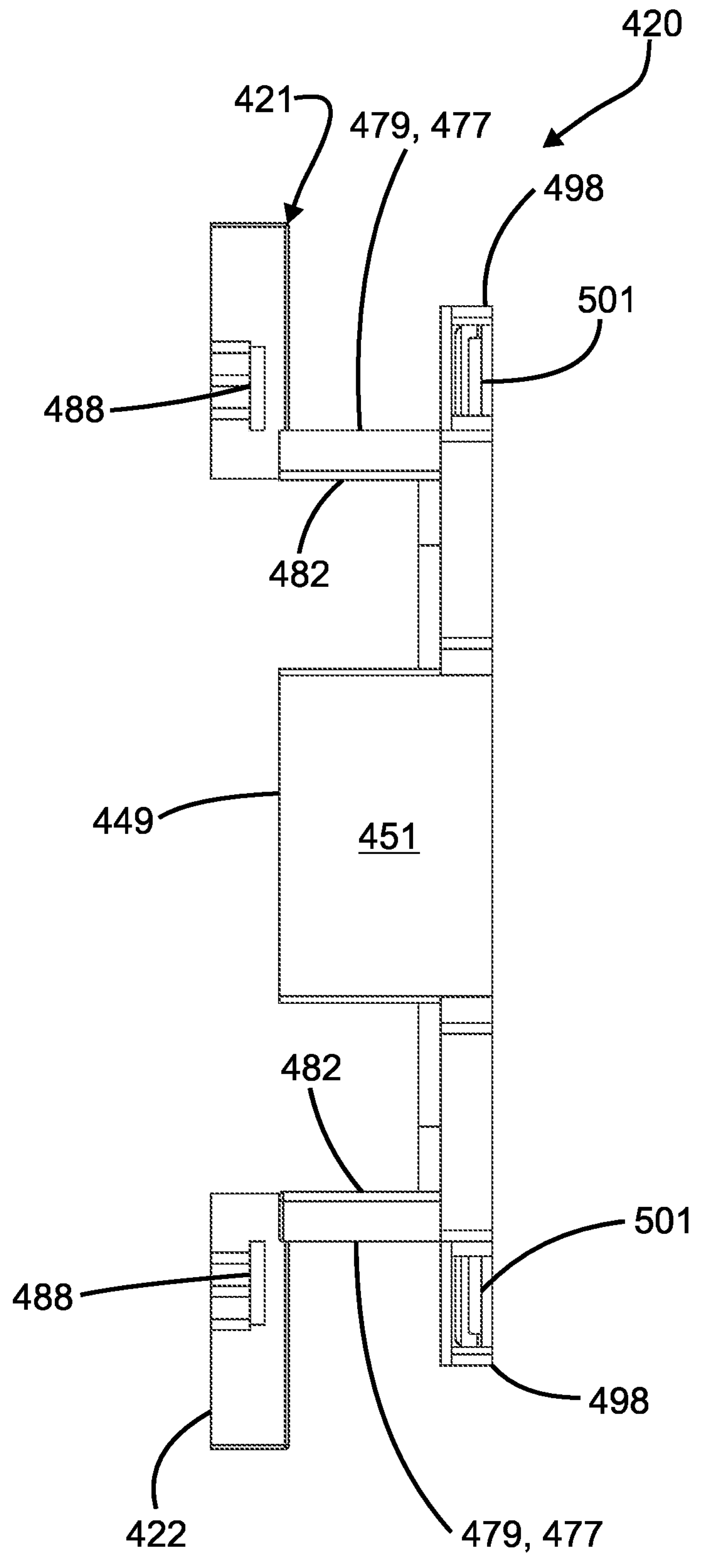
FIG. 25 is a right side view of the enclosure mounting apparatus of FIG. 18.

FIGS. 10-12 depict an alternative enclosure mounting apparatus 120 which does not include unitary rear extensions or mounting flanges. Instead, the enclosure mounting apparatus 120 includes a mounting plate 122 which can be secured directly to a wall or pole or other structure by fasteners installed through mounting openings 186 defined in a front-to-rear direction through the mounting plate 122 itself. It will be appreciated that the mounting plate 122 can be configured to include different sets of fastener openings of the type described above which are adapted to match corresponding hole patterns of different types of telecommunications enclosures. In certain examples, where it is desired to provide coiled cable storage, the mounting plate 122 can be used in combination with a cable spooling bracket 200 (see FIGS. 13 and 14). Details regarding the cable storage bracket 191 are disclosed by PCT international publication number W0 2021/092177 which is hereby incorporated by reference in its entirety.

The cable spooling bracket 200 including a front 202 and a rear 204. The rear 204 is configured for fastening or strapping the cable spooling bracket to a wall or pole (e.g., see fastener openings 206*a*, 206*b* as well as lateral strap openings 208). The cable spooling bracket 200 including a spooling region 210 defined between cable retention flanges 212, 214 spaced apart from one another on the cable spooling bracket in a front-to-rear orientation. The front 202 of the bracket 200 is configured to detachably connect with the mounting plate 122. For example, the front 202 of the cable spooling bracket 200 includes a first mechanical interlock 220 adapted to engage with a second mechanical interlock 230 on the rear side of the mounting plate 122 to secure the mounting plate 122 to the front 202 of the cable spooling bracket 200. The first mechanical interlock 220 includes hooks 222 adapted to interlock with catches 232 of the second mechanical interlock 230. The first mechanical interlock 220 also includes resilient retaining arms 224 between which a rail 234 of the second mechanical interlock 230 is captured to prevent the mounting plate 122 from being slid relative to the bracket 200 to disengage the hooks 222 from being disengaged from the catches 232. By depressing the arms 224, the rail 234 is freed from capture such that the mounting plate 122 can be slid relative to the bracket 200 to disengage the hooks 222 from the catches 232 to release the mounting plate 122 from the bracket 200.

The cable spooling bracket 200 includes a release bar 240 that is slidably movable relative to a main body of the cable spooling bracket 200 from a neutral position to a release position. When the release bar 240 is in the neutral position the first and second mechanical interlocks are prevented from being disengaged from one another (e.g., the retaining arms 224 are in a non-depressed, retaining position). When the release bar 240 is in the release position the first mechanical interlock is moved to a state in which the first and second mechanical interlocks can be disengaged (e.g., the retaining arms 224 are cammed to the depressed state by the release bar 240) to allow the mounting plate to be detached from the front of the cable spooling bracket. The release bar 240 has ends 242, 244 that are accessible through the notches 40 of the mounting plate 122 from the front side of the mounting plate when the mounting plate is secured to the front of the cable spooling bracket 200. By accessing either end 242, 244 of the release bar 240 through the notches 40 the release bar 240 can be moved to the release position.

The mounting plate 122 includes an arrangement cells 300 defined by reinforcing ribs. The cells 300 including first cells 300*a* along a central region 302 of the mounting plate 122 that extends through the waste of the mounting plate 122 and second cells 300*b* at side regions 304 of the mounting plate 122 on opposite sides of the central region 302. The first cells 300*a* having open ends at the front side of the mounting plate and closed ends at the rear side of the mounting plate 122. The second cells 300*b* have open ends at the rear side of the mounting plate and closed ends at the front side of the mounting plate 122.

FIGS. 18-25 depict another enclosure mounting apparatus 420 in accordance with the principles of the present disclosure. The enclosure mounting apparatus 420 includes a mounting bracket 421 having unitary, molded plastic construction. The mounting bracket 421 includes a front 423 (see FIG. 18) and a rear 425 (see FIG. 19). The mounting bracket 421 includes a mounting plate portion 422 at the front 423 of the mounting bracket 421 and mounting flanges 480 (e.g., feet, members, extensions) at the rear 425 of the mounting bracket 421. The mounting bracket 421 also includes offset portions 482 that connect the mounting flanges 480 to the mounting plate portion 422 and that rearwardly offset the mounting flanges 480 relative to the mounting plate portion 422.

The mounting plate portion 422 has a rectangular configuration including first and second opposite sides 432, 434 (e.g., right and left sides) interconnected by third and fourth opposite sides 436, 438 (e.g., top and bottom sides). The mounting plate portion 422 also includes notches 440 at the first and second sides 432, 434. As depicted, the notches 440 are centered along lengths of the first and second sides 432, 434. The notches 440 include notch lengths 441 and notch depths 443. In the depicted example, the notch lengths 441 extend along the lengths of the first and second sides 432, 434 and are each at least 30 percent of the total length of their corresponding side 432, 434. The notch depths 443 extend between open sides 445 and closed sides 447 of the notches 440. Bend control members 449 are provided at and define the closed sides 447 of the notches 440. The cable bend control members 449 project rearwardly from the mounting plate portion 422 and include outwardly facing bend control surfaces 451 that face toward the open sides 445 of the notches 440. In one example, the bend control surfaces 451 have convex curvatures that curve about an axis 452 that extends in a forward-to-rearward direction through a central region of the mounting plate portion 422. Cable tie slots 453 are defined by the mounting plate portions 422 at locations inwardly offset from the bend control members 449. In the depicted example, the cable tie slots 453 extend through the mounting plate portion 422 in a front-to-rear direction.

Figure 5:
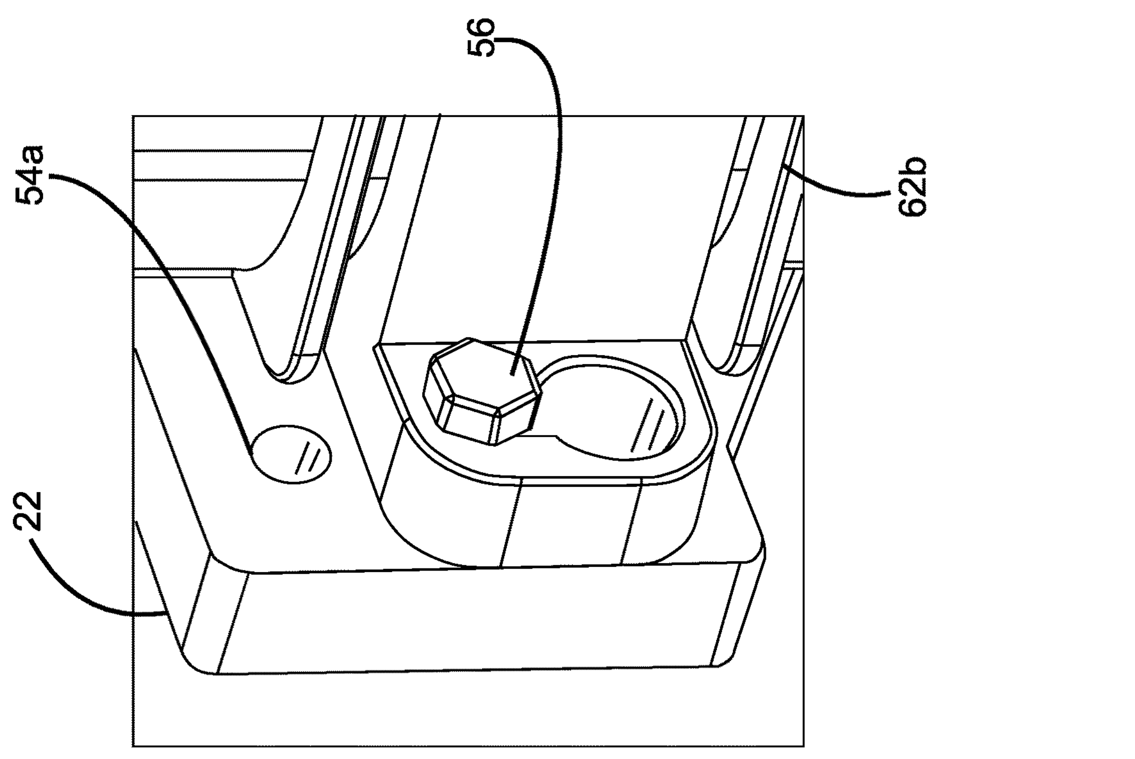
FIG. 5 is an enlarged view showing a fastener depicted as a bolt being used to connect the telecommunications enclosure to the enclosure mounting apparatus.
Figure 26:
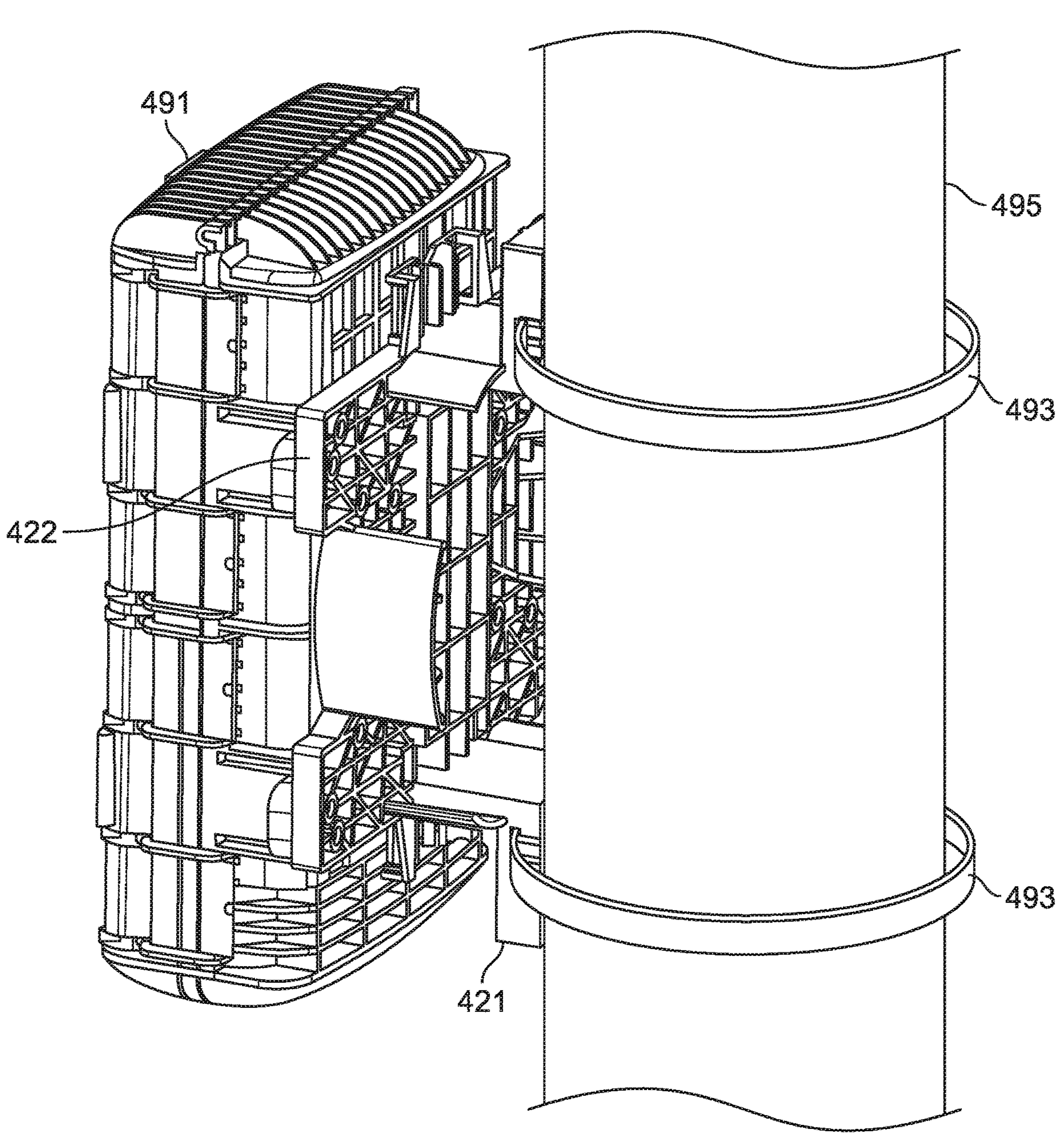
Figure 27:
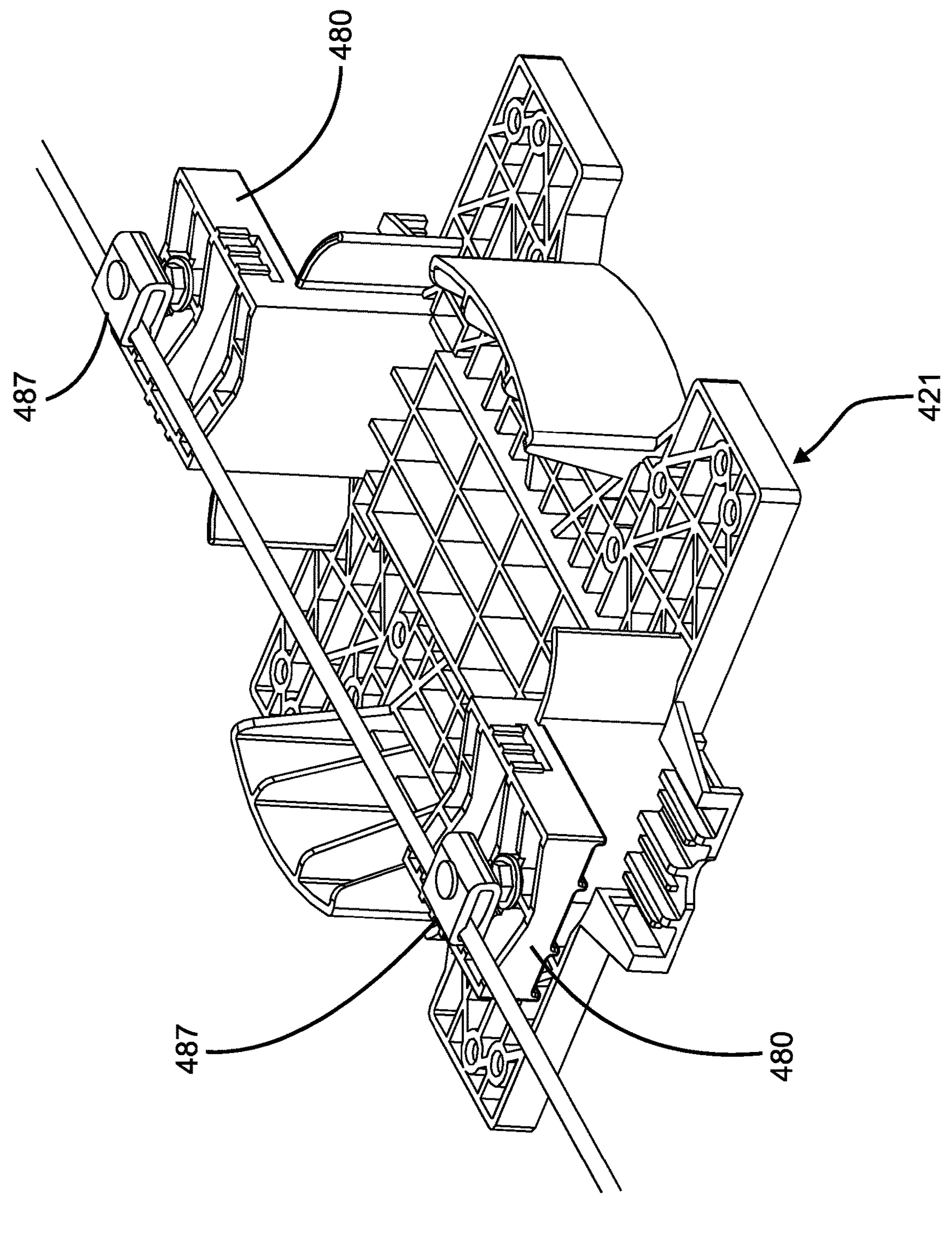
FIG. 27 is a perspective view showing aerial strand clamps secured to the enclosure mounting apparatus of FIG. 18.
Figure 28:
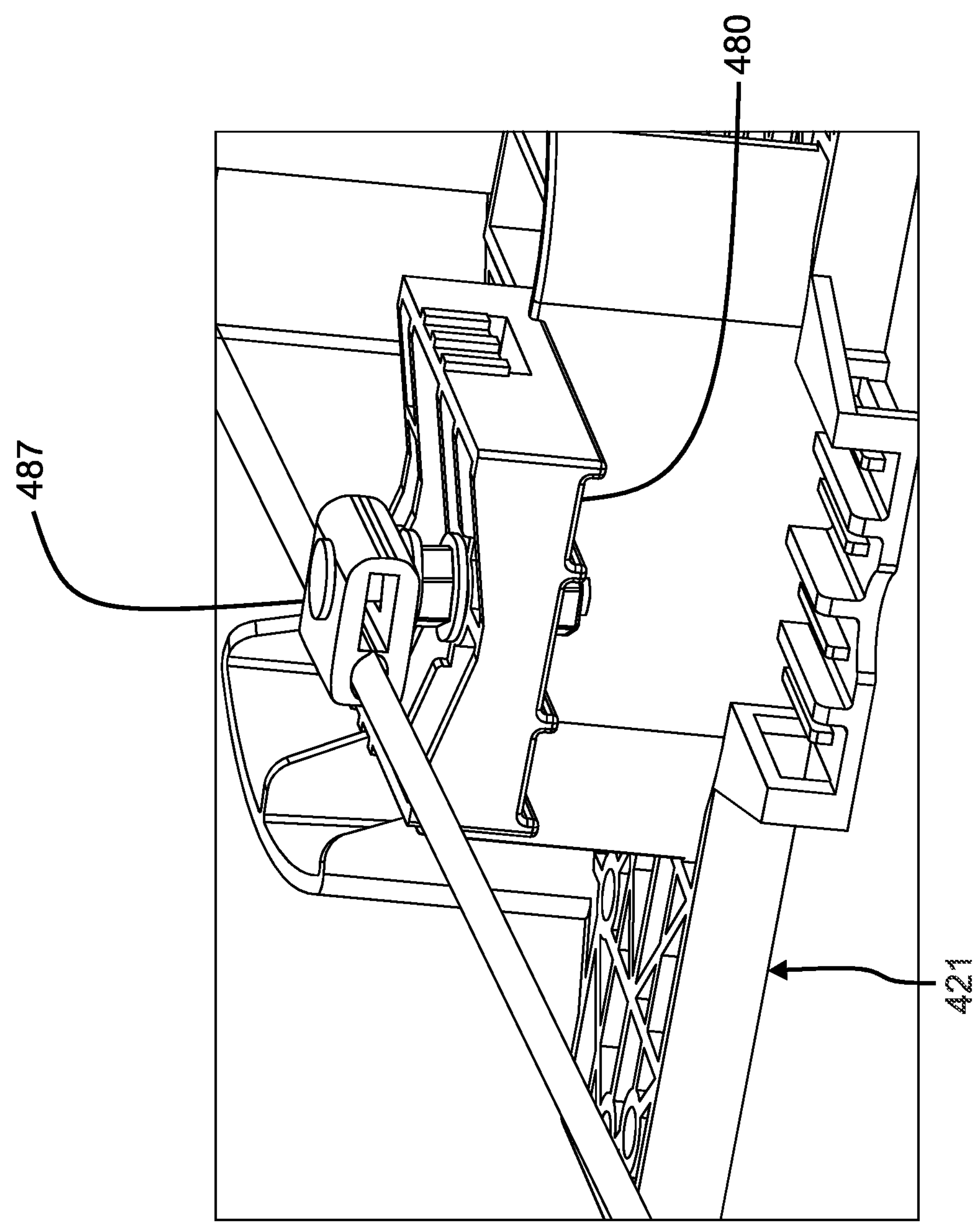
FIG. 28 is an enlarged view showing one of the strand clamps of FIG. 27 secured to the enclosure mounting apparatus.
Figure 29:
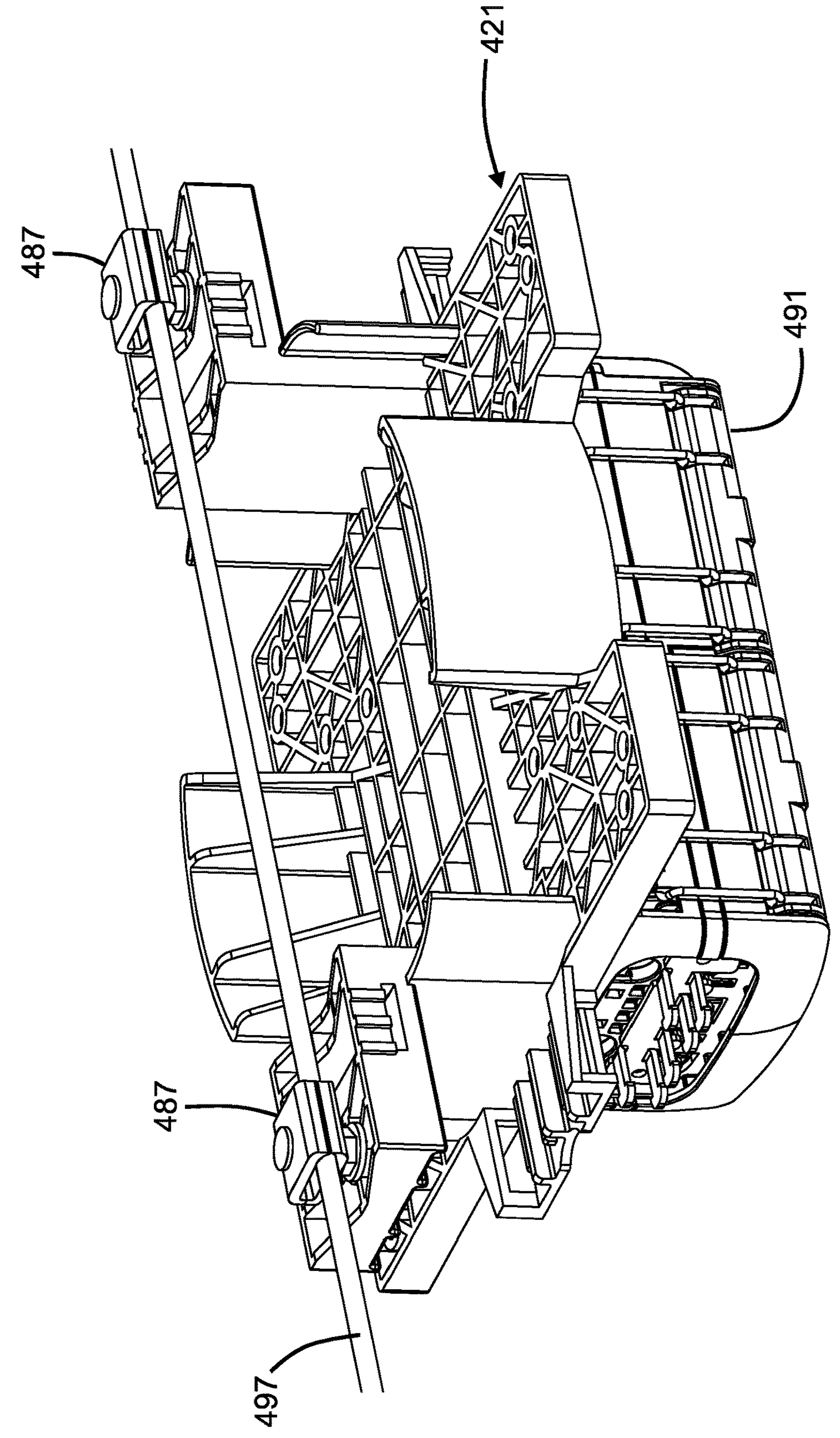
FIG. 29 is a perspective view depicting the enclosure mounting apparatus of FIG. 18 securing a telecommunications enclosure to an aerial strand.

In the depicted example, the mounting flanges 480 are aligned along a centerline 483 of the bracket that bisects the mounting bracket 421. The third and fourth sides 436, 438 of the mounting plate portion 422 extend across the centerline 483 and the first and second sides 432, 434 of the mounting plate portion 422 extend along the centerline 483. The mounting flanges 480 extend outwardly (e.g., upwardly and downwardly) along the centerline 483 beyond portions of the third and fourth sides 436, 438 defined by a main body 485 of the mounting plate portion 422. The mounting flanges 480 define mounting openings 486 that extend through the mounting flanges 480 in the front-to-rear orientation for receiving fasteners (e.g., screws, bolts, nails, etc.) for securing the mounting bracket 421 to a pole or wall. The mounting openings 486 are shown aligned on the centerline 483. The mounting flanges 480 also define lateral strap slots 488 for receiving straps for strapping the mounting bracket 421 to a pole (e.g., see FIG. 26 where a telecommunications enclosure 491 is secured to the mounting plate portion 422 with bolts (e.g., as shown at FIG. 5) and the mounting bracket 421 is secured to a pole 495 by straps 493 routed through the strap slots 488 and around the pole 495). In one example, aerial strand clamps 487 for securing the mounting bracket 421 to an aerial strand can be secured to the rear side of the mounting flanges 480 by fasteners such as bolts that are inserted through and secured within the mounting openings 486 (see FIGS. 27 and 28). The bolts can be secured in the mounting openings 486 with the assistance of nuts threaded on the bolts. The bolts can also be used to tighten clamping of the strand clamps 487 on an aerial strand. FIG. 29 shows the telecommunications enclosure 491 secured to an aerial strand 497 using the mounting bracket 421 equipped with the aerial strand clamps 487 which are shown clamped on the aerial strand 497.

It will be appreciated that the main body 485 of the mounting plate portion 422 can be configured to include different sets of fastener openings 454 which are adapted to match corresponding hole patterns of different types of telecommunications enclosures. In one example, the fastener openings can be arranged in the same four different configurations described with respect to the example of FIG. 1, although others are possible as well. The fastener openings 454 can extend through the mounting plate portion 422 in a front-to-rear orientation. The fastener openings 454 are configured for receiving fasteners used to secure an enclosure to the front side of the mounting plate portion 422. In one example, the fastener openings 454 are defined by internally threaded nuts molded within the mounting plate portion 422 which are adapted to receive fasteners in the form of bolts (e.g., see bolt 56 at FIG. 5).

The mounting plate portion 422 further includes front flanges 498 that project outwardly (e.g., upwardly and downwardly) from the main body 485 of the mounting plate portion 422. In the depicted example, the front flanges 498 are aligned along the centerline 483 and are located at the third and fourth sides 436, 438 of the mounting plate portion 422. In the depicted example, the front flanges 498 are positioned in front of the rear mounting flanges 480. Ends of the front flanges 498 can be notched to facilitate accessing the mounting openings 486 with a tool such as a screwdriver or other driver for driving fasteners through the mounting openings 486. Cable coil containment regions 479 are defined between the front and rear flanges 498, 480 for use in providing containment of excess cable corresponding to an enclosure mounted to the bracket 421. The excess cable can be coiled and stored at a location behind the mounting plate portion 422. The flanges 498, 480 and the offset portions 482 cooperate to define coil receiving channels 477 for receiving the coiled cable. The coil receiving channels 477 are located adjacent top and bottom ends of the mounting bracket 421.

Figure 30:
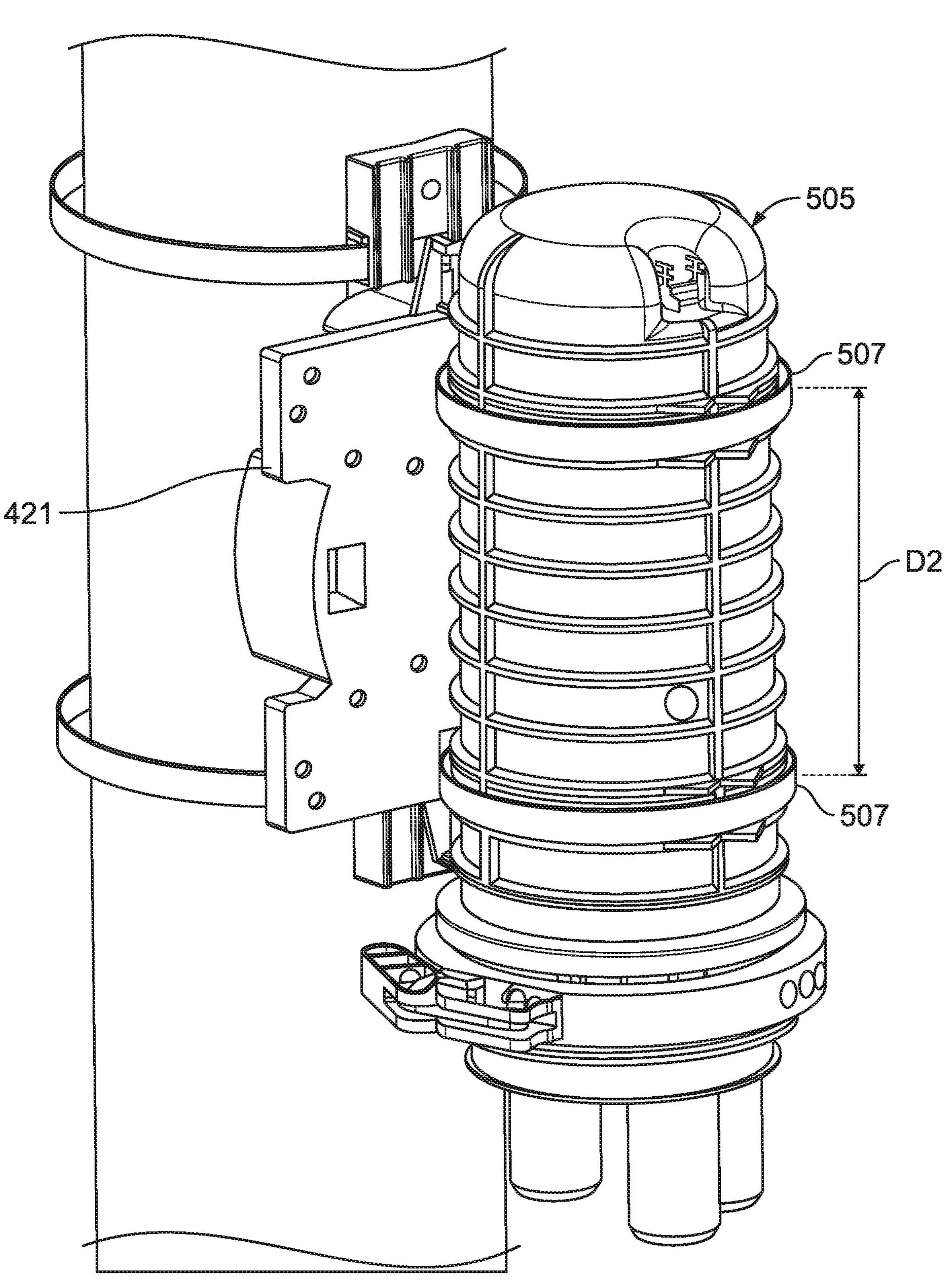
FIG. 30 is a perspective view depicting the enclosure mounting apparatus of FIG. 18 securing a dome-style telecommunications enclosure to a pole.
Figure 31:
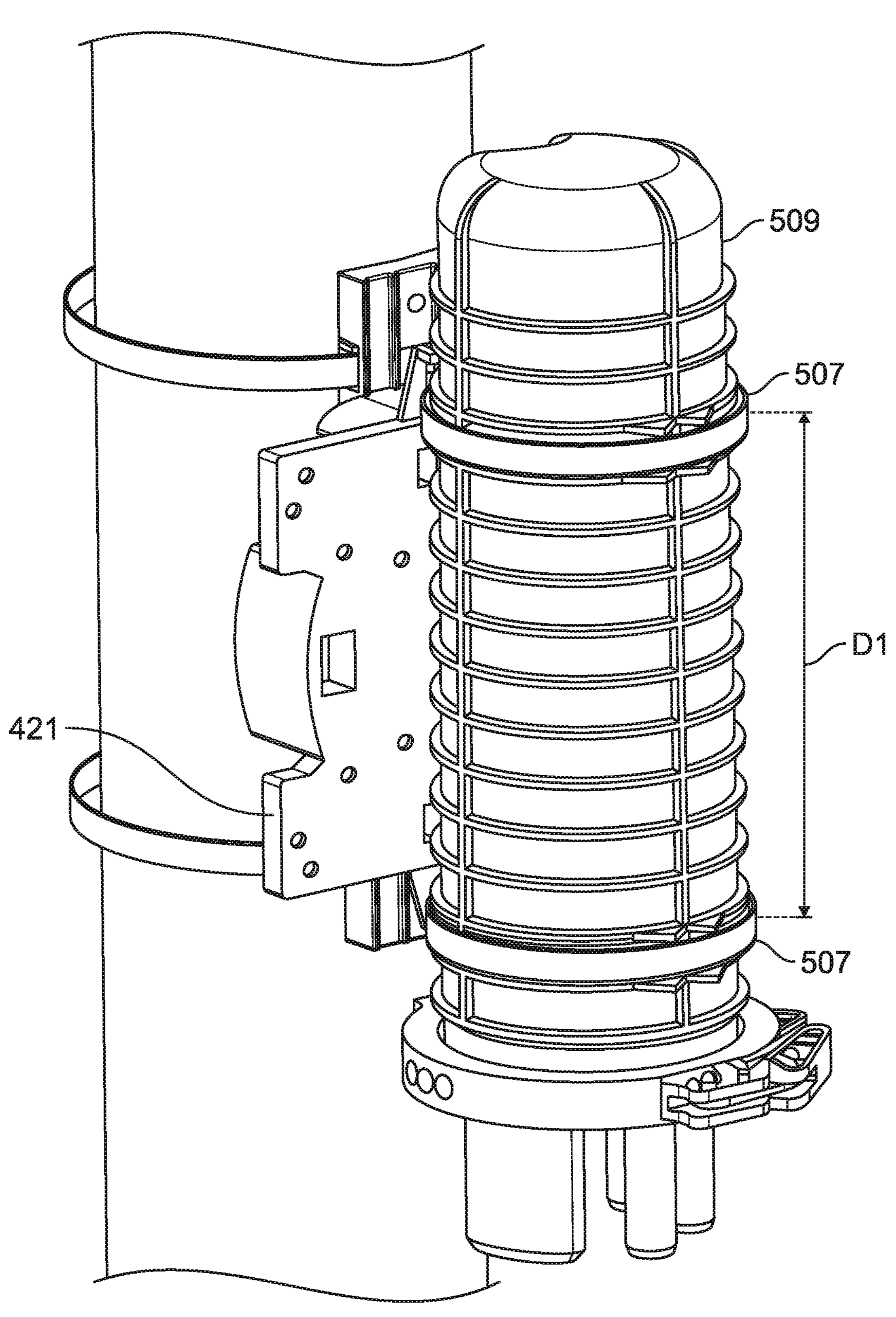
FIG. 31 is a perspective view depicting the enclosure mounting apparatus of FIG. 18 securing another dome-style telecommunications enclosure to a pole.
Figure 32:
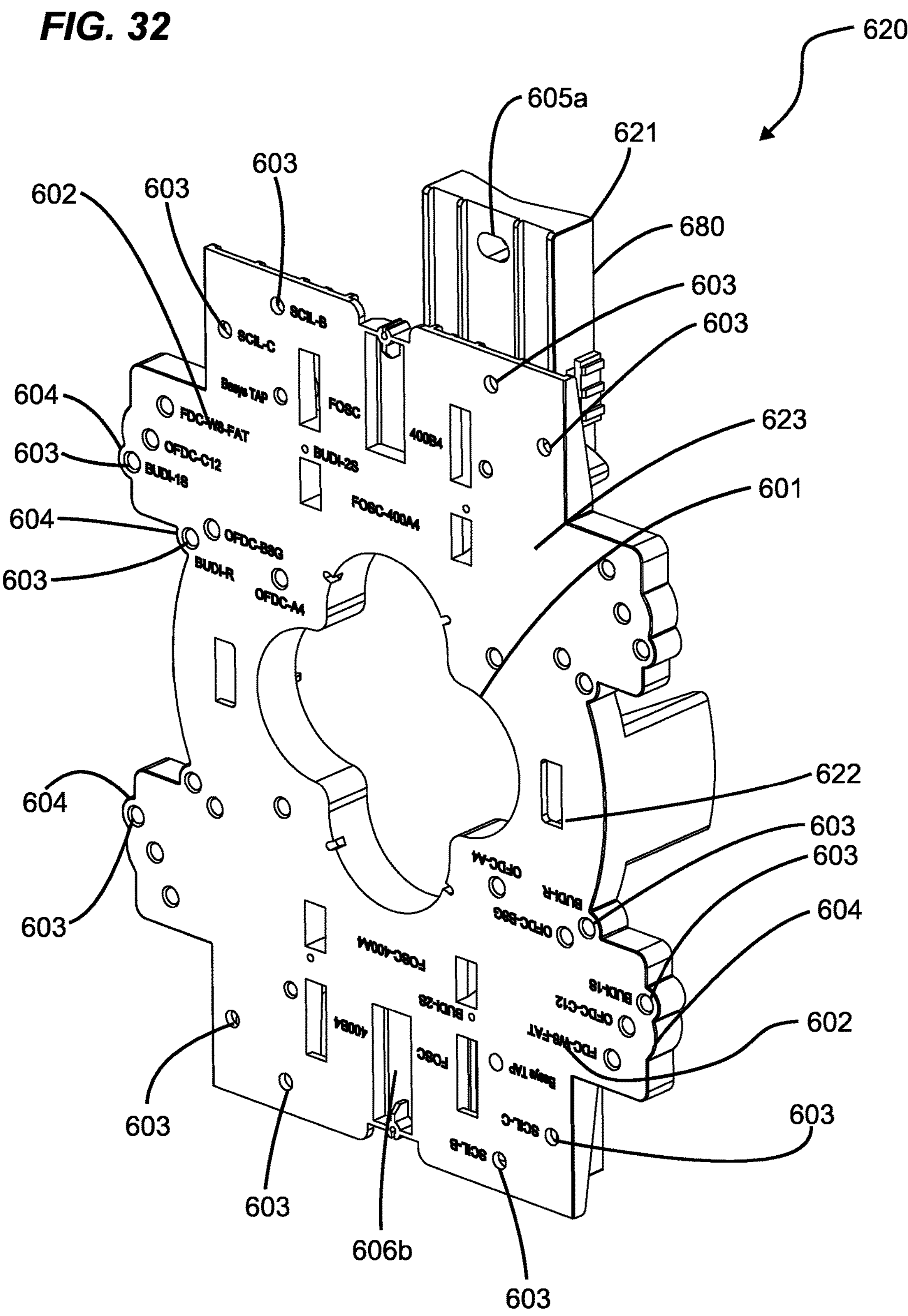
FIG. 32 is a front perspective view of another enclosure mounting apparatus in accordance with the principles of the present disclosure.

Certain types of telecommunications enclosures (e.g., box style enclosures) are best secured to the mounting plate portion 422 of the bracket 421 using fasteners such as bolts secured within the predefined fastener openings. However, other types of telecommunications enclosures (e.g., dome-style enclosures) are best secured to the mounting plate portion 422 using straps. To accommodate these types of enclosures, the mounting plate portion 422 is also configured to include strap slots for allowing enclosures such as dome-style enclosures to be strapped to the front of the mounting plate portion 422. In the depicted example, a first set of strap slots are defined through the front flanges 498 of the mounting plate portion 422 and a second set of strap slots are defined through the main body 485 of the mounting plate portion 422. The first set of straps slots includes a pair of laterally spaced-apart strap slots 501 defined through each of the front flanges 498. The second set of strap slots includes first pair of laterally space-apart strap slots 503 defined by the main body 485 adjacent the third side 436 of the mounting plate portion 422 and a second pair of laterally space-apart strap slots 503 defined by the main body 485 adjacent the fourth side 436 of the mounting plate portion 422. The upper and lower pairs of straps slots 501 are separated by a distance D1 along the centerline 483 and the upper and lower pairs of strap slots 503 are separated by a distance D2 along the centerline 483. The distance D1 is longer than the distance D2. FIG. 30 shows a dome-style closure 505 secured to the mounting plate portion 422 using straps 507 routed through the strap slots 503. FIG. 31 shows a dome-style closure 509 secured to the mounting plate portion 422 using straps 507 routed through the strap slots 501. It will be appreciated that the strap slots 501 can be suited for securing a taller dome-style enclosure to the mounting plate portion 422, while the strap slots 503 can be suited for securing a shorter dome-style enclosure to the mounting plate portion 422.

The depicted mounting bracket 421 includes cable spool structure 455 integrated with the rear side of the mounting plate portion 422 for facilitating storing excess cable corresponding to an enclosure mounted to the front of the mounting bracket 421 in a coiled/spooled state behind the mounting plate portion 422. The cable spool structure 455 defines a cable storage loop/coiling path at the rear of the mounting plate portion 422. The cable spool structure 455 is defined in part by the cable bend control members 449 and by the offset portions 482. The offset portions 482 can include integrated bend control members 510 having outwardly facing bend control surfaces 512 that are preferably convex and that curve about the central axis 452. In certain examples, the bend control surfaces 451 of the bend control members 449, the bend control surfaces 512 of the bend control members 510, and portions of the offset portions 582 cooperate to define a loop/coiling path 600 for storing excess cable in a coil behind the mounting plate portion 422. It will be appreciated that the coiled cable is also contained within the coil receiving channels 477 defined between the front and rear flanges 498, 480 of the bracket 421. The cable tie slots 453 allow the coiled cable which is coiled about the cable spool structure 455 behind the mounting plate portion 422 to be secured to the bracket 421 with cable ties. The cable ties can be routed through the cable ties slots 453 and around the cable bend control members 449 and the cable supported on the bend control surfaces 451 of the cable bend control member 449 such that the cable coil is tied (e.g., strapped) to the cable bend control members 449.

FIGS. 32-39 depict another enclosure mounting apparatus 620 in accordance with the principles of the present disclosure. The enclosure mounting apparatus 620 includes a mounting bracket 621 having unitary, molded plastic construction. The mounting bracket 621 includes a front 623

Figure 33:
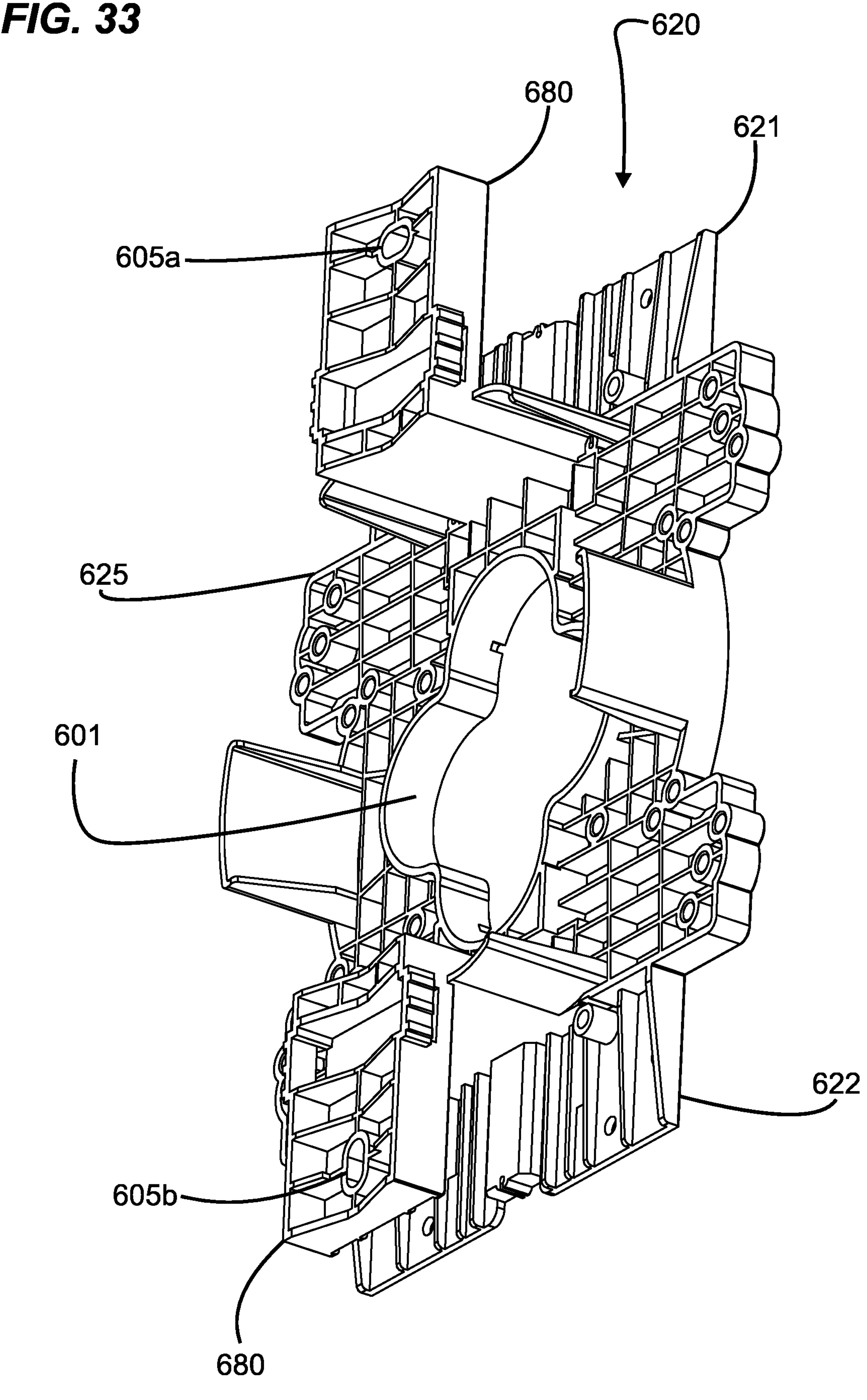
FIG. 33 is a rear perspective view of the enclosure mounting apparatus of FIG. 32.
Figure 34:
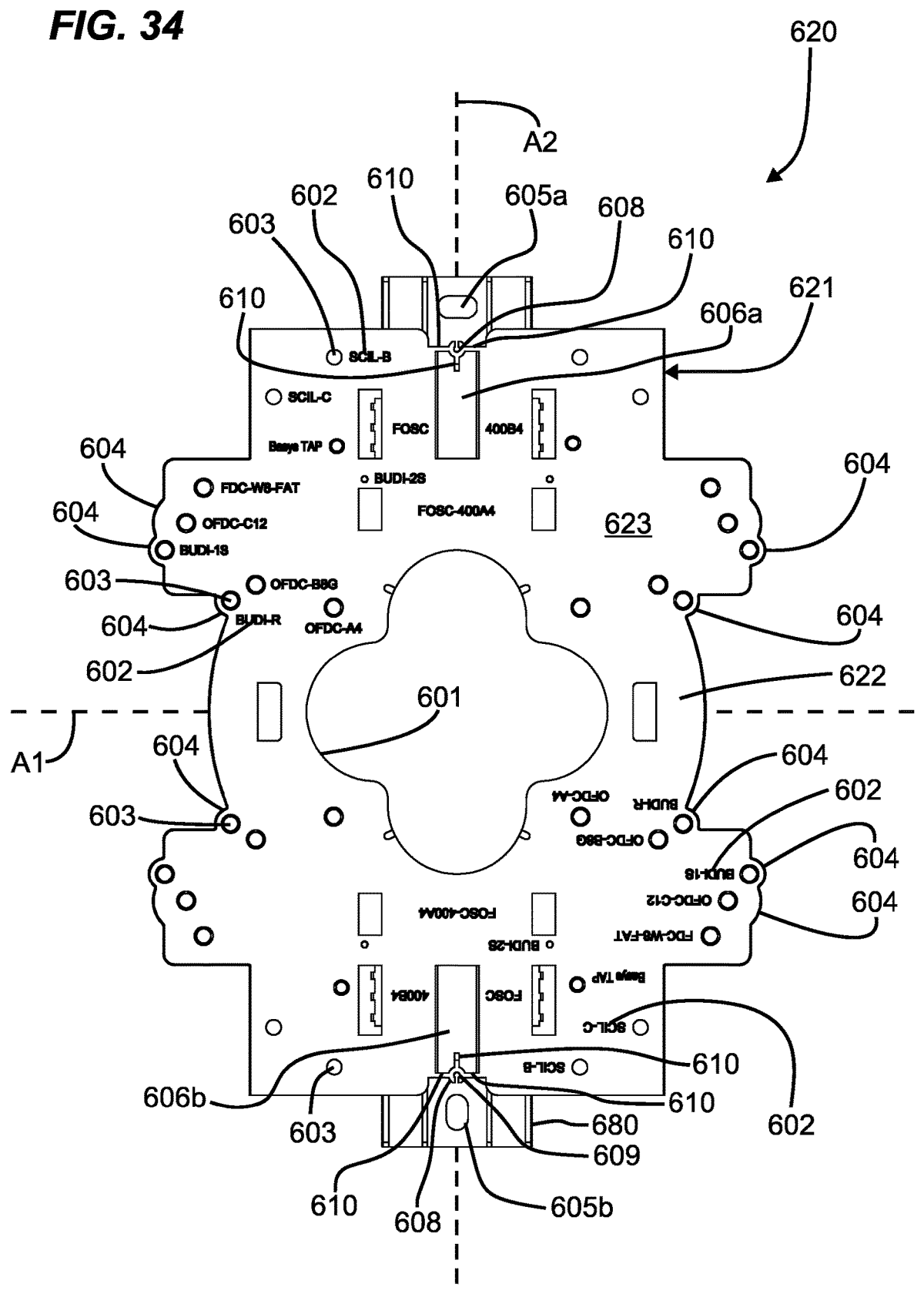
Figure 35:
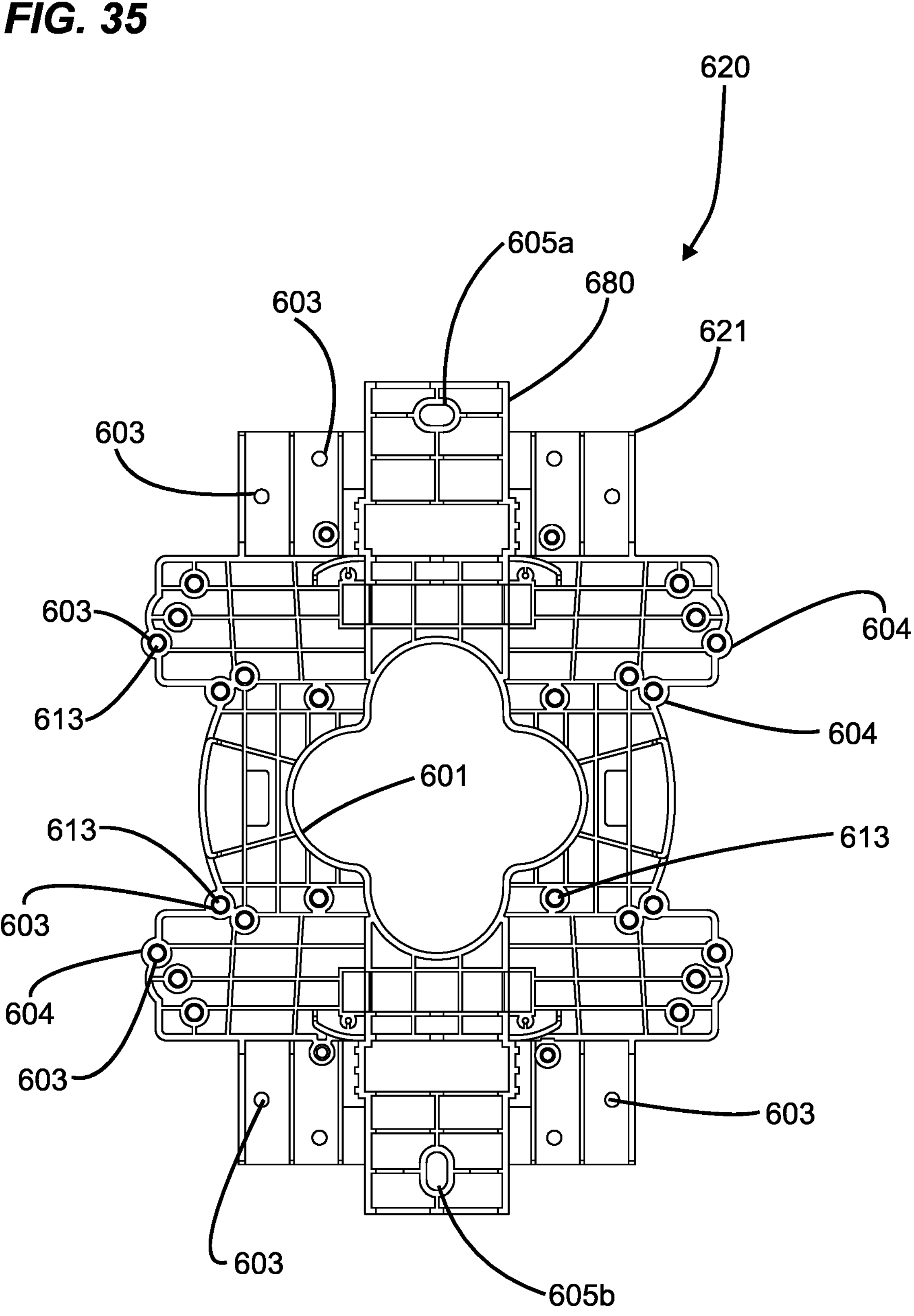
FIG. 35 is a rear view of the enclosure mounting apparatus of FIG. 32.
Figure 36:
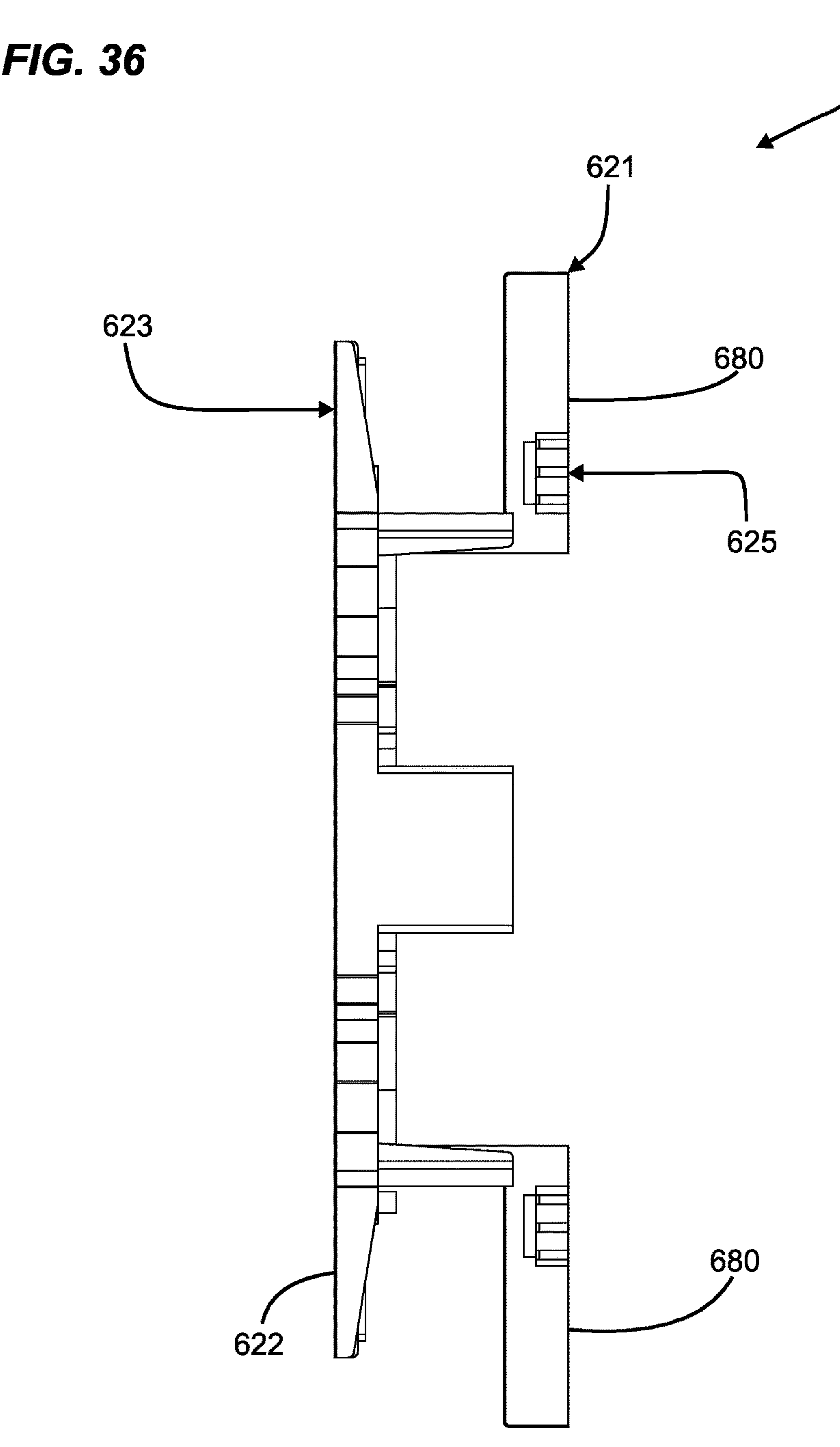
FIG. 36 is a right side view of the enclosure mounting apparatus of FIG. 32.
Figure 37:
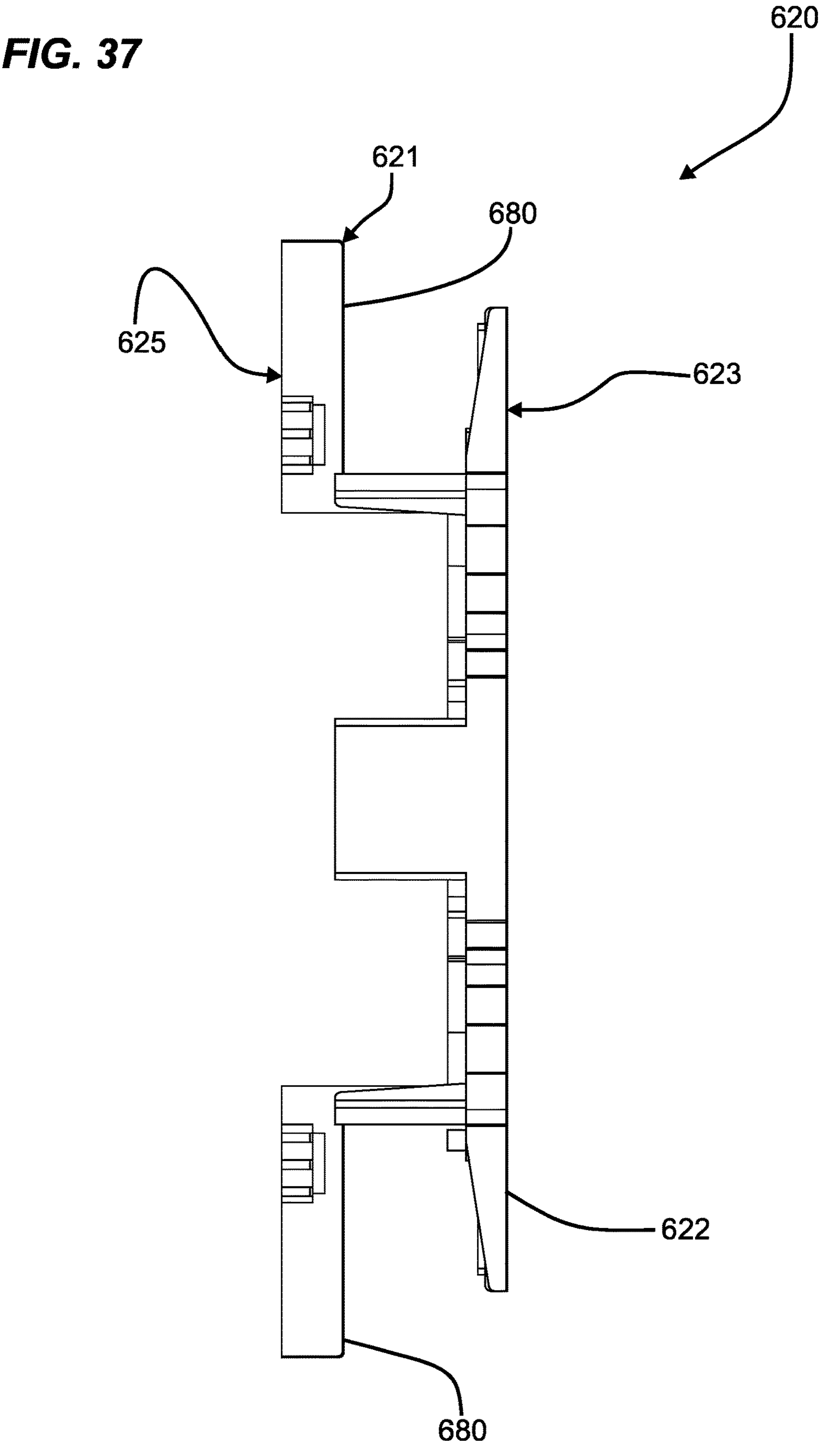
FIG. 37 is a left side view of the enclosure mounting apparatus of FIG. 32.
Figures 38, 39:
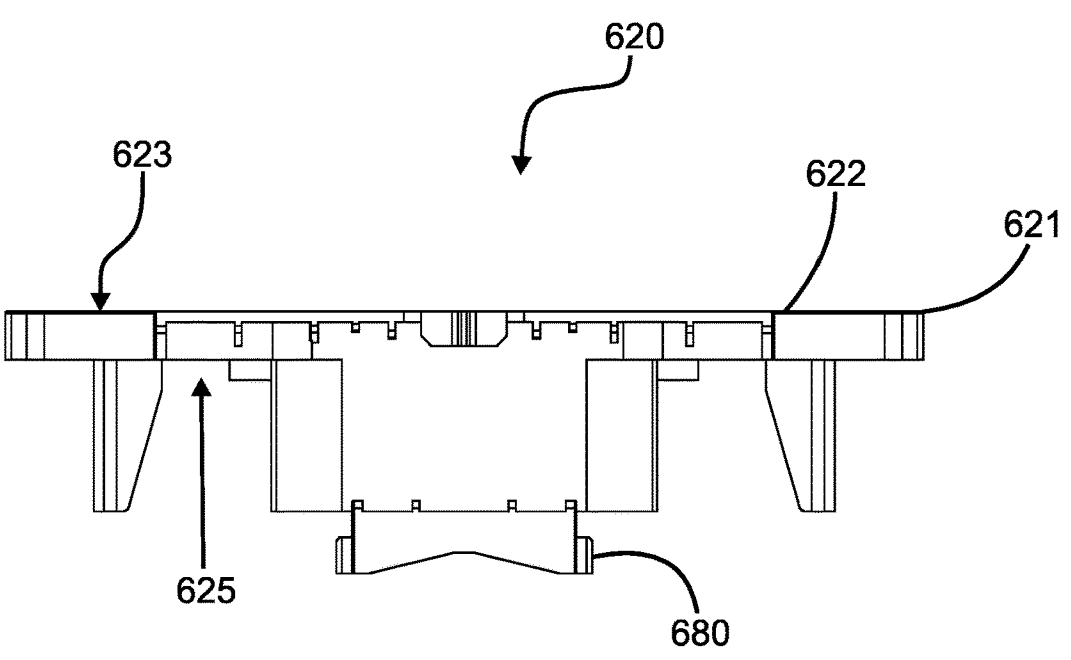
FIG. 38 is a top view of the enclosure mounting apparatus of FIG. 32.
FIG. 39 is a bottom view of the enclosure mounting apparatus of FIG. 32.

(see FIGS. 32 and 34) and a rear 625 (see FIGS. 33 and 35). The mounting bracket 621 includes a mounting plate portion 622 at the front 623 of the mounting bracket 621 and mounting flanges 680 (e.g., feet, members, extensions) at the rear 625 of the mounting bracket 621. The mounting bracket 621 also includes offset portions 682 that connect the mounting flanges 680 to the mounting plate portion 622 and that rearwardly offset the mounting flanges 680 relative to the mounting plate portion 622.

It will be appreciated that the enclosure mounting apparatus 620 has many similar features present in the enclosure mounting apparatus 420 which has been previously described, and such previous descriptions apply as well to the enclosure mounting apparatus 620. The enclosure mounting apparatus 620 has been modified from the enclosure mounting apparatus 420 to include a central opening 601 through the mounting plate portion 622. In one example, the central opening 601 is a lobed opening. In one example, the central opening 601 includes four lobes and is symmetric with respect to minor and major axes A1 and A2 of the enclosure mounting apparatus 620. The enclosure mounting apparatus 620 also has been modified from the enclosure mounting apparatus 420 to include labeling 602 for identifying which mounting features correspond to which type (e.g., size, model, style) of enclosure. It will be appreciated that the labeling 602 can be provided on the mounting plate portion 622 by any number of different techniques (e.g., printing, stickers, embossing, stamping, molding into the mounting plate portion 622, etc.). The enclosure mounting apparatus 20) 620 also has been modified from the enclosure mounting apparatus 420 to include additional enclosure mounting openings 603 for attaching still additional types of enclosures to the mounting plate portion 622. In one example, some of the openings 603 are not provided with internally threaded fittings (e.g., internally threaded metal inserts 613) and are configured for allowing fasteners such as bolts to be inserted 25 through the openings 603 from the rear of the mounting plate portion 622 and threaded into an enclosure desired to be mounted at the front of the mounting plate portion 622. In certain examples, an exterior perimeter of the mounting plate portion 622 includes sections 604 that are curved (e.g., radiused) about certain ones of the openings 603. Additionally, the enclosure mounting apparatus 620 has been modified from the 30 enclosure mounting apparatus 420 to include elongate fastener openings 605*a*, 605*b* through the mounting flanges 680. The fastener opening 605*a* is elongate in a horizontal direction and the fastener opening 605*b* is elongate in the vertical direction. The enclosure mounting apparatus 620 has been modified from the enclosure mounting apparatus 420 to include elongate recesses 606*a*, 606*b* defined at the front of the mounting plate portion 622. The elongate recesses 606*a*, 606*b* are aligned along the major axis A2 with the recess 606*a* being located at an upper region of the mounting plate portion 622 and the recess 606*b* being located at a lower region of the mounting plate portion 622. Bosses 608 can be provided at the recesses 606*a*, 606*b*. The bosses 608 defined central openings 609. Ribs 610 project radially from the bosses 608. As depicted, the ribs include a central rib aligned along the major axis A2 and two side ribs oriented perpendicular with respect to the major axis A2 that project from opposite sides of each boss 608.

Figure 40:
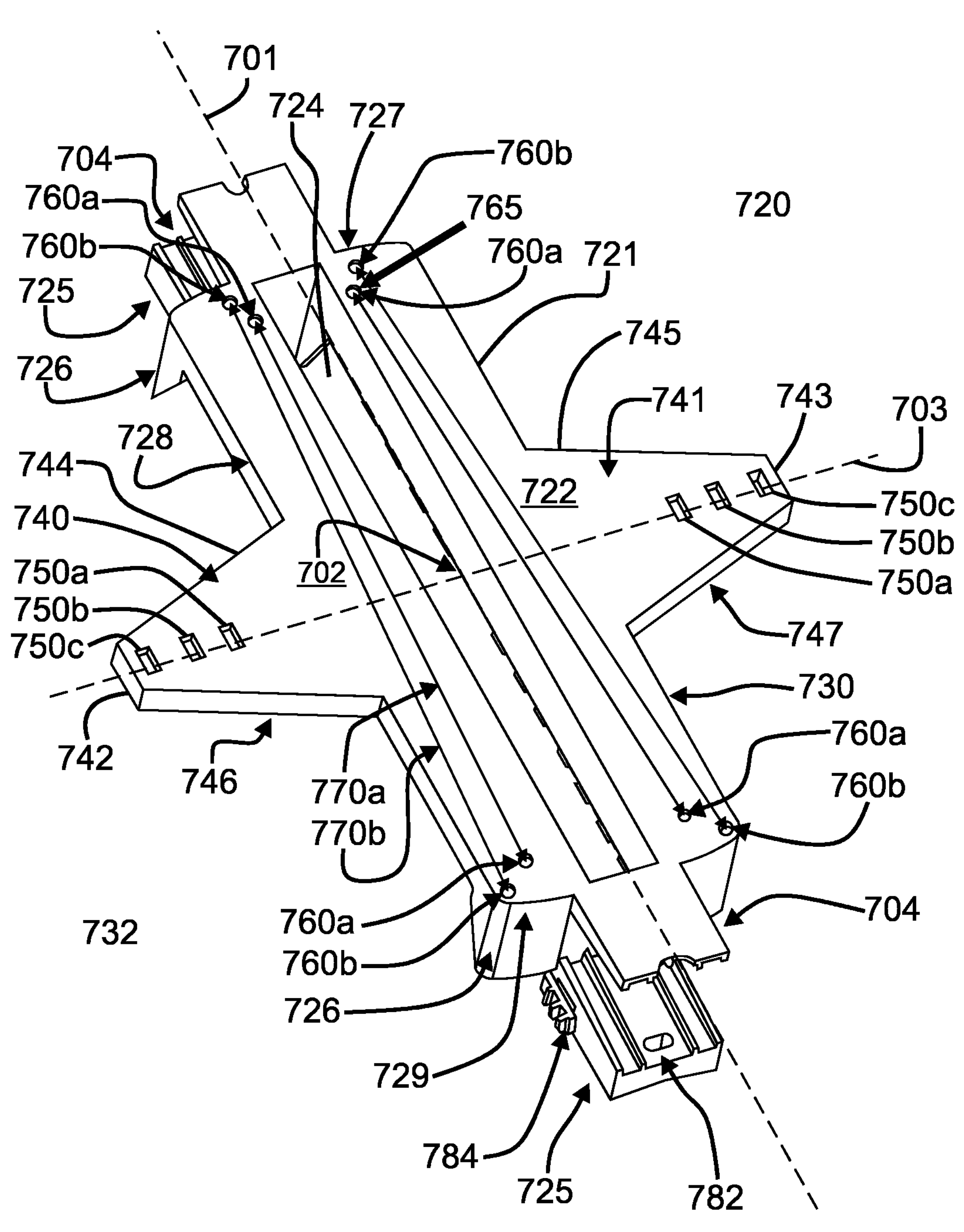
FIG. 40 is a front perspective view of another enclosure mounting apparatus in accordance with the principles of the present disclosure.
Figure 41:
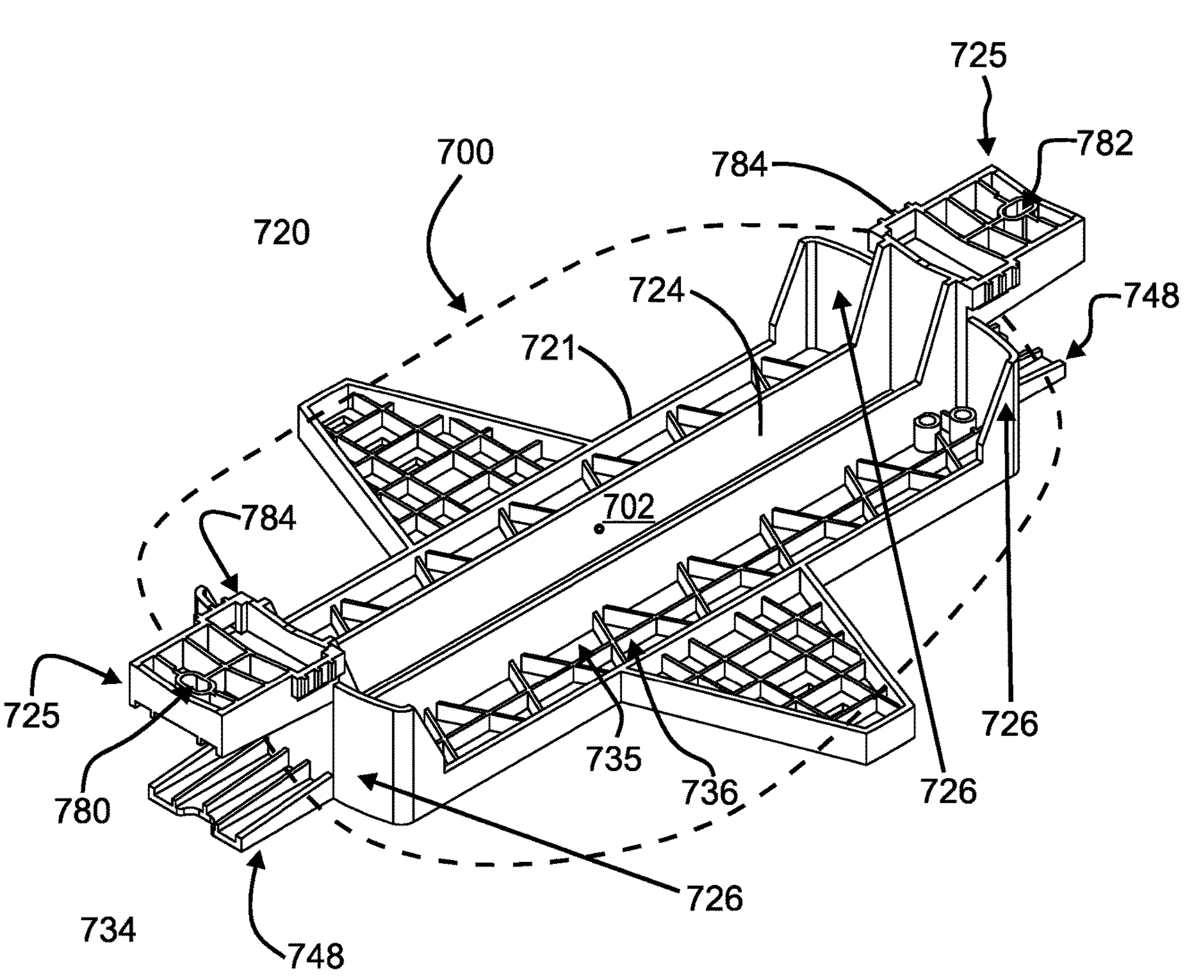
FIG. 41 is a rear perspective view of the of the enclosure mounting apparatus of FIG. 40.

FIGS. 40 and 41 depict another enclosure mounting apparatus 720 in accordance with the principles of the present disclosure. The mounting apparatus 720 includes a mounting bracket 721 having unitary, molded plastic construction. The mounting bracket 721 includes a front 732 (see FIG. 40) and a rear 734 (see FIG. 41). The mounting bracket 721 includes a mounting plate 722 on at the front 732 of the mounting bracket 721. The mounting plate 722 has an approximately rectangular configuration defined by first and second opposite sides 727, 729 (e.g., top and bottom sides) and third and fourth opposite sides 728,730 (e.g., left and right sides). Flanges 748 project outwards (e.g., upwards and downwards) from opposites sides 727, 729 along centerline 701. The mounting plate 722 includes an arrangement of cells 735 defined by reinforcing ribs 736.

It will be appreciated that mounting plate 722 can configured to include different sets of fastener openings 760*a* and 760*b* which are adapted to match corresponding hole patterns on different types of telecommunications enclosures. Fastener openings 760*a* define a configuration 770*a* which matches the corresponding hole patterns on certain types of telecommunications enclosures (see FIG. 42 where mounting bracket 721 is secured to a pole and configuration 770*a* is being utilized to mount telecommunications enclosure 790). Fastener openings 760*b* define a configuration 770*b* which matches the corresponding hole patterns on certain different types of telecommunications enclosures (see FIG. 43 where mounting bracket 721 is secured to a pole and configuration 770*b* is being utilized to mount telecommunications enclosure 792). In one example fastener opening include threaded metal inserts 765 to aid in securing different telecommunications enclosures to the mounting bracket 721.

Enclosure mounting apparatus 720 includes a central opening 724 through the mounting plate 722. In one example, the central opening 724 is a rectangular opening which runs lengthwise along centerline 701 from side 727 to side 729, midway between sides 728 and 730. In one example, the central opening 724 has a length that extends along at least 75 percent of a length of a main body of the mounting plate 772 and a width that extends along less than 50 percent of a width of the main body of the mounting plate 772.

The mounting bracket 721 also includes mounting flanges 725 at the rear 734 of mounting bracket 721. The mounting bracket 721 also includes offset portions 726 that connect the mounting flanges 725 to the mounting plate 722 and that rearwardly offset the mounting flanges 725 relative to the mounting plate 722. Mounting flanges 725 extend outwardly (e.g., upwardly and downwardly) along centerline 701. Mounting flanges 725 define elongated mounting openings 780, 782 that extend through the mounting flanges 725 in a front-to-rear orientation for receiving fasteners (e.g., screws, bolts, nails, etc.) for securing the mounting bracket 721 to a pole or wall. Mounting opening 780 is elongate in a vertical direction while mounting opening 782 is elongate in a horizontal direction. Mounting openings 780, 782 are aligned along centerline 701.

Figure 42:
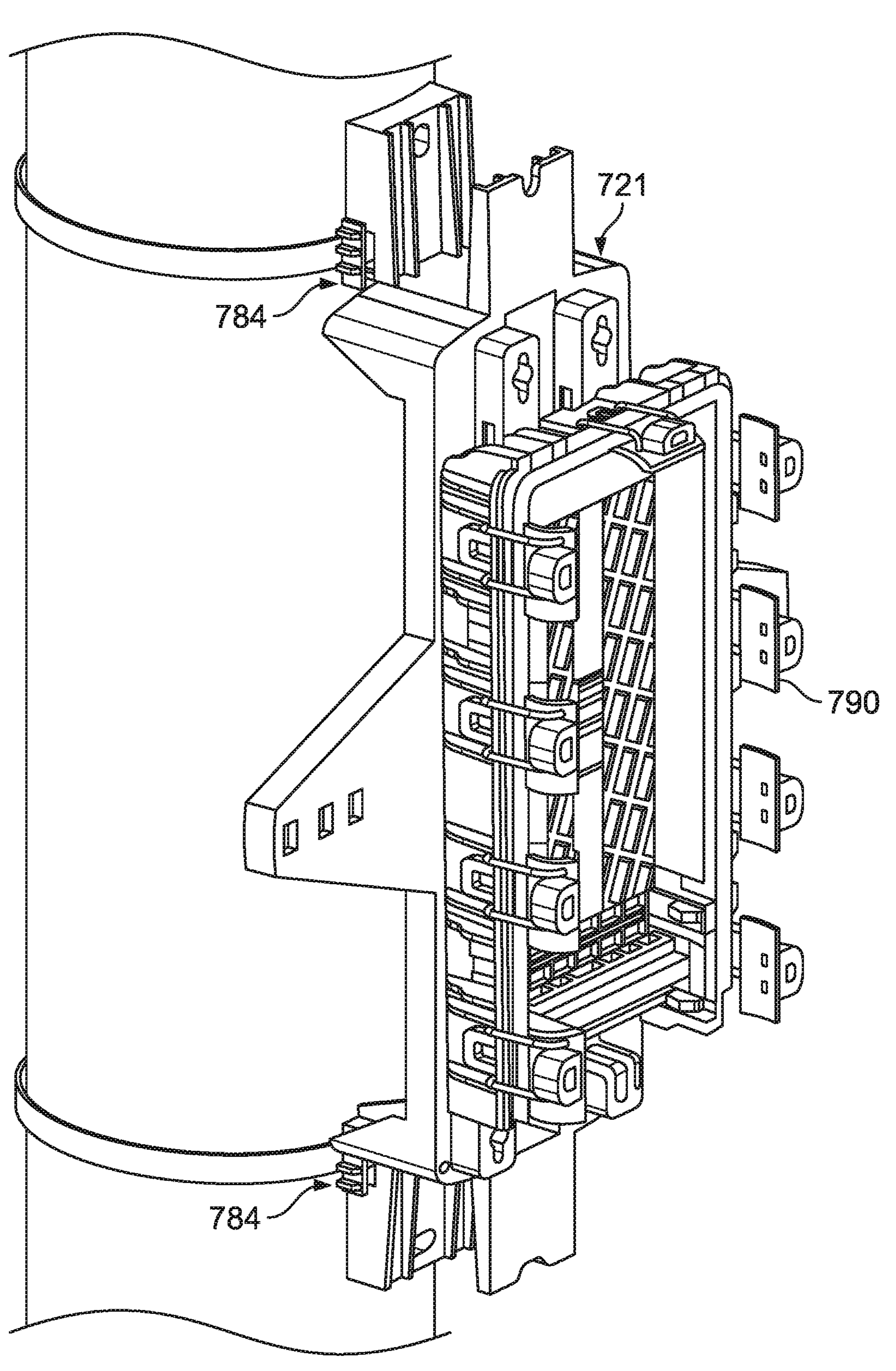
FIG. 42 depicts the enclosure mounting apparatus of FIG. 40 being used to connect a telecommunications enclosure to a pole via straps.
Figure 43:
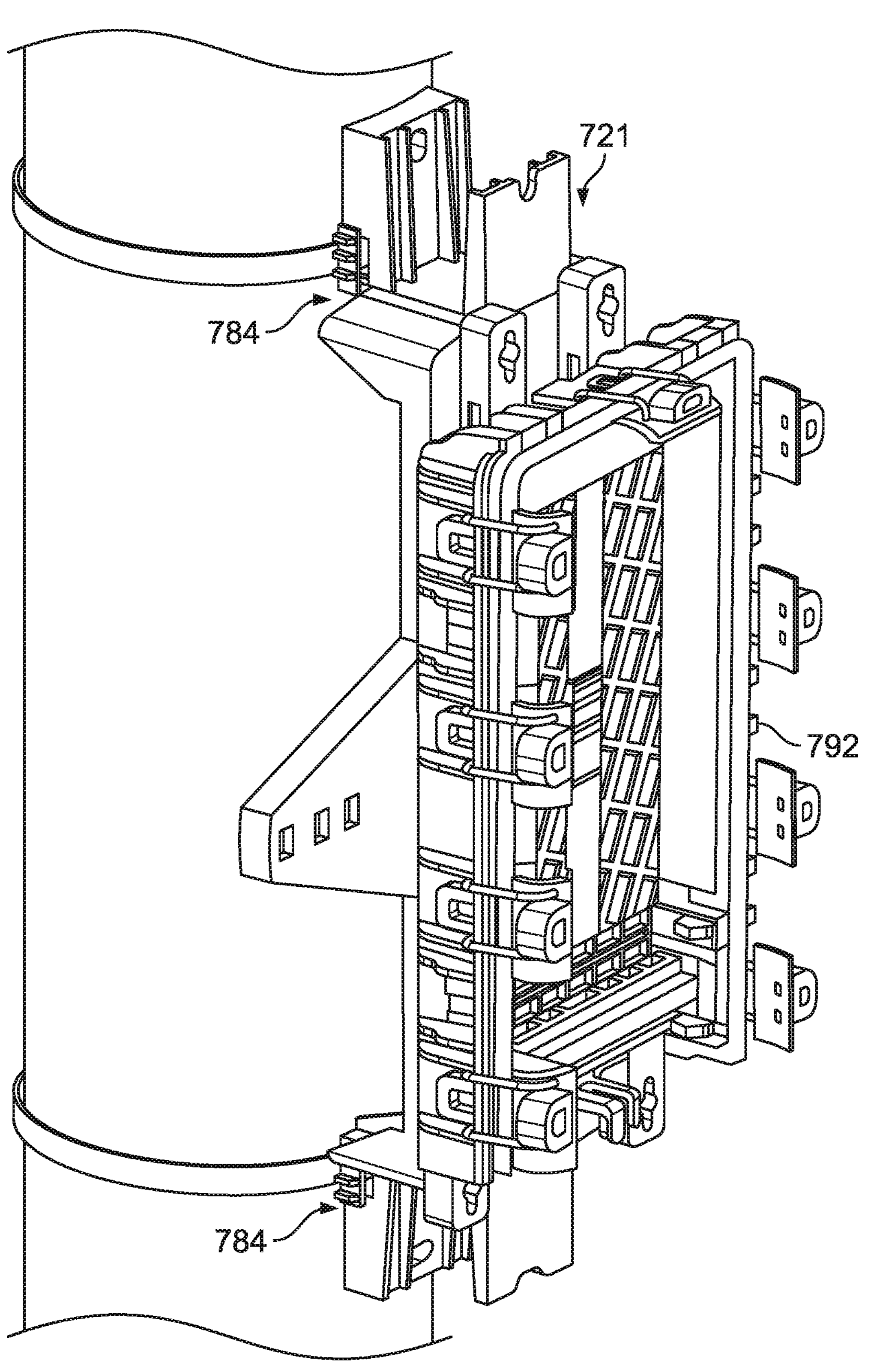
FIG. 43 depicts the enclosure mounting apparatus of FIG. 40 being used to connect a second telecommunications enclosure to a pole via straps.
Figure 45:
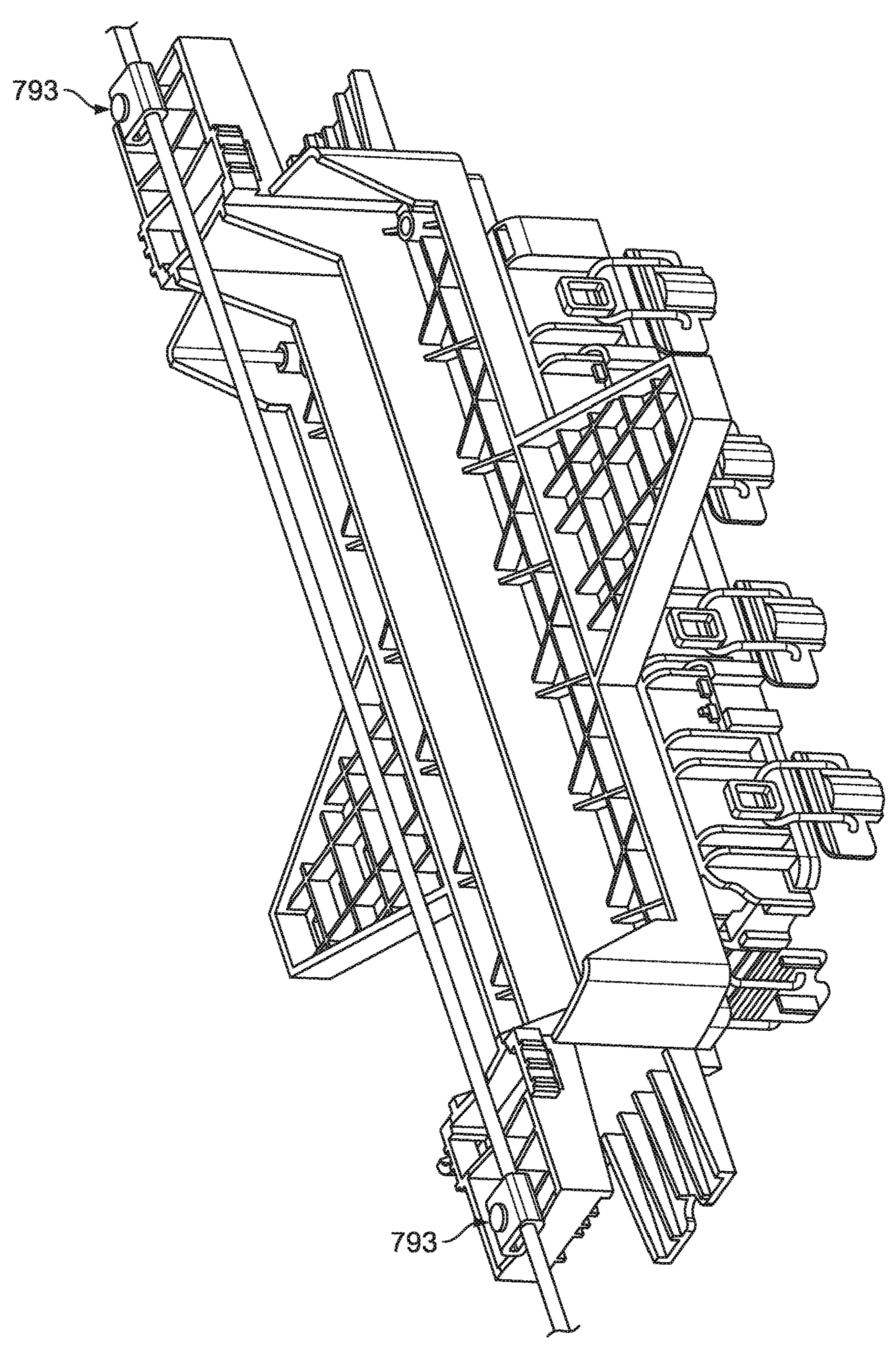
FIG. 45 depicts the enclosure mounting apparatus of FIG. 40 being used to connect a telecommunications enclosure to an ariel strand via ariel strand clamps.

Additionally, mounting flanges 725 define lateral strap slots 784 for receiving straps for strapping the mounting bracket 721 to a pole (see FIGS. 42 and 43). In one example aerial strand clamps 793 for securing the mounting bracket 721 to an aerial strand can be secured in mounting openings 780, 782 by fasteners such as bolts that are inserted through and secured with in mounting opening 780, 782 (see FIG. 45).

Offset portions 726 are connected to the mounting plate 722 at sides 727, 729 and have surfaces that are convex and that curve about central axis 702 to allow cable to be coiled along loop/coiling path 700. Coil receiving channels 704 are present at the top and bottom of loop/coiling path 700 and are defined in the front by flanges 748 and in the back by mounting flanges 725. Looped cable being stored on mounting bracket 721 can be routed between flanges 748 and mounting flanges 725 within coil receiving channel 704.

Figure 44:
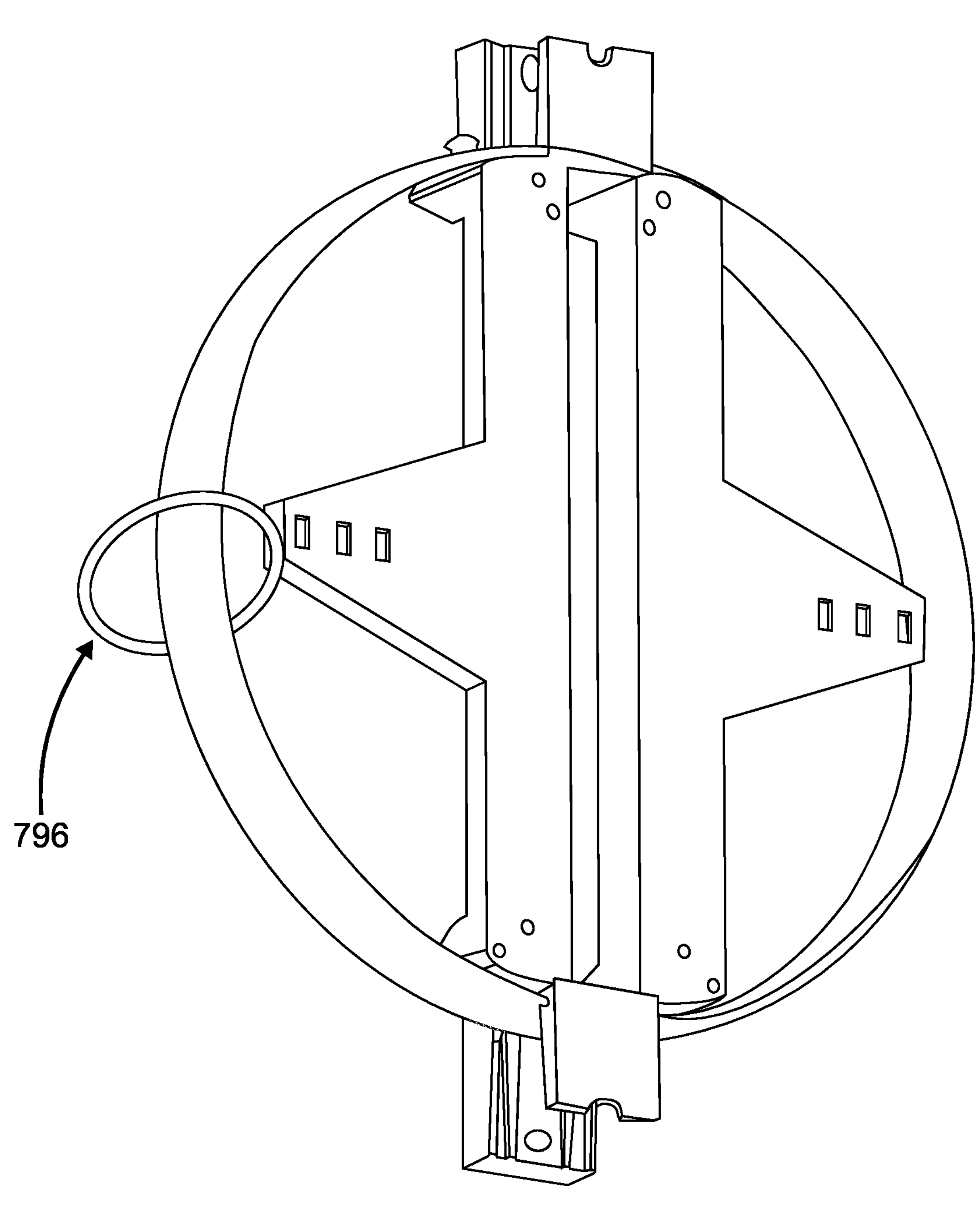
FIG. 44 depicts the enclosure mounting apparatus of FIG. 40 being used to spool and strap cable.

Wings 740, 741 extend from opposite sides 728, 730 of mounting plate 722. In the depicted example, wings 740, 741 have a truncated triangular shape and extend outwards (e.g., left and right) along centerline 703. These truncated triangular shapes extend outwardly from sides 728, 730 and terminate at wingtips 742, 743. Wings 740, 741 are defined on the top by sides 744, 745 which run at an obtuse angle from wingtips 742, 743 upwards to mounting plate 722 sides 728, 730; and on the bottom by sides 746, 747 which run at an obtuse angle from wingtips 742, 743 downwards to mounting plate 722 sides 728, 730. Wings 740, 741 include a series of cable tie slots 750*a*-*c* which allow cable which is coiled along loop/coiling path 700 to be secured with cable ties 796 (see FIG. 44). Cable tie slots 750 are positions along centerline 703 progressively further from centerline 701 such that cable tie slots 750*a* are nearest to centerline 701 and cable tie slots 750*c* are furthest from centerline 701.

Figure 46:
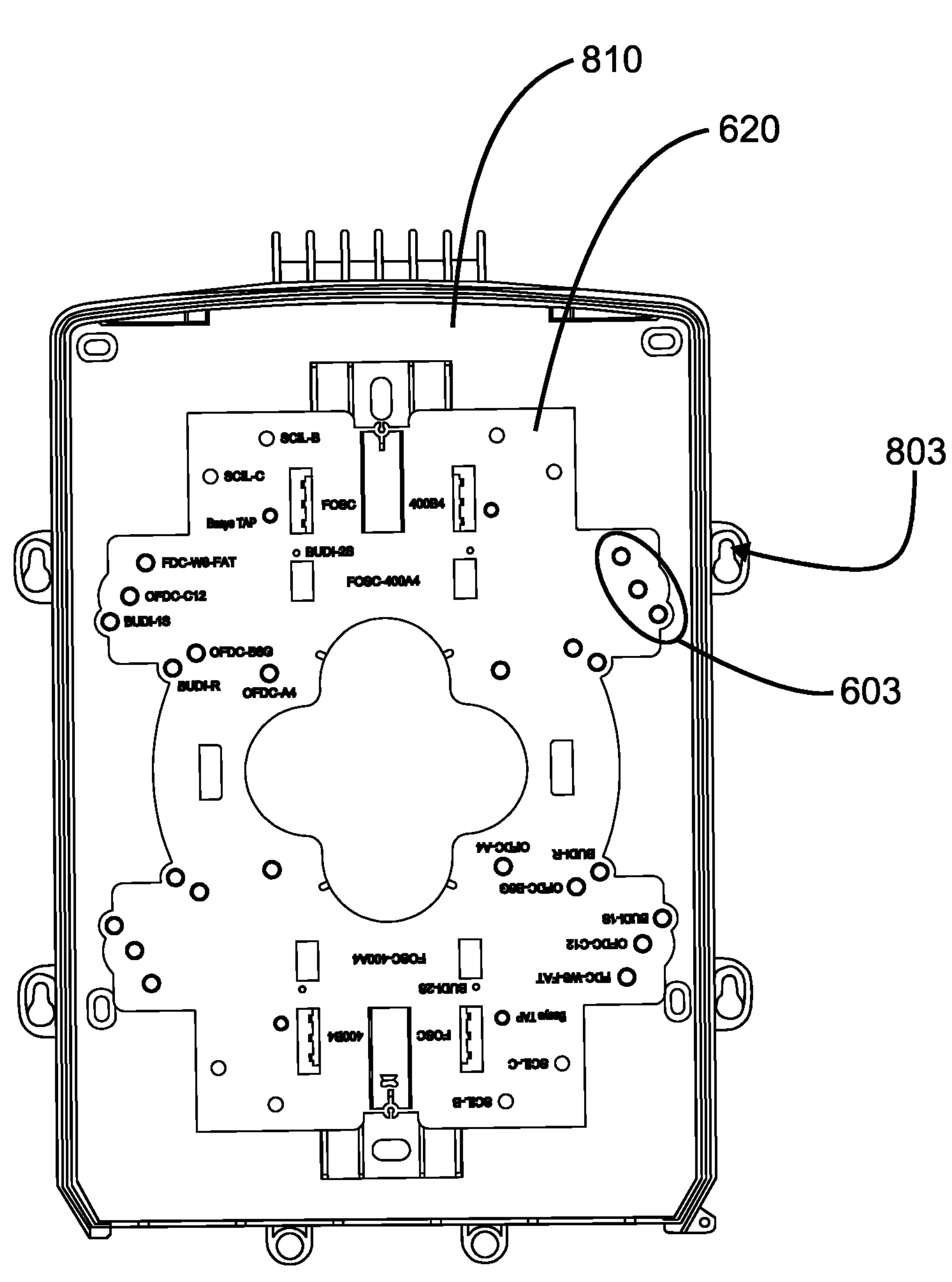
FIG. 46 depicts the enclosure mounting apparatus of FIG. 32 juxtaposed against a telecommunications enclosure.

In some instances, an enclosure mounting apparatus may not be capable of being affixed to the desired telecommunications enclosure, such as is seen in FIG. 46. In this instance the enclosure mounting openings 603 (e.g., first fastener openings) of the enclosure mounting apparatus 620 (e.g., an enclosure mounting bracket) do not align with enclosure mounting openings 803 of the enclosure 810. As described previously, the enclosure mounting openings 603 are arranged in different configurations/patterns (e.g., first configurations) designed to match different first mounting hole patterns defined by different sizes and/or types of first telecommunications enclosures for allowing the first telecommunications enclosures to be secured to the enclosure mounting bracket by enclosure securement fasteners (e.g., bolts, screws, rivets, expandable pins/anchors, etc.).

The enclosure 810 is a second telecommunications enclosure not included in the group of first telecommunications enclosures because the enclosure mounting openings 803 of the enclosure 810 do not match any of the first mounting hole patterns defined by the enclosure mounting openings 603 of the enclosure mounting apparatus 620. In fact, the enclosure mounting openings 803 are arranged in a second mounting hole pattern that is larger than the exterior formfactor of the enclosure mounting apparatus 620. To allow the enclosure mounting apparatus 620 to be used to secure the enclosure 810 to another structure (e.g., a pole, wall, strand, etc.), a converter kit (e.g., an expander kit) can be used. The converter kit can include extenders (e.g., see extender 920 at FIG. 47) that can be secured to the enclosure mounting apparatus 620 to provide enclosure mounting openings 921 (e.g., second fastener openings) that are located outside the exterior boundary (e.g., an outer formfactor) of the enclosure mounting bracket when the extenders 920 are secured to the enclosure mounting bracket (see FIG. 48). When the extenders 920 are secured to the enclosure mounting bracket, enclosure mounting openings 921 are arranged in a second configuration that matches a second mounting hole pattern defined by the enclosure mounting openings 803 of the enclosure 810. Each of the extenders 920 can define multiple ones of the enclosure mounting openings 921 such that the openings 921 can define different second mounting hole patterns designed to match different second mounting hole patterns defined by different sizes and/or types of second telecommunications enclosures for allowing the second telecommunications enclosures to be secured to the extenders 920 by enclosure securement fasteners 850 (e.g., bolts, screws, rivets, expandable pins/anchors, etc.). The enclosure securement fasteners 850 would be installed to extend through (e.g., fully through or at least partially through) the enclosure mounting openings 803 and the aligned enclosure mounting openings 921 to secure the enclosure 810 to the extenders 920. The extenders 920 are intermediate coupling structures that couple the enclosure to the enclosure mounting apparatus 620.

Figure 47:
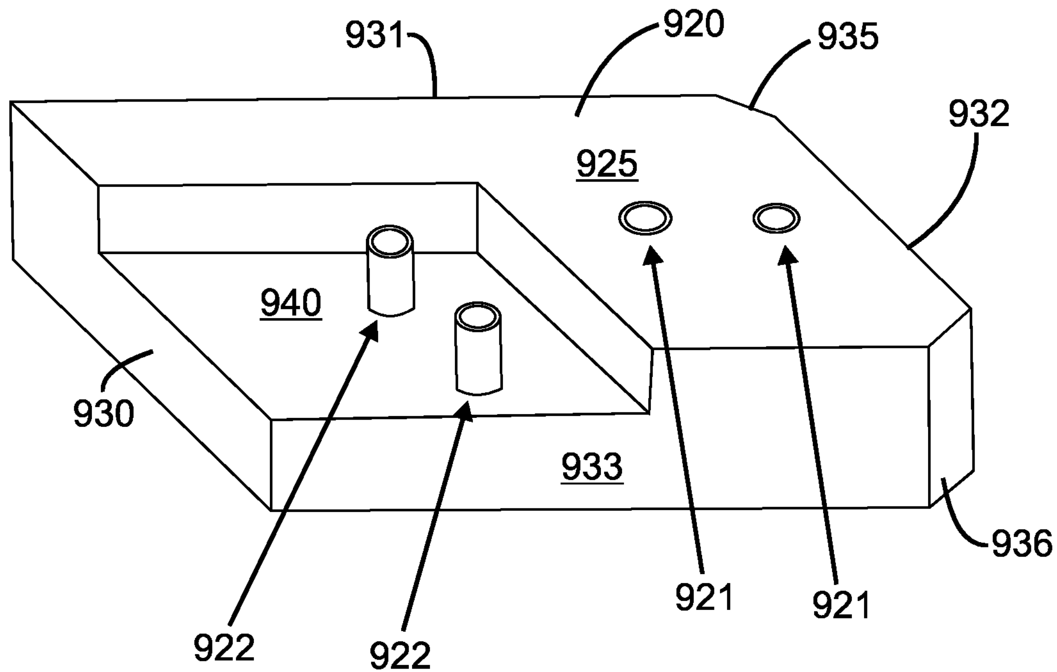
FIG. 47 is a perspective view of an extender that is part of an extender kit in accordance with the principles of the present disclosure.

In some examples extenders 920 are constructed out of molded plastic, metal, or other materials. In some examples, the enclosure mounting openings 921 can be internally threaded or can include threaded inserts. Referring to FIG. 47, the extender 920 is depicted as being roughly rectangular in shape, being defined by opposite sides 931, 933 and opposite sides 930, 932, but other shapes could be used. In some examples, the extender 920 is also defined by angled sides 935, 936 (e.g., chamfered corners) which extend between sides 931, 932 and sides 933, 932 respectively. Additionally, the extender 920 is defined on the front side by face 925. As described above, the extender 920 can defined a number of enclosure mounting openings 921, which may be positioned at variable distances between opposite sides 930, 932 or the opposite sides 931, 933 and may be used to secure a variety of telecommunications enclosures.

Figure 48:
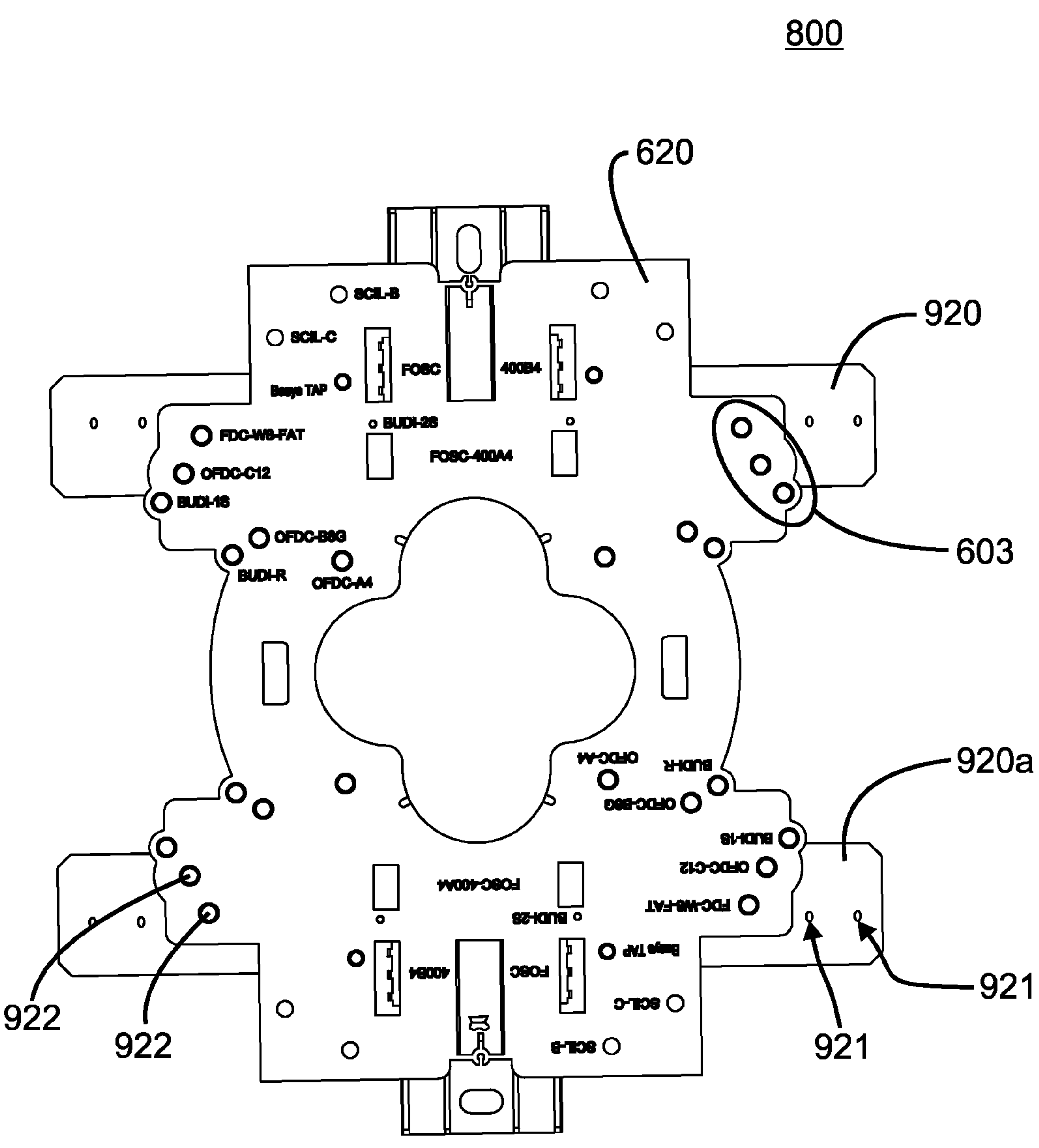
FIG. 48 depicts a plurality of the extenders of FIG. 47 attached to the enclosure mounting apparatus of FIG. 32.
Figure 49:
FIG. 49 is an enlarged view of the connection between the extender of FIG. 47 to an enclosure mounting apparatus and to a telecommunications enclosure.
Figure 49:
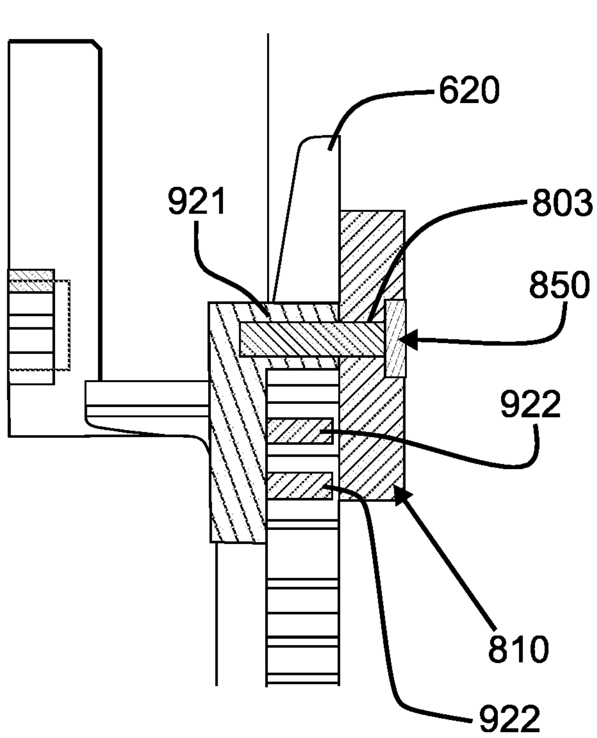
Figure 52:
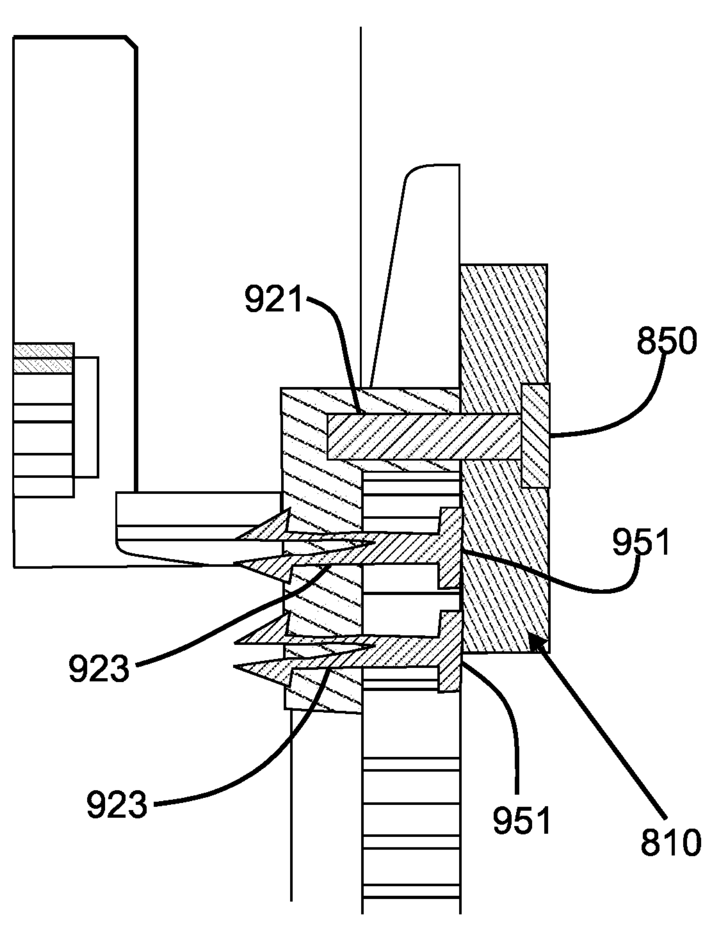
FIG. 52 is an enlarged view of the connection between the extender of p FIG. 50 to the enclosure mounting apparatus and to a telecommunications enclosure.

In some examples extender 920 also includes recess 940, which may receive the corner of the desired enclosure mounting apparatus, in this example enclosure mounting apparatus 620. In some examples, mounting pins 922 may be provided at the recess 940 which align with the enclosure mounting openings 603 of the desired enclosure mounting apparatus, so that the enclosure mounting apparatus can be attached to extender 920, creating an expanded/converted enclosure mounting apparatus 800 as seen in FIGS. 48-49. Expanded apparatus 800 can be secured to the desired telecommunications enclosure via fasteners 850 through the enclosure mounting openings 803 and the enclosure mounting openings 921, as shown in FIGS. 49, 52.

During installation, the expanders 920 can be installed on the enclosure mounting apparatus 620 by securing the expanders 920 from the back of the enclosure mounting apparatus 620 onto the corners of the enclosure mounting apparatus 620 to form the expanded apparatus 800. The corners can be received in the recesses 940 and the pins 922 can fit in the enclosure mounting openings 603. The expanded apparatus 800 can then be mounted at a mounting location (e.g., a pole, wall, etc.) via fasteners that may be installed through mounting openings 605*a*, 605*b* of the mounting apparatus 620. The enclosure 810 can then be secured to the mounting location by the fastening the enclosure to the expanders 920 via fasteners 850 that extend through the aligned enclosure mounting openings 803, 921. With the enclosure 810 fastened to the expanders 920, the enclosure mounting apparatus 620 is clamped between the front sides of the expanders 920 and the back side of the enclosure 810.

Figure 50:
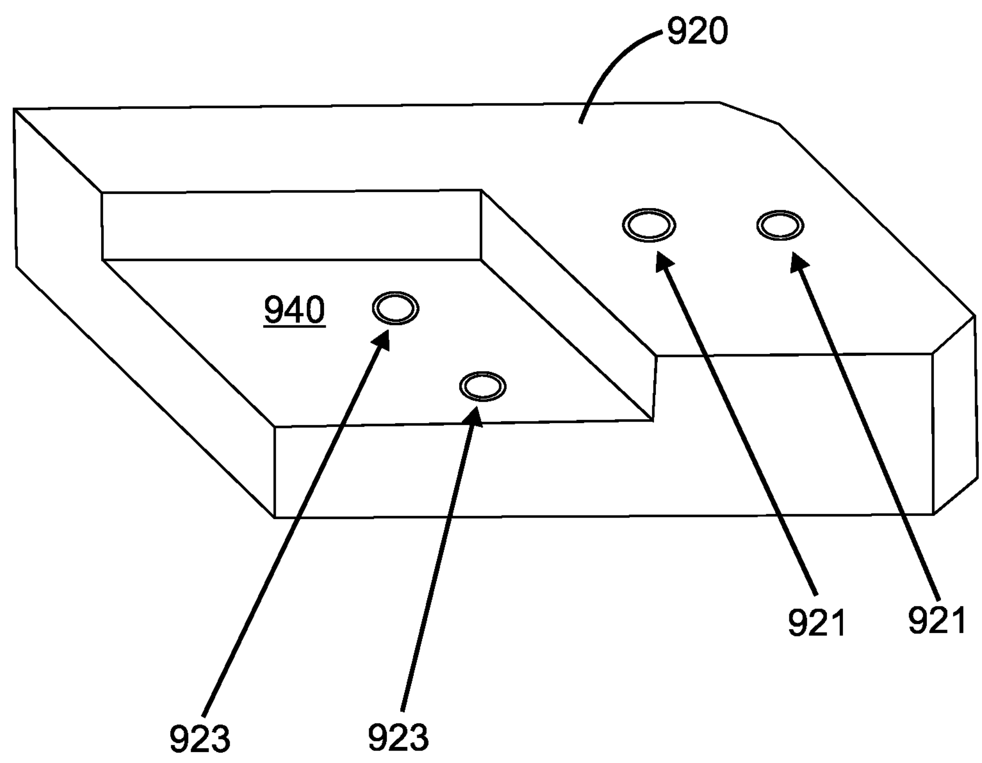
FIG. 50 is a perspective view of an alternate form of the extender of FIG. 47.

In some examples mounting pins 922 may be absent from the extender 920. In these examples, extender 920 may instead have extender mounting openings 923 located at the recess 940. Extender mounting openings 922 align with enclosure mounting openings on the enclosure mounting apparatus (see FIGS. 50-52). Once aligned, extender securement fasteners 951 may be inserted through extender mounting openings to create complex 801. In some examples, extender securement fasteners 951 may be a screw, bolt, expandable anchor/pin (as depicted), or other piece of hardware.

Figure 51:
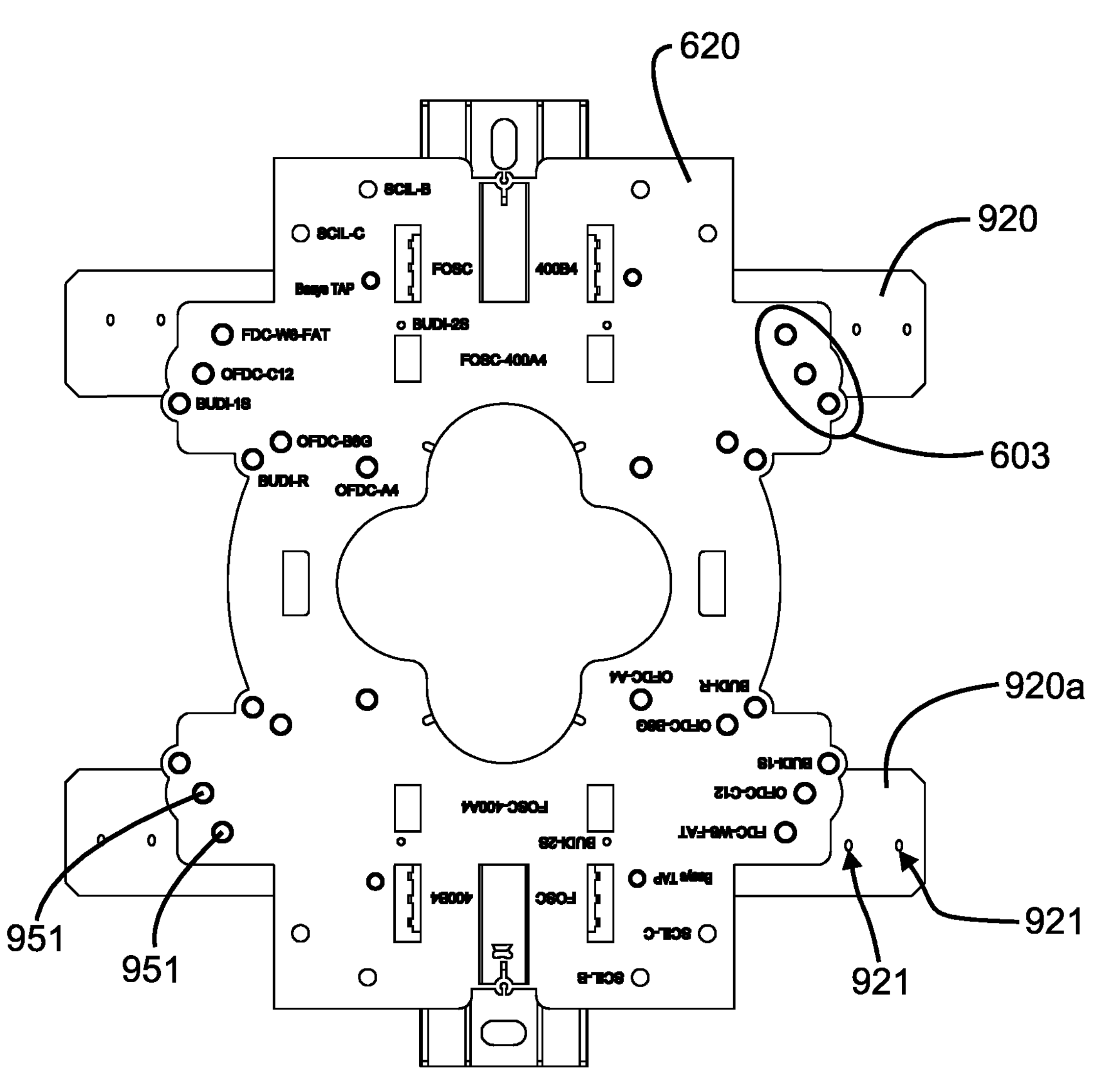
FIG. 51 depicts a plurality of the extenders of FIG. 50 attached to the enclosure mounting apparatus of FIG. 32.

In some examples, extender 920 has multiple configurations 920, 920*a* where 920*a* is similar in construction to extender 920, with an alternate position of recess 940. This modified orientation allows for extenders 920, 920*a* to be applied to any corner of the target enclosure mounting apparatus as depicted in FIGS. 48, 51.

The various examples described above are provided by way of illustration only and should not be construed to limit the scope of the present disclosure. Those skilled in the art will readily recognize various modifications and changes that may be made without departing from the true spirit and scope of the disclosed aspects.

What is claimed is:

1. An enclosure mounting bracket comprising:

a mounting plate portion having molded plastic construction, the mounting plate portion having a front side and a rear side, the mounting bracket including a plurality of fastener openings that extend through the mounting plate portion in a front-to-rear orientation, the fastener openings being configured for receiving fasteners used to secure an enclosure to the front side of the mounting plate portion, the mounting plate portion including first and second opposite sides that extend along a centerline of the mounting bracket, and third and fourth opposite sides that extend across the centerline of the mounting bracket, the mounting plate portion defining side notches at the first and second sides, the side notches including open notch sides and closed notch sides, the closed notch sides defined by cable bend protection members that project rearwardly from the mounting plate portion and have convex bend control shapes that face outwardly toward the open notch sides; and rear mounting flanges connected to the mounting plate portion by rear offsets that rearwardly space the rear mounting flanges from the mounting plate portion, wherein the rear mounting flanges are positioned adjacent the third and fourth sides and are aligned along the centerline of the mounting bracket, wherein a cable storage coil path is defined behind the mounting plate portion by a spool structure that includes the cable bend protection members and the rear offsets, and wherein the cable storage coil path extends around the convex bend control shapes and the rear offsets.

2. The enclosure mounting bracket of claim 1, wherein the mounting plate portion defines cable tie openings adjacent to the cable bend protection members for receiving cable ties used to tie a cable coil coiled about the cable storage coil path to the cable bend protection members.

3. The enclosure mounting bracket of claim 1, wherein the mounting plate portion includes front flanges that project from a main body of the mounting plate portion at locations in front of the rear mounting flanges, wherein cable containment channels for containing cable coiled along the cable storage cable path are defined between the front flanges and the rear mounting flanges.

4. The enclosure mounting bracket of claim 3, wherein the mounting plate portion defines strap slots for securing the enclosure to the front of the mounting plate portion using straps routed through the strap slots, wherein the strap slots include first pairs of strap slots defined through the front flanges of the mounting plate portion, and second pairs of strap slots defined through the main body of the mounting plate portion.

5. The enclosure mounting bracket of claim 1, wherein the cable bend protection members for controlling bending of cable coiled along the cable storage cable path are integrated with the rear offsets.

6. The enclosure mounting bracket of claim 1, wherein the rear mounting flanges define bracket mounting openings for securing the enclosure mounting bracket to a wall or pole using fasteners, and wherein the rear mounting flanges define strap slots for receiving straps for securing the enclosure mounting bracket to a pole.

7. The enclosure mounting bracket of claim 6, further comprising aerial strand clamps that attach to the rear mounting flanges at the bracket mounting openings.

8. The enclosure mounting bracket of claim 1, wherein the mounting plate portion defines strap slots for securing the enclosure to the front of the mounting plate portion using straps routed through the strap slots.

9. The enclosure mounting bracket of claim 1, wherein the mounting plate portion defines a central opening having a four-lobed configuration that is symmetric about major and minor axes of the enclosure mounting bracket.

10. The enclosure mounting bracket of claim 1, wherein some of the fastener openings include internally threaded metal inserts and others of the fastener openings do not include internally threaded metal inserts.

11. The enclosure mounting bracket of claim 1, wherein an outer perimeter of the mounting plate portion is radiused about at least some of the fastener openings.

12. The enclosure mounting bracket of claim 1, further comprising labeling on the mounting plate portion for identifying mounting locations of different types of enclosures.

13. An enclosure mounting apparatus comprising:

a mounting plate having molded plastic construction, the mounting plate having a front side and a rear side, and the enclosure mounting apparatus defining a plurality of fastener openings that extend through the mounting plate in a front-to-rear orientation, the fastener openings being configured for receiving fasteners used to secure an enclosure to the front side of the mounting plate, wherein the fastener openings include: a) four first fastener openings arranged in a first rectangular configuration defining a first rectangle size; b) four second fastener openings arranged in a second rectangular configuration defining a second rectangle size; c) four third fastener openings arranged in a third rectangular configuration defining a third rectangle size; and d) four fourth fastener openings arranged in a fourth rectangular configuration defining a fourth rectangle size.

14. The enclosure mounting apparatus of claim 13, wherein the first fastener openings have a horizontal center-to-center spacing of 219 mm and a vertical center-to-center spacing of 193.75 mm; wherein the second fastener openings have a horizontal center-to-center spacing of 234 mm and a vertical center-to-center spacing of 164.25 mm; wherein the third fastener openings have a horizontal center-to-center spacing of 173.6 mm and a vertical center-to-center spacing of 110 mm; and wherein the fourth fastener openings have a horizontal center-to-center spacing of 106.5 mm and a vertical center-to-center spacing of 90.4 mm.

15. The enclosure mounting apparatus of claim 13, wherein the mounting plate includes first, second, third, and fourth quadrants that respectively include first, second, third, and fourth corners of the mounting plate, and wherein one of each of the first, second, third, and fourth fastener openings is provided within each of the first, second, third, and fourth quadrants.

16. The enclosure mounting apparatus of claim 13, wherein the mounting plate includes arrangement of cells defined by reinforcing ribs, the arrangement of cells having open ends at the rear side of the mounting plate and closed ends at the front side of the mounting plate.

17. A mounting system for telecommunications enclosures, the mounting system comprising:

an enclosure mounting bracket including first fastener openings arranged in different first configurations matching different first mounting hole patterns defined by different sizes and/or types of first telecommunications enclosures for allowing the first telecommunications enclosures to be secured to the enclosure mounting bracket by enclosure securement fasteners, the enclosure mounting bracket defining an exterior formfactor; and a kit for allowing the enclosure mounting bracket to be used with a second telecommunications enclosure having a second mounting hole pattern larger than the exterior formfactor of the enclosure mounting bracket, the kit including extenders that are secured to the enclosure mounting bracket at selected ones of the first fastener openings, the extenders defining second fastener openings that are located outside the exterior formfactor of the enclosure mounting bracket when the extenders are secured to the enclosure mounting bracket, wherein when the extenders are secured to the enclosure mounting bracket, the second fastener openings are arranged in a second configuration that matches a second mounting hole pattern.

18. The mounting system of claim 17, wherein the extenders define recesses that receive corner portions of the enclosure mounting bracket.

19. The mounting system of claim 18, wherein the extenders include mounting pins located at the recesses that fit within the selected ones of the first fastener openings when the extenders are mounted to the enclosure mounting bracket.

20. The mounting system of claim 19, wherein the extenders include extender mounting openings located at the recesses that align within the selected ones of the first fastener openings when the extenders are mounted to the enclosure mounting bracket to allow the extenders to be secured to the enclosure mounting bracket by extender securement fasteners.

* * * * *